United States Patent
Shibayama

(10) Patent No.: US 12,498,753 B2
(45) Date of Patent: Dec. 16, 2025

(54) PROCESSING DEVICE, PROCESSING SYSTEM, AND PROCESSING METHOD

(71) Applicant: NEC Corporation, Tokyo (JP)

(72) Inventor: Atsufumi Shibayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/760,422

(22) Filed: Jul. 1, 2024

(65) Prior Publication Data

US 2025/0028351 A1   Jan. 23, 2025

(30) Foreign Application Priority Data

Jul. 21, 2023 (JP) .................................. 2023-118749

(51) Int. Cl.
G06F 1/08 (2006.01)
H03K 23/66 (2006.01)

(52) U.S. Cl.
CPC ............. *G06F 1/08* (2013.01); *H03K 23/662* (2013.01)

(58) Field of Classification Search
CPC ....................................................... G06F 1/08
USPC ........................................................ 327/115
See application file for complete search history.

(56) References Cited

U.S. PATENT DOCUMENTS

2024/0275388 A1*   8/2024   Shibayama ............ H03K 21/00

FOREIGN PATENT DOCUMENTS

WO   2009/116398 A1   9/2009

* cited by examiner

*Primary Examiner* — Tomi Skibinski
(74) *Attorney, Agent, or Firm* — Sughrue Mion, PLLC

(57) ABSTRACT

A processing device according to an aspect of the present disclosure includes: a toggle signal reception circuit configured to receive a toggle signal a value of which transitions between binary values at a timing of a pulse of a frequency-divided clock signal in which a periodic pattern signal is repeated, pulses of the periodic pattern signal being generated by masking predetermined pulses of a mask pulse number among consecutive pulses of a periodic pulse number in an input clock signal, the mask pulse number being smaller than the periodic pulse number; and a communication circuit configured to communicate with another processing device operated by the frequency-divided clock signal at the timing of the pulse of the frequency-divided clock signal among the pulses of the input clock signal, the timing of the pulse of the frequency-divided clock signal being specified using the toggle signal.

18 Claims, 24 Drawing Sheets

PROCESSING DEVICE, PROCESSING SYSTEM, AND PROCESSING METHOD

This application is based upon and claims the benefit of priority from Japanese Patent Application No. 2023-118749, filed on Jul. 21, 2023, the disclosure of which is incorporated herein in its entirety by reference.

TECHNICAL FIELD

The present disclosure relates to a processing device, a processing system, and a processing method, and more particularly, to a processing device, a processing system, and a processing method for communicating with a communication counterpart to which a frequency-divided clock signal generated by rational number frequency division is supplied.

BACKGROUND ART

In a digital signal processing circuit including a plurality of circuit blocks, an operating frequency that is optimum from the viewpoint of circuit scale and power consumption is determined depending on the content of signal processing processed by each of the plurality of circuit blocks. Therefore, the optimum operating frequencies of the plurality of circuit blocks are not necessarily the same.

As a method of flexibly providing a clock signal of an optimum frequency for each circuit block, there is a method of generating a clock signal having a lower frequency from a clock signal having a certain frequency by performing frequency division.

As a clock signal frequency dividing circuit that generates a clock signal having a lower frequency from a clock signal having a certain frequency by performing frequency division, there is a frequency dividing circuit in which a frequency division ratio, that is, a ratio of the frequency of the clock signal before frequency division and the frequency of the clock signal after frequency division is 1/M (M is an integer). Such a frequency dividing circuit is called an integer frequency dividing circuit. The integer frequency dividing circuit can be easily achieved using a counter circuit.

Among the clock frequency dividing circuits, a frequency dividing circuit having a frequency division ratio of N/M (N and M are integers) is called a rational number frequency dividing circuit. The rational number frequency dividing circuit is disclosed, for example, in WO 2009/116398 A1. The frequency division at the frequency division ratio of N/M will hereinafter be also referred to as N/M frequency division.

WO 2009/116398 A1 describes a clock signal frequency dividing circuit that generates a frequency-divided clock signal obtained by dividing a frequency of an input clock signal at N/M. The clock signal frequency dividing circuit described in WO 2009/116398 A1 masks M-N clock pulses among M consecutive clock pulses of the input clock signal based on a frequency division ratio defined by N/M (N is a positive integer, and M is a positive integer larger than N). As a result, the clock signal frequency dividing circuit described in WO 2009/116398 A1 generates a frequency-divided clock signal obtained by dividing the frequency of the input clock signal at N/M. Specifically, the clock signal frequency dividing circuit of WO 2009/116398 A1 includes a mask circuit and a mask control circuit. The mask circuit generates and outputs a frequency-divided clock signal by masking a clock pulse of the input clock signal according to an input mask signal. The mask control circuit generates a mask signal based on communication timing information, and outputs the mask signal to the mask circuit. The communication timing information is information indicating a communication timing of data communication performed by a target circuit using a frequency-divided clock signal. The mask signal is a signal obtained by assigning a mask timing for masking M-N clock pulses at timings other than the communication timing among the timings of the M consecutive clock pulses of the input clock signal.

As described above, the clock signal frequency dividing circuit described in WO 2009/116398 A1 outputs a clock pulse of an input clock signal as a frequency-divided clock signal without masking the clock pulse of the input clock signal at a communication timing of a target circuit. For this reason, the clock signal frequency dividing circuit described in WO 2009/116398 A1 can generate a frequency-divided clock signal capable of performing data communication with a counterpart circuit operating with a clock signal different from the input clock signal without deteriorating communication performance.

In the description of the present disclosure, a circuit that uses a frequency-divided clock signal output from the clock signal frequency dividing circuit will be referred to as a target circuit. Further, a circuit that communicates with the target circuit will be referred to as a counterpart circuit.

SUMMARY

One exemplary object of the present disclosure is to provide a processing device, a processing system, and a processing method capable of reducing design cost and facilitating timing design.

A processing device according to an aspect of the present disclosure includes a toggle signal reception means for receiving a toggle signal value of which transitions between binary values at a timing of a pulse of a frequency-divided clock signal in which a periodic pattern signal is repeated, the periodic pattern signal having predetermined pulses that are masked, among pulses consecutive in a periodic pulse number of an input clock signal, in such a way that a mask pulse number is smaller than the periodic pulse number, and a communication means for communicating with another processing device operated by the frequency-divided clock signal at the timing of the pulse of the frequency-divided clock signal specified using the toggle signal among the pulses of the input clock signal.

A processing method according to an aspect of the present disclosure includes receiving a toggle signal a value of which transitions between binary values at a timing of a pulse of a frequency-divided clock signal in which a periodic pattern signal is repeated, the periodic pattern signal having predetermined pulses that are masked, among pulses consecutive in a periodic pulse number of an input clock signal, in such a way that a mask pulse number is smaller than the periodic pulse number, and communicating with another processing device operated by the frequency-divided clock signal at the timing of the pulse of the frequency-divided clock signal specified using the toggle signal among the pulses of the input clock signal.

BRIEF DESCRIPTION OF THE DRAWINGS

Exemplary features and advantages of the present invention will become apparent from the following detailed description when taken with the accompanying drawings in which.

EXAMPLE EMBODIMENT

Figure 1:
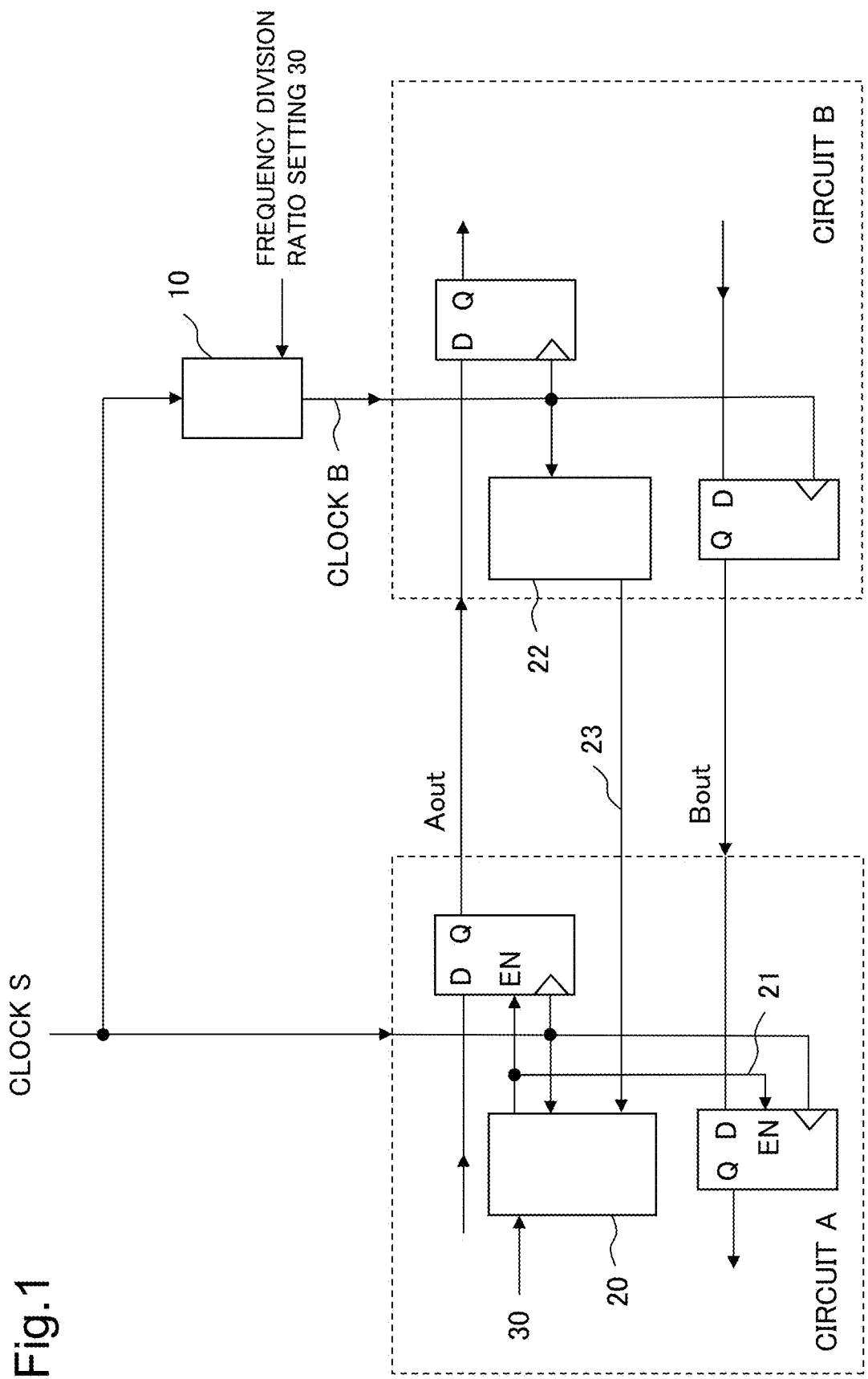
FIG. 1 is a diagram illustrating an example of a circuit using a clock signal frequency dividing circuit according to an example embodiment of the present disclosure.

Hereinafter, first, comparative examples of the present disclosure will be described. After the comparative examples are described, example embodiments of the present disclosure will be described in detail with reference to the drawings.

First Comparative Example

First, as a first comparative example, a clock signal frequency dividing circuit according to techniques described in Reference Document 1 and Reference Document 2 will be described.
(Reference Document 1) JP 2005-45507 A
(Reference Document 2) JP 2006-148807 A Each of Reference Document 1 and Reference Document 2 discloses an example of a rational number frequency dividing circuit having a frequency division ratio of N/M (N and M are integers) among clock frequency dividing circuits.

In the clock signal frequency dividing circuit (which may also hereinafter be simply referred to as a frequency dividing circuit) according to each of Reference Document 1 and Reference Document 2, a value for setting a numerator of a frequency division ratio (a value of N in the frequency division ratio N/M), that is, a value set as a numerator of the frequency division ratio, is cumulatively added in every cycle of the input clock signal. When the addition result (that is, a cumulatively added value) is larger than a value for setting a denominator (a value of M in the frequency division ratio N/M, that is, a value set as a denominator of the frequency division ratio, the frequency dividing circuit according to each of Reference Document 1 and Reference Document 2 subtracts the value of M from the addition result. The frequency dividing circuit according to each of Reference Document 1 and Reference Document 2 masks (that is, thins out) clock pulses of the input clock signal, using the addition result, such that the number of unmasked clock pulses among the M clock pulses is N. The frequency dividing circuit according to each of Reference Document 1 and Reference Document 2 implements rational number frequency division as described above.

The clock signal frequency dividing circuit described in each of Reference Document 1 and Reference Document 2 generates a frequency-divided clock signal by selectively masking the clock pulses of the input clock signal to frequency-divide the input clock signal. However, in such a clock signal frequency dividing circuit, a timing of communication between a target circuit using a frequency-divided clock signal output from the clock signal frequency dividing circuit and a counterpart circuit performing data communication with each other is not considered. Therefore, when the target circuit performs data communication with the counterpart circuit that operates with a clock signal having a frequency different from that of the input clock signal, a special clock switching circuit or a special timing design is required. As a result, the communication performance deteriorates. Furthermore, the power consumption and the circuit scale increase. In addition, the design cost increases.

Hereinafter, a clock signal frequency dividing circuit according to the first comparative example will be described with reference to FIGS. 10 and 11.

Figure 10:
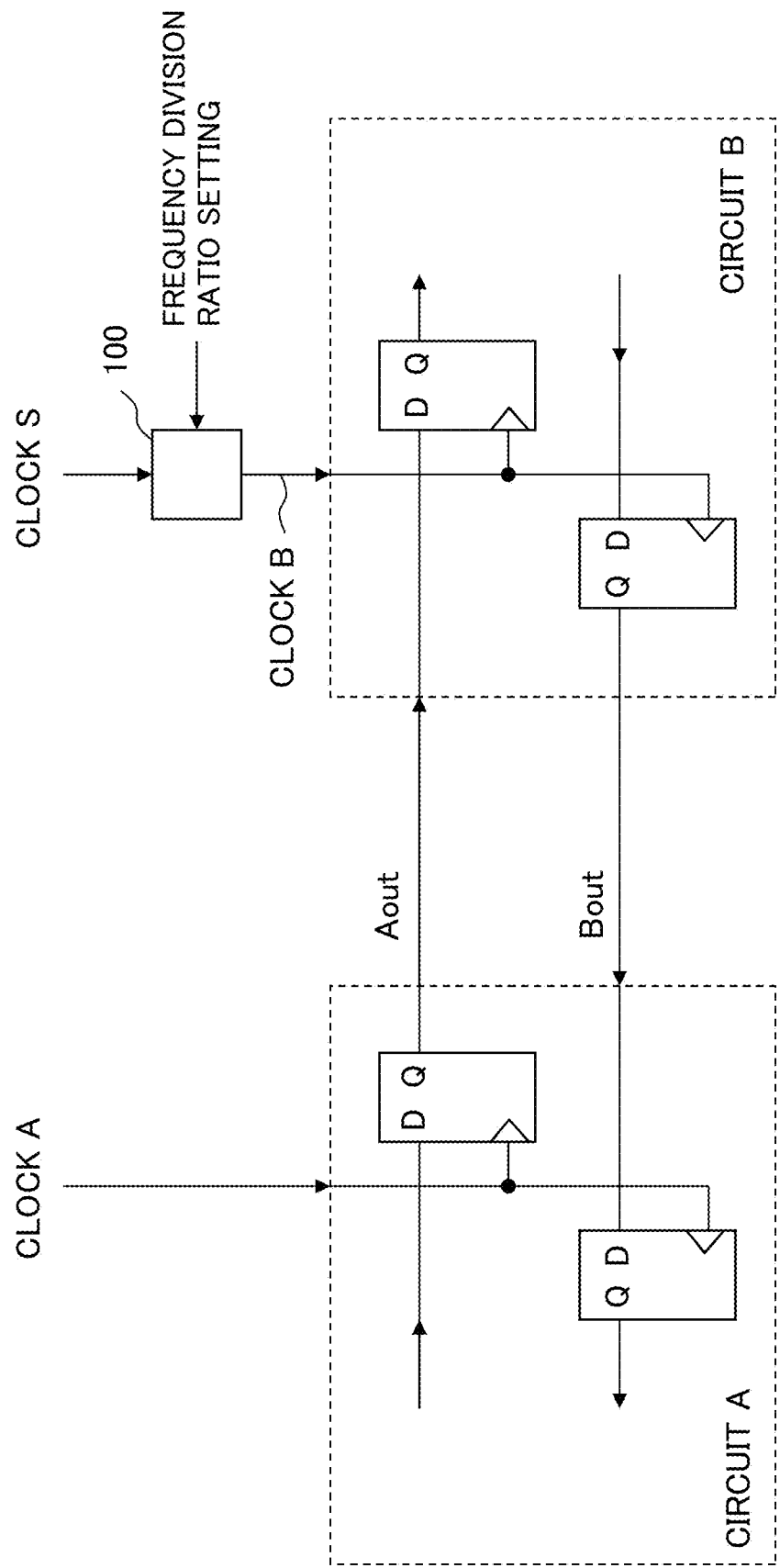
FIG. 10 is a diagram illustrating an example of a semiconductor integrated circuit using a clock signal frequency dividing circuit according to a first comparative example.

FIG. 10 is a diagram illustrating an example of a semiconductor integrated circuit using the clock signal frequency dividing circuit according to the first comparative example.

Figure 11:
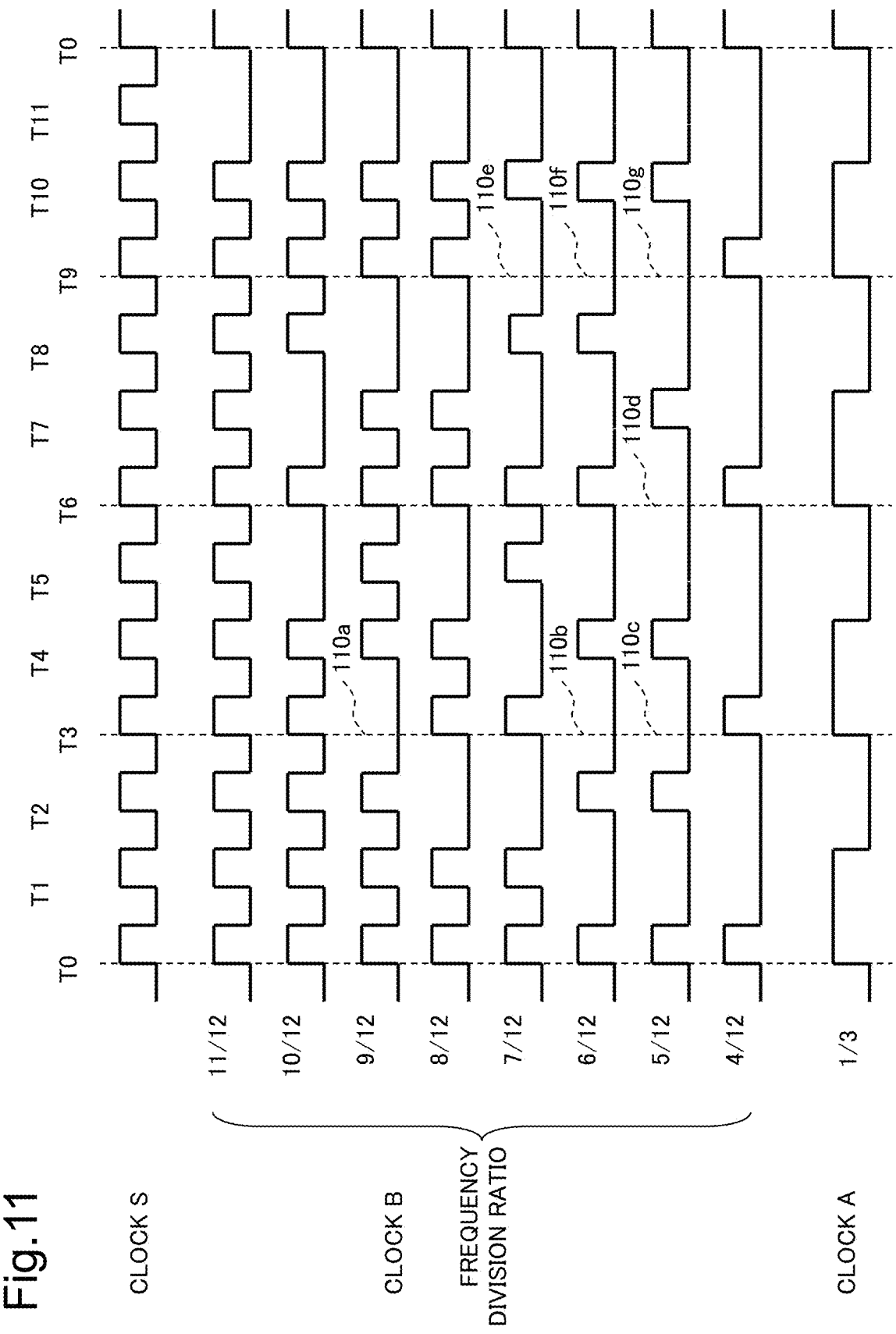
FIG. 11 is a diagram illustrating an example of a clock signal in the semiconductor integrated circuit according to the first comparative example.

FIG. 11 is a diagram illustrating an example of a clock signal in the semiconductor integrated circuit according to the first comparative example.

In the example illustrated in FIG. 10, a clock S is supplied to a clock signal frequency dividing circuit 100. The clock S is a clock signal supplied to the clock signal frequency dividing circuit 100. The clock signal frequency dividing circuit 100 generates a clock B by dividing the frequency of the clock S by a rational number according to an input frequency division ratio setting. The clock B is a clock signal generated by the clock signal frequency dividing circuit 100. The clock B is supplied to a circuit B. A clock A different from the clock S and the clock B is supplied to a circuit A. The clock A is a clock signal supplied to the circuit A. The circuit A and the circuit B communicate with each other through a signal Aout and a signal Bout. The signal Aout is a signal that the circuit A outputs at a timing of the clock A and the circuit B receives as an input at a timing of the clock B. The signal Bout is a signal that the circuit B outputs at the timing of the clock B and the circuit A receives as an input at the timing of the clock A.

As described above, a circuit that uses a frequency-divided clock signal output from the clock signal frequency dividing circuit will be referred to as a target circuit. In addition, a circuit that communicates with the target circuit will be referred to as a counterpart circuit. In the example of FIG. 10, the circuit B is a target circuit. The circuit A is a counterpart circuit.

FIG. 11 illustrates the clock B generated by the clock signal frequency dividing circuit 100 dividing the frequency of the clock S at a frequency division ratio of 11/12 to 4/12. The clock B can be generated by appropriately masking clock pulses (which may also hereinafter be simply referred to as pulses) of the input clock S. For example, the clock B having a frequency division ratio of 9/12 is generated by masking three clock pulses at timings T3, T8, and T11 among 12 clock pulses at timings T0 to T11 of the clock S.

In the example illustrated in FIG. 11, the frequency of the clock A is ⅓ of the frequency of the clock S. That is, the frequency division ratio of the clock A to the clock S is 1/3 (=4/12). At this time, the phase relationship between the clock A and the clock B illustrated in FIG. 11 makes one round in 12 cycles of the clock S. The timings of the 12 cycles where this phase relationship makes one round are denoted by T0 to T11. In addition, it is assumed that the circuit A and the circuit B communicate with each other at the timings T0, T3, T6, and T9, which are all rising timings of the clock A. That is, the circuit A outputs the signal Aout and receives the signal Bout as an input at the timings T0, T3, T6, and T9, which are rising timings and communication timings of the clock A.

However, the clock signal frequency dividing circuit 100 illustrated in FIG. 10 does not consider communication with clocks of different frequencies. Therefore, there is a case where the clock signal frequency dividing circuit 100 generates a clock B in which the clock pulse of the clock S is masked at one or more of the timings T0, T3, T6, and T9, which are the communication timings of the circuit A. The clock B illustrated in FIG. 11 includes a clock B in which the clock pulse of the clock S is masked at one or more of T3, T6, and T9 among the communication timings.

Specifically, at the timing T3, the clock pulse of the clock B in a case where the frequency division ratio is 9/12, the clock pulse of the clock B in a case where the frequency division ratio is 6/12, and the clock pulse of the clock B in a case where the frequency division ratio is 5/12 are masked. A waveform of the clock B at the timing T3 in a case where the frequency division ratio is 9/12 is a waveform 110a. A waveform of the clock B at the timing T3 in a case where the frequency division ratio is 6/12 is a waveform 110b. A waveform of the clock B at the timing T3 in a case where the frequency division ratio is 5/12 is a waveform 110c.

Similarly, at the timing T6, the clock pulse of the clock B in a case where the frequency division ratio is 5/12 is masked. A waveform of the clock B at the timing T6 in a case where the frequency division ratio is 5/12 is a waveform 110d.

Similarly, at the timing T9, the clock pulse of the clock B in a case where the frequency division ratio is 7/12, the clock pulse of the clock B in a case where the frequency division ratio is 6/12, and the clock pulse of the clock B in a case where the frequency division ratio is 5/12 are masked. A waveform of the clock B at the timing T9 in a case where the frequency division ratio is 7/12 is a waveform 110e. A waveform of the clock B at the timing T9 in a case where the frequency division ratio is 6/12 is a waveform 110f. A waveform of the clock B at the timing T9 in a case where the frequency division ratio is 5/12 is a waveform 110g.

As in these cases, in a case where the clock B in which the clock pulse of the clock S is masked is generated at the communication timing at which the circuit A can communicate, the circuit B cannot communicate with the circuit A. Specifically, the circuit B operating with the clock B cannot receive the signal Aout output from the circuit A operating with the clock A to a signal line of the signal Aout as an input at an expected timing (that is, a timing at which the circuit B can receive the signal Bout). Similarly, the circuit B operating with the clock B cannot output the signal Bout to a signal line of the signal Bout at a timing expected by the circuit A operating with the clock A (that is, a timing at which the circuit B can receive the signal Bout as an input).

In other words, in the example of the circuit illustrated in FIG. 10, the expected correct communication operation is not achieved in the communication between the circuit B operated by the clock B from the clock signal frequency dividing circuit 100 and the circuit A operated by the clock A having a frequency different from the frequency of the clock B. The expected correct communication operation is receiving a signal output by one of these circuits at a timing when the other circuit can receive the signal, and receiving a signal output by the other circuit at a timing when the one circuit can receive the signal.

In the communication between the circuit operating with the clock from the clock signal frequency dividing circuit according to the present comparative example and a circuit operating with a clock having a different frequency, a special clock switching circuit or a special timing design is required in order to achieve the expected correct communication operation. As a result, the communication performance deteriorates. Furthermore, the power consumption and the circuit scale increase. Furthermore, the design cost increases.

Second Comparative Example

Next, a clock signal frequency dividing circuit according to the technique described in WO 2009/116398 A1 will be described with reference to FIGS. 12 and 13.

Figure 12:
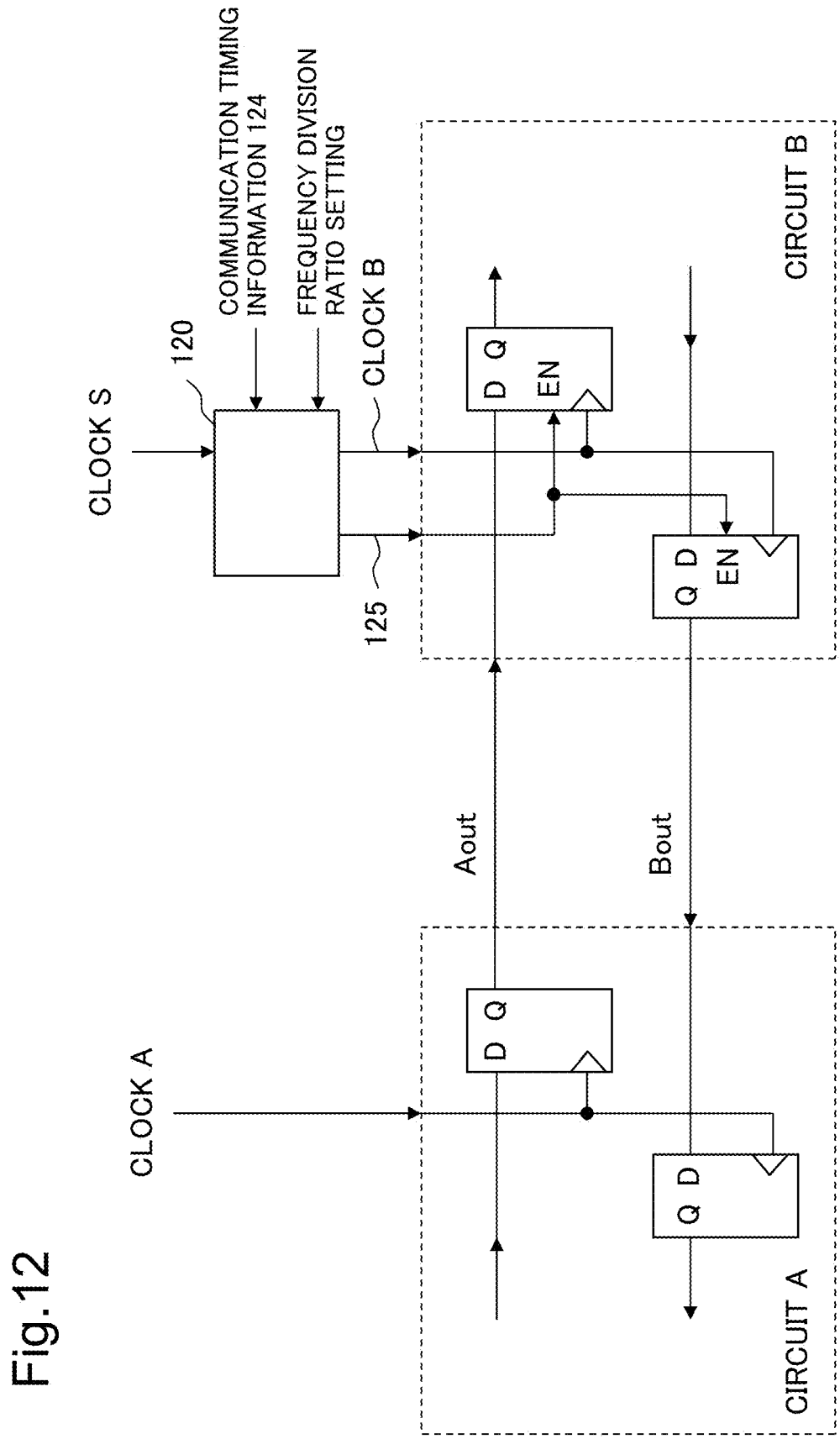
FIG. 12 is a diagram illustrating an example of a semiconductor integrated circuit using a clock signal frequency dividing circuit according to a second comparative example.

FIG. 12 is a diagram illustrating an example of a semiconductor integrated circuit using the clock signal frequency dividing circuit according to the second comparative example.

Figure 13:
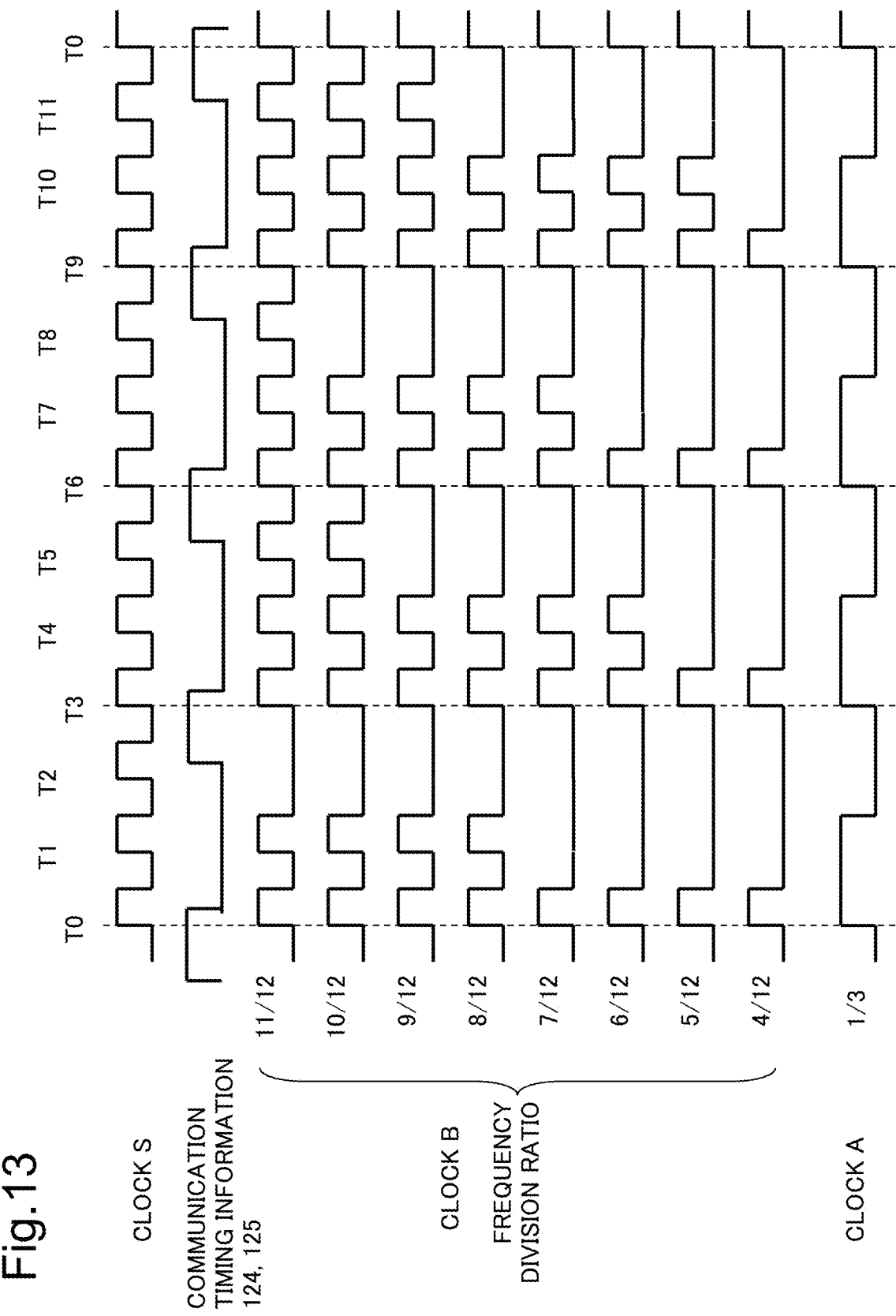
FIG. 13 is a diagram illustrating an example of a clock signal in the semiconductor integrated circuit according to the second comparative example.

FIG. 13 is a diagram illustrating an example of a clock signal in the semiconductor integrated circuit according to the second comparative example.

In the example illustrated in FIG. 12, the semiconductor integrated circuit includes a circuit A, a circuit B, and a clock signal frequency dividing circuit 120. A clock A is supplied to the circuit A. The circuit A is operated by the clock A. A clock B is supplied to the circuit B. The circuit B is operated by the clock B. A frequency division ratio setting, communication timing information indicating a timing of communication between the circuit operating with the clock A and the circuit operating with the clock B, and a clock S are input to the clock signal frequency dividing circuit 120. The clock signal frequency dividing circuit 120 generates a clock B by dividing the frequency of the clock S by a rational number using the frequency division ratio setting and the communication timing information. The clock signal frequency dividing circuit 120 supplies the clock B to the circuit B. The circuit A and the circuit B communicate with each other through a signal Aout and a signal Bout at the communication timing indicated by the communication timing information. The signal Aout is a signal that the circuit A outputs at a timing of the clock A and the circuit B receives as an input at a timing of the clock B. The signal Bout is a signal that the circuit B outputs at the timing of the clock B and the circuit A receives as an input at the timing of the clock A.

FIG. 13 illustrates examples of waveforms of the clock S, the clock A, the communication timing information, and the clock B. The clock B is an example of clock frequency division performed by the clock signal frequency dividing circuit 120 according to the present comparative example. FIG. 13 illustrates a clock B generated by dividing the frequency of the clock S at a frequency division ratio of 11/12 to 4/12. The clock signal frequency dividing circuit 120 generates the clock B by appropriately masking clock pulses of the input clock S. For example, the clock signal frequency dividing circuit 120 generates a clock B having a frequency division ratio of 9/12 by masking three clock pulses at timings T2, T5, and T8 among 12 clock pulses at timings T0 to T11 of the clock S.

In the example illustrated in FIG. 13, the frequency of the clock A is ⅓ of the frequency of the clock S. That is, the frequency division ratio of the clock A to the clock S is 1/3 (=4/12). At this time, the phase relationship between the clock A and the clock B makes one round in 12 cycles of the clock S. The timings of the 12 cycles where this phase relationship makes one circuit are denoted by timings T0 to T11. It is assumed that the circuit A and the circuit B communicate with each other at the timings T0, T3, T6, and T9, which are all rising timings of the clock A. That is, the circuit A outputs the signal Aout and receives the signal Bout as an input at the timings T0, T3, T6, and T9, which are rising timings and communication timings of the clock A.

The clock signal frequency dividing circuit 120 receives communication timing information 124 indicating the communication timings as an input, and performs rational number frequency division in consideration of the communication timings based on the communication timing information 124. Specifically, the clock signal frequency dividing circuit 120 does not always mask clock pulses at the communication timings and masks clock pulses at timings other than the communication timings, thereby implementing rational number frequency division.

In the example illustrated in FIG. 13, in the clock B generated by the frequency division of the clock, clock pulses are not always masked at the timings T0, T3, T6, and T9, which are communication timings. Then, a clock pulse at any of the timings T1, T2, T4, T5, T7, T8, T10, and T11 that are not communication timings is masked. In this manner, the clock signal frequency dividing circuit 120 generates the clock B by masking clock pulses at timings other than the communication timings indicated by the communication timing information 124. That is, the clock B generated by the clock signal frequency dividing circuit 120 always has clock pulses at the communication timings indicated by the communication timing information 124. Therefore, the circuit B operated by the clock B can always receive the signal Aout output from the circuit A operated by the clock A to the signal line of the signal Aout as an input at an expected timing. Similarly, the circuit B operated by the clock B can always output the signal Bout to the signal line of the signal Bout at a timing expected by the circuit A operated by the clock A. Meanwhile, the clock B has clock pulses other than the communication timings. Therefore, in order for the circuit B to perform communication only at the communication timing expected by the circuit A, the circuit B needs to recognize the communication timing. For this reason, the clock signal frequency dividing circuit 120 outputs the communication timing information 125 indicating the communication timings to the circuit B.

Here, the communication timing information 125 needs to be a signal synchronized with the clock B. Therefore, it is necessary to match the timing for distributing the clock B with the timing for propagating the communication timing information 125. Since the clock signal is distributed to a large number of flip-flops, the distribution delay is usually very large. In order to match the timing for distributing the clock B with the timing for propagating the communication timing information 125, it is necessary to adjust the delay in propagating the communication timing information 125 in such a way as to be equivalent to the delay in distributing the clock B. However, due to variations in the semiconductor process, temperature, voltage, and the like, delay times also vary. As a result, a timing design is not easy.

First Example Embodiment

Next, a first example embodiment of the present disclosure will be described in detail with reference to the drawings.

Overall Configuration

FIG. 1 is a diagram illustrating an example of a circuit using a clock signal frequency dividing circuit according to an example embodiment of the present disclosure.

A semiconductor integrated circuit using the clock signal frequency dividing circuit according to the first example embodiment of the present disclosure will be described with reference to FIG. 1.

In the example illustrated in FIG. 1, the semiconductor integrated circuit includes a circuit A, a circuit B, and a clock signal frequency dividing circuit 10. A clock S is supplied to the circuit A and the clock signal frequency dividing circuit 10. A frequency division ratio setting is input to the clock signal frequency dividing circuit 10. The frequency division ratio setting 30 is a signal for setting a frequency division ratio of the clock B. The clock signal frequency dividing circuit 10 generates a clock B by performing rational number frequency division on the clock S at a frequency division ratio indicated by the frequency division ratio setting 30. The clock signal frequency dividing circuit 10 outputs the clock B. The clock B is supplied to a circuit B. The clock S and the clock B are clock signals.

The circuit A and the circuit B communicate with each other through the signals Aout and Bout. The signal Aout is a signal that the circuit A outputs at a timing of the clock A and the circuit B receives as an input at a timing of the clock B. The signal Bout is a signal that the circuit B outputs at the timing of the clock B and the circuit A receives as an input at the timing of the clock A.

Figure 2:
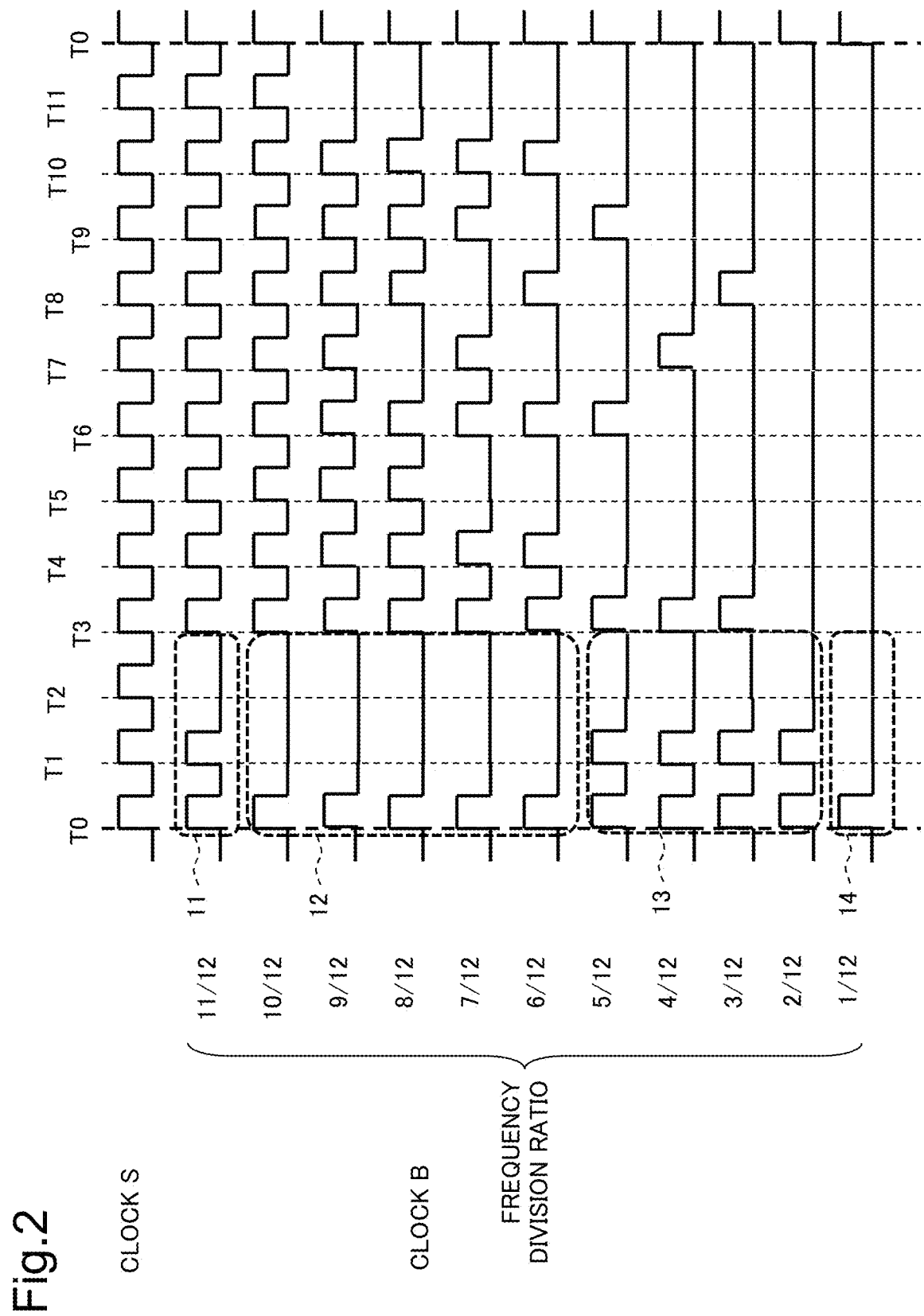
FIG. 2 is a diagram illustrating an example of a clock B generated by rational number frequency division performed by a clock signal frequency dividing circuit according to an example embodiment of the present disclosure.

FIG. 2 is a diagram illustrating an example of a clock B generated by rational number frequency division performed by a clock signal frequency dividing circuit according to an example embodiment of the present disclosure.

The rational number frequency division performed by the clock signal frequency dividing circuit 10 according to the present example embodiment will be described in detail with reference to FIG. 2. In FIG. 2, a clock B generated by dividing the frequency of the clock S at each of the frequency division ratios of 11/12 to 1/12 is illustrated.

In this example, a denominator of the frequency division ratio of the clock B to the clock S is 12. Therefore, the phase relationship between the clock S and the clock B makes one round in 12 cycles of the clock S. In FIG. 2, the timings of the 12 cycles where this phase relationship makes one round are denoted by timings T0 to T11. The circuit A and the circuit B perform communication at timings when both the clock supplied to the circuit A and the clock supplied to the circuit B have clock pulses. For example, in a case where the frequency division ratio of the clock B is 7/12, the timings at which both the clock supplied to the circuit A and the clock supplied to the circuit B have clock pulses are timings T0, T3, T4, T6, T7, T9, and T10. In this case, the circuit A and the circuit B communicate with each other at the timings T0, T3, T4, T6, T7, T9, and T10.

The clock signal frequency dividing circuit 10 provides a marker part for identifying a head of a period at the head of the period where the phase relationship of the clock makes one round. The marker part is a pattern of clock pulses of a predetermined number of cycles. In other words, the clock signal frequency dividing circuit 10 generates the clock B in such a way that the pattern of the clock pulses of the predetermined number of cycles from the head of the period where the phase relationship of the clock makes one cycle for the clock B is the pattern of the clock pulses of the marker part. The marker part is set not to appear in a portion other than the marker part in the clock B including the marker part. When the frequency division ratios are different, the marker parts may not be the same.

In the example of the clock B illustrated in FIG. 2, the first three cycles of the 12-cycle period where the phase relationship makes one round are indicated by one of the markers 11 to 14.

Specifically, the marker part of the clock B in a case where the frequency division ratio is 11/12 is the marker 11 for three cycles where the presence of clock pulse, the presence of clock pulse, and the absence of clock pulse are consecutive.

The marker part of the clock B in a case where the frequency division ratio is any of 10/12 to 6/12 is the marker 12 for three cycles where the presence of clock pulse, the absence of clock pulse, and the absence of clock pulse are consecutive.

The marker part of the clock B in a case where the frequency division ratio is any of 5/12 to 2/12 is the marker 13 for three cycles where the presence of clock pulse, the presence of clock pulse, and the absence of clock pulse are consecutive.

The marker part of the clock B in a case where the frequency division ratio is 1/12 is the marker 14 for three cycles where the presence of clock pulse, the absence of clock pulse, and the absence of clock pulse are consecutive.

In a case where the frequency division ratio is 11/12, a cycle where a clock pulse is absent exists only in a part of the marker 11. The cycle that is two cycles before the cycle where a clock pulse is absent is the foremost cycle of the marker 11. That is, in a case where the frequency division ratio is 11/12, the cycle that is two cycles before the cycle where a clock pulse is absent is a head cycle of the 12-cycle period where the phase relationship makes one round.

In a case where the frequency division ratio is any of 10/12 to 6/12, two consecutive cycles where clock pulses are absent exist only in a part of the marker 12. The cycle immediately before the two consecutive cycles where clock pulses are absent is the foremost cycle of the marker 12. That is, in a case where the frequency division ratio is any of 10/12 to 6/12, the cycle immediately before the two consecutive cycles where clock pulses are absent is a head cycle of the 12-cycle period where the phase relationship makes one round.

In a case where the frequency division ratio is any of 5/12 to 2/12, two consecutive cycles where clock pulses are present exist only in a part of the marker 13. The foremost one of the two consecutive cycles where clock pulses are present is the foremost cycle of the marker 13. That is, in a case where the frequency division ratio is any of 5/12 to 2/12, the foremost one of the two consecutive cycles where clock pulses is a head cycle of the 12-cycle period where the phase relationship makes one round.

In a case where the frequency division ratio is 1/12, a clock pulse is present only in a part of the marker 14. The cycle in which the clock pulse is present is the foremost cycle of the marker 14. That is, in a case where the frequency division ratio is 1/12, the cycle in which the clock pulse is present is a head cycle of the 12-cycle period where the phase relationship makes one round.

More generally, the marker part in a case where the frequency division ratio is N/M (N and M are integers of N<M) is as follows.

The marker part when M and N satisfy N=M−1 is the marker 11 for three cycles where the presence of clock pulse, the presence of clock pulse, and the absence of clock pulse are consecutive.

The marker part when M and N satisfy M/2<N and N<M−1 is the marker 12 for three cycles where the presence of clock pulse, the absence of clock pulse, and the absence of clock pulse are consecutive.

The marker part when M and N satisfy 2<N and N<M/2 is the marker 13 for three cycles where the presence of clock pulse, the presence of clock pulse, and the absence of clock pulse are consecutive.

The marker part in a case where N satisfies N=1 is the marker 14 for three cycles where the presence of clock pulse, the absence of clock pulse, and the absence of clock pulse are consecutive.

Then, when M and N satisfy N=M−1, a cycle where a clock pulse is absent exists only in a part of the marker 11.

When M and N satisfy M/2≤N and N<M−1, two consecutive cycles where clock pulses are absent exist only in a part of the marker 12.

When M and N satisfy 2≤N and N<M/2, two consecutive cycles where clock pulses are present exist only in a part of the marker 13.

In a case where N satisfies N=1, a cycle where a clock pulse is present exists only in a part of the marker 14.

In this manner, the marker part is determined such that the pattern of the clock pulses of the marker part exists only in the head portion of the period where the phase relationship makes one round.

As described above, concerning each frequency division ratio, a pattern of clock pulses of any one marker part of the markers 11 to 14 appears only at the head of the period where the phase relationship makes one round. Therefore, the circuit A and the circuit B can identify a head of the period where the phase relationship makes one round by detecting any one of the markers 11 to 14 according to the frequency division ratio of the clock B by which the circuit B is driven. In other words, the circuit A and the circuit B can identify a head of the period where the phase relationship makes one round by detecting a marker part corresponding to the frequency division ratio of the clock B by which the circuit B is driven among the markers 11 to 14. As a result, the circuit A and the circuit B can recognize whether a clock pulse is present in the clock B at a certain cycle from the frequency division ratio of the clock B and the timing of the head of the period where the phase relationship makes one round.

Specifically, in the example illustrated in FIG. 1, the circuit B operates with a clock B having a lower frequency than the clock S generated by dividing the frequency of the clock S. A toggle signal generation circuit 22 included in the circuit B generates a toggle signal 23 a signal value of which toggles in the clock B. Then, the toggle signal generation circuit 22 outputs the generated toggle signal 23.

The circuit A operates with the clock S having a higher frequency than the clock B. A communication control circuit 20 included in the circuit A generates a communication control signal 21 and outputs the generated communication control signal 21 in the following steps.

(1) The communication control circuit 20 identifies a timing of the head of the period where the phase relationship between the clock S and the clock B makes one round, by detecting a timing of the marker part of the clock B from the input frequency division ratio setting 30, which is information for setting a frequency division ratio of the clock B, and the toggle signal 23.

(2) The communication control circuit 20 recognizes a timing at which clock pulses are present in both the clock S and the clock B from the identified timing of the head of the period and the input frequency division ratio setting 30, which is information for setting a frequency division ratio of the clock B.

(3) The communication control circuit 20 outputs a signal indicating the recognized timing at which clock pulses are present in both the clock S and the clock B as a communication control signal 21 indicating a timing at which the circuit A communicates with the circuit B to a signal line of the communication control signal 21.

Referring to the communication control signal 21, the circuit A outputs a signal Aout and receives a signal Bout as an input at the communication timing (that is, the timing at which the circuit A communicates with the circuit B) indicated by the communication control signal 21. The circuit B outputs the signal Bout and receives the signal Aout as an input in all cycles of the clock B. Through the above operation, efficient inter-block data communication is achieved between the circuit A and the circuit B.

Figure 3:
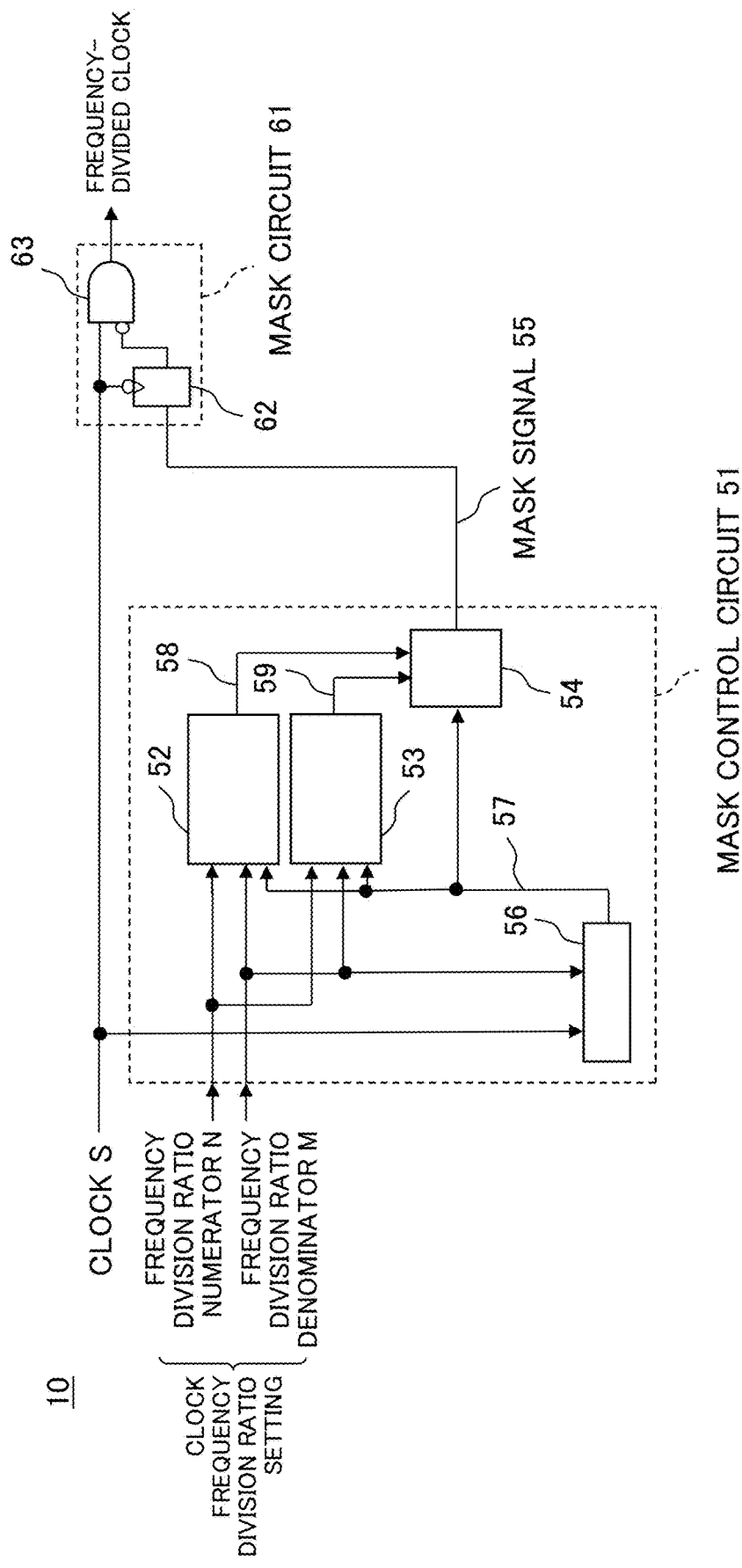
FIG. 3 is a diagram illustrating a configuration of a clock signal frequency dividing circuit 10 according to an example embodiment of the present disclosure.

FIG. 3 is a diagram illustrating a configuration of the clock signal frequency dividing circuit 10 according to an example embodiment of the present disclosure.

Hereinafter, the clock signal frequency dividing circuit 10 according to the first example embodiment of the present disclosure will be described in detail with reference to FIG. 3. In the example illustrated in FIG. 3, the clock signal frequency dividing circuit 10 includes a mask circuit 61 and a mask control circuit 51. The clock signal frequency dividing circuit 10 receives a supplied clock S as an input. The clock signal frequency dividing circuit 10 receives, as an input, a clock frequency division ratio setting that is a signal indicating a frequency division ratio. The clock signal frequency dividing circuit 10 divides the frequency of the clock S received as an input, that is, the input clock S, at the frequency division ratio N/M (M and N are integers). Then, the clock signal frequency dividing circuit 10 outputs a signal (that is, a frequency-divided clock) obtained by dividing the frequency of the clock S as a clock A or a clock B.

The mask control circuit 51 operates at the timing of the clock S. Referring to the input clock frequency division ratio setting, the mask control circuit 51 generates a mask signal 55 in every cycle of the clock S. The clock frequency division ratio setting includes a frequency division ratio denominator M indicating a denominator value of the frequency division ratio and a frequency division ratio numerator N indicating a numerator value of the frequency division ratio. Specifically, the signal indicating the clock frequency division ratio setting is input to the mask control circuit 51 as a signal indicating a frequency division ratio denominator M indicating a denominator value of the frequency division ratio and a signal indicating a frequency division ratio numerator N indicating a numerator value of the frequency division ratio. The mask signal 55 is a signal indicating cycles where clock pulses of the clock S are masked in order to generate a frequency-divided clock (for example, a clock B). Specifically, the mask signal 55 indicates cycles where clock pulses of the clock S are masked in such a way that the frequency-divided clock includes the above-described marker part at the head of the period where the phase relationship between the clock S and the frequency-divided clock makes one round, and the frequency-divided clock is a clock signal having a frequency division ratio of N/M with respect to the clock S. In the following description, when the mask signal indicates that a clock pulse of a certain cycle of the clock S is masked, the mask signal is expressed as masking the clock pulse of the cycle. In other words, when the mask signal indicates that a clock pulse of a certain cycle of the clock S is masked, the mask signal is expressed as masking the clock pulse of the cycle.

The mask control circuit 51 includes a marker part mask signal generation unit 52, a non-marker part mask signal generation unit 53, a selection circuit 54, and a counter circuit 56.

The counter circuit 56 operates at the timing of the clock S. The counter circuit 56 counts the number of clock pulses of the input clock S, referring to the frequency division ratio denominator M. When the number of clock pulses being counted becomes M, the counter circuit 56 returns the count number to 0. The frequency division ratio denominator M represents the number of cycles in a period where a pattern of clock pulses of a frequency-divided clock generated by the clock signal frequency dividing circuit 10 makes one round. Then, the counter circuit 56 repeats the counting of the number of clock pulses of the input clock S. The counter circuit 56 outputs a signal indicating the number of clock pulses being counted (in other words, a count value) as a counter value 57. The count value indicates a current cycle among the cycles (for example, cycle 0 to cycle M−1) in the period where the pattern of the clock pulses of the frequency-divided clock generated by the clock signal frequency dividing circuit 10 makes one round.

In other words, the counter circuit 56 outputs, as a counter value 57, a value indicating the current cycle among the cycles (for example, cycle 0 to cycle M−1) in the period where the pattern of the clock pulses of the frequency-divided clock generated by the clock signal frequency dividing circuit 10 makes one round.

The marker part mask signal generation unit 52 receives the clock frequency division ratio setting and the counter value 57 as inputs. Referring to the clock frequency division ratio setting and the counter value 57 received as inputs, the marker part mask signal generation unit 52 generates a mask signal for a marker part according to a frequency division ratio indicated by the clock frequency division ratio setting among the markers 11 to 14 illustrated in FIG. 2. The mask signal for the marker part is a mask signal indicating a cycle of a clock pulse masked in the marker part. In other words, by using the clock frequency division ratio setting and the counter value 57 received as inputs, the marker part mask signal generation unit 52 generates a mask signal indicating a cycle of a clock pulse masked in the marker part in a case where the frequency division ratio is a frequency division ratio indicated by the clock frequency division ratio setting. When the counter value 57 indicates a cycle of a portion of the marker part, the marker part mask signal generation unit 52 outputs, as a mask signal, a signal indicating whether a clock pulse of the cycle indicated by the counter value 57 is masked.

Specifically, in a case where the frequency division ratio is represented by a frequency division ratio denominator M and a frequency division ratio numerator N, the marker part mask signal generation unit 52 generates the following mask signal.

When M and N satisfy N=M−1, the marker part mask signal generation unit 52 generates a mask signal indicating a cycle of a clock pulse masked in the marker 11.

When M and N satisfy M/2<N and N<M−1, the marker part mask signal generation unit 52 generates a mask signal indicating a cycle of a clock pulse masked in the marker 12.

When M and N satisfy 2≤N and N<M/2, the marker part mask signal generation unit 52 generates a mask signal indicating a cycle of a clock pulse masked in the marker 13.

In a case where N satisfies N=1, the marker part mask signal generation unit 52 generates a mask signal indicating a cycle of a clock pulse masked in the marker 14.

The non-marker part mask signal generation unit 53 receives the clock frequency division ratio setting and the counter value 57 as inputs. Referring to the received clock frequency division ratio setting and the received counter value 57, the non-marker part mask signal generation unit 53 generates a mask signal for a non-marker part that is a part other than the marker part in the period where the phase relationship of the frequency-divided clock makes one round. The non-marker part is a part other than the marker part (the markers 11 to 14 in the example illustrated in FIG. 2) in the frequency-divided clock. The mask signal for the non-marker part is a mask signal indicating a cycle of a clock pulse masked in the non-marker part. When the counter value 57 indicates a cycle of the non-marker part, the non-marker part mask signal generation unit 53 outputs, as a mask signal, a signal indicating whether a clock pulse of the cycle indicated by the counter value 57 is masked.

Specifically, in a case where the frequency division ratio is represented by a frequency division ratio denominator M and a frequency division ratio numerator N, the non-marker part mask signal generation unit 53 generates the following mask signal.

When M and N satisfy N=M−1, the marker part is the marker 11. The size of the marker 11 is 3 cycles. The marker 11 includes two clock pulses. Therefore, the frequency division ratio of the non-marker part that is a part other than the marker 11 in the period where the phase relationship of the frequency-divided clock makes one round is (N−2)/(M−3)=(M−3)/(M−3). In other words, frequency division is not performed in the non-marker part. That is, no clock pulse is masked in the non-marker part. Therefore, the non-marker part mask signal generation unit 53 generates a mask signal indicating that frequency division is not performed, that is, a mask signal indicating that mask processing is not performed, as a mask signal for the non-marker part when M and N satisfy N=M−1. In other words, the non-marker part mask signal generation unit 53 generates a mask signal indicating that no clock pulses are masked in all the cycles of the non-marker part as a mask signal for the non-marker part when M and N satisfy N=M−1.

When M and N satisfy M/2<N and N<M−1, the marker part is the marker 12. The size of the marker 12 is 3 cycles. The marker 12 includes one clock pulse. Therefore, the frequency division ratio of the non-marker part that is a part other than the marker 12 in the period where the phase relationship of the frequency-divided clock makes one round is (N−1)/(M−3). As described above, the marker 12 includes cycles among which clock pulses of two consecutive cycles are masked. As a mask signal for the non-marker part when M and N satisfy M/2≤N and N<M−1, the non-marker part mask signal generation unit 53 generates a mask signal for implementing (N−1)/(M−3) frequency division in the non-marker part and not masking clock pulses of two or more consecutive cycles. In other words, the mask signal for not masking clock pulses of two or more consecutive cycles is a mask signal indicating a cycle (hereinafter also referred to as a mask cycle) in which a clock pulse is masked, and is a mask signal indicating no consecutive cycles clock pulses of which are masked. In the following description, a cycle a clock pulse of which is not masked will also be referred to as a non-mask cycle. In a mask signal for the non-marker part when M and N satisfy M/2≤N and N<M−1, non-mask cycles may be consecutive or may not be consecutive.

When M and N satisfy 2≤N and N<M/2, the marker part is the marker 13. The size of the marker 13 is 3 cycles. The marker 13 includes two clock pulses. Therefore, when M and N satisfy 2<N and N<M/2, the frequency division ratio of the non-marker part that is a part other than the marker 13 in the period where the phase relationship of the frequency-divided clock makes one round is (N−2)/(M−3). In the marker 13, two clock pulses are consecutive. As a mask signal for the non-marker part when M and N satisfy 2≤N and N<M/2, the non-marker part mask signal generation unit 53 generates a mask signal for implementing (N−2)/(M−3) frequency division and indicating no two or more consecutive cycles clock pulses of which are not masked. In other words, the mask signal indicating no two or more consecutive cycles clock pulses of which are not masked is a mask signal in which two or more cycles clock pulses of which are not masked (that is, non-mask cycles) are always consecutive. In a mask signal for the non-marker part when M and N satisfy 2<N and N<M/2, at least one of a cycle before the non-mask cycles and a cycle after the non-mask cycles is a non-mask cycle. In a mask signal for the non-marker part when M and N satisfy M/2≤N and N<M−1, cycles clock pulses of which are not masked (that is, non-mask cycles) are not consecutive. A cycle before the non-mask cycles and a cycle after the non-mask cycles are mask cycles.

When N satisfies N=1, the marker part is the marker 14. The size of the marker 14 is 3 cycles. The marker 14 includes one clock pulse. Therefore, in a case where N satisfies N=1, the frequency division ratio of the non-marker part that is a part other than the marker 14 in the period where the phase relationship of the frequency-divided clock makes one round is (N−1)/(M−3)=0. That is, all clock pulses are masked in the non-marker part. The non-marker part mask signal generation unit 53 generates a mask signal for masking all clock pulses of the non-marker part as a mask signal for the non-marker part in a case where N satisfies N=1.

The selection circuit 54 refers to a counter value 57. The counter value 57 indicates a current cycle in a period (cycle T0 to cycle T11 in the example illustrated in FIG. 2) where a pattern of clock pulses of the frequency-divided clock makes one round. According to the cycle indicated by the counter value 57, the selection circuit 54 selects a mask signal to be output as a mask signal 55 from a mask signal 58 generated by the marker part mask signal generation unit 52 and a mask signal 59 generated by the non-marker part mask signal generation unit 53. The selection circuit 54 outputs the selected mask signal as a mask signal 55. Specifically, when the counter value 57 indicates one of the cycles T0 to T2 included in the marker part, the selection circuit 54 selects the mask signal 58 generated by the marker part mask signal generation unit 52. Then, the selection circuit 54 outputs the selected mask signal 58 as a mask signal 55 to a signal line of the mask signal 55. When the counter value 57 indicates one of the cycles T3 to T11 included in the non-marker part, the selection circuit 54 selects the mask signal 59 generated by the non-marker part mask signal generation unit 53. Then, the selection circuit 54 outputs the selected mask signal 59 as a mask signal 55 to a signal line of the mask signal 55.

The mask signal 55 is input to the mask circuit 61. The mask circuit 61 receives the mask signal 55 as an input. Referring to the mask signal 55, the mask circuit 61 selectively masking a clock pulse of the clock S or directly outputting a clock pulse of the clock S without masking the clock pulse of the clock. The mask circuit 61 masks the clock pulse of the clock S when the mask signal 55 indicates to mask the clock pulse, that is, when the value of the mask signal 55 is a value (for example, 0) indicating to mask the clock pulse. Then, the mask circuit 61 outputs the clock S the clock pulse of which is masked as a clock B. The mask circuit 61 does not mask the clock pulse of the clock S when the mask signal 55 indicates not to mask the clock pulse, that is, when the value of the mask signal 55 is a value (for example, 1) indicating not to mask the clock pulse. Then, the mask circuit 61 outputs the clock S the clock pulse of which is not masked as a clock B.

The mask circuit 61 includes a latch circuit 62 and an AND circuit 63. The AND circuit 63 has a function of masking the clock S based on the mask signal 55. When the value of the mask signal 55 is 0, the AND circuit 63 masks the clock S. When the value of the mask signal 55 is 1, the AND circuit 63 does not mask the clock S.

The latch circuit 62 latches the mask signal 55 at a falling timing of the clock S, thereby limiting the switch of the mask signal 55 input to the AND circuit 63 to the timing at which the value of the clock S is 0. As a result, the latch circuit 62 suppresses an occurrence of glitch in the clock B. The use of the latch circuit 62 in this way is advantageous in that the timing design is facilitated. However, in a case where an occurrence of glitch is avoided by strictly performing a timing design, the latch circuit 62 may be omitted. Furthermore, in the example illustrated in FIG. 3, the AND circuit is used as a circuit that masks the clock S. However, the circuit used for the mask circuit 61 is not limited to the AND circuit. An OR circuit may be used for the mask circuit 61. Another circuit having an equivalent function may be used for the mask circuit 61.

Figure 4:
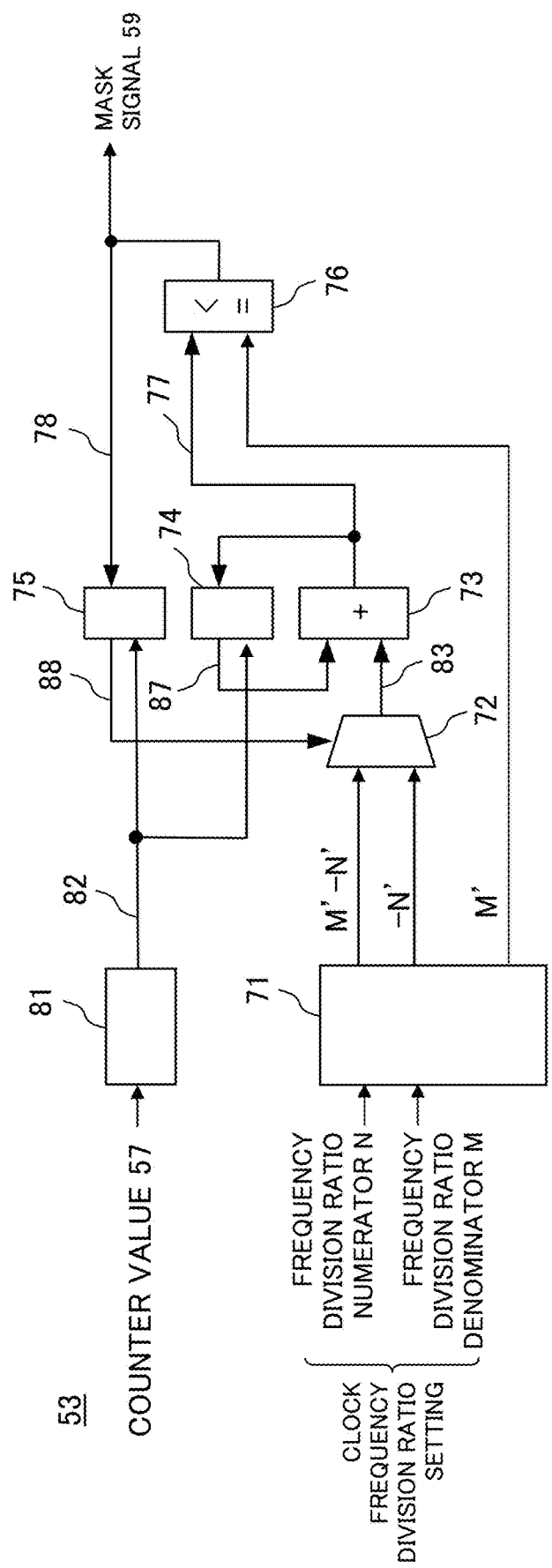
FIG. 4 is a diagram illustrating an example of a configuration of a non-marker part mask signal generation unit 53 according to an example embodiment of the present disclosure.

FIG. 4 is a diagram illustrating an example of a configuration of a non-marker part mask signal generation unit 53 according to an example embodiment of the present disclosure.

Hereinafter, the non-marker part mask signal generation unit 53 according to the present example embodiment will be described in detail with reference to FIG. 4.

In the example illustrated in FIG. 4, the non-marker part mask signal generation unit 53 includes a frequency division ratio setting conversion unit 71, a selector circuit 72, an adder 73, a storage circuit 74, a storage circuit 75, a value comparator 76, and an initialization circuit 81. The non-marker part mask signal generation unit 53 operates at a rising edge timing of an input clock signal. Note that a line indicating the input clock signal of the non-marker part mask signal generation unit 53 is not illustrated in FIG. 4 in order to simplify the drawing. A frequency division ratio denominator M and a frequency division ratio numerator N are input as a frequency division ratio setting to the frequency division ratio setting conversion unit 71. The frequency division ratio setting conversion unit 71 receives the input frequency division ratio setting (that is, the frequency division ratio denominator M and the frequency division ratio numerator N) as an input. The frequency division ratio setting conversion unit 71 converts the frequency division ratio setting (that is, the frequency division ratio denominator M and the frequency division ratio numerator N) received as an input into a frequency division ratio denominator M' and a frequency division ratio numerator N' as a frequency division ratio for the non-marker part. The frequency division ratio setting conversion unit 71 outputs signals indicating the obtained frequency division ratio denominator M' and frequency division ratio numerator N' indicating the frequency division ratio for the non-marker part. Specifically, the frequency division ratio setting conversion unit 71 outputs a signal M'−N' indicating a value of M'−N', a signal −N' indicating a value of −N', and a signal M' indicating a value of M'.

As described above, since the size of the marker part is 3 cycles, the value of the frequency division ratio denominator M' is M−3. The value of the frequency division ratio numerator N' is as follows.

When M and N satisfy N=M−1, the value of the frequency division ratio numerator N' is N'=(N−2).

When M and N satisfy M/2≤N and N<M−1, the value of the frequency division ratio numerator N' is N'=(N−1).

When M and N satisfy 2≤N and N<M/2, the value of the frequency division ratio numerator N' is N'=(N−2).

In a case where N satisfies N=1, the value of the frequency division ratio numerator N' is N'=(N−1).

The initialization circuit 81 generates an initialization signal 82 for initializing the storage circuit 74 and the storage circuit 75 for periodically generating a mask signal for the non-marker part starting from the cycle T3 in the M-cycle period where the phase relationship of the frequency-divided clock makes one round as illustrated in FIG. 2. A cycle in which the initialization circuit 81 generates an initialization signal 82 in the M-cycle period where the phase relationship of the frequency-divided clock makes one round will be described below. The initialization circuit 81 outputs the generated initialization signal 82.

The initialization signal output by the initialization circuit 81 is input to the storage circuit 74 and the storage circuit 75.

While the value obtained by cumulatively adding the value of M'-N' is smaller than the value of M' with respect to the frequency division ratio denominator M' and the frequency division ratio numerator N', which indicates a frequency division ratio for the non-marker part, the non-marker part mask signal generation unit 53 cumulatively adds the value of M'-N' in every cycle of the input clock signal. The cumulative addition means repeated addition. The value obtained by cumulatively adding the value of M'-N' is a value obtained by repeatedly adding the value of M'-N'. The non-marker part mask signal generation unit 53 cumulatively adds the value of M'-N' using the adder 73 and the storage circuit 74. While the value obtained by cumulatively adding the value of M'-N' is smaller than the value of M', the non-marker part mask signal generation unit 53 stores an addition result 77 obtained by cumulatively adding the value of M'-N' in every cycle of the input clock signal in the storage circuit 74. Specifically, when the addition result stored in the storage circuit 74 is smaller than the value of M', the selector circuit 72 outputs a signal M'-N' indicating the value of M'-N'. The signal M'-N' indicating the value of M'-N' is input to the adder 73. In addition, the addition result stored in the storage circuit 74 is input to the adder 73. The adder 73 outputs an addition result, which is a value obtained by adding the addition result stored in the storage circuit 74 and the value of M'-N', as an addition result 77. The addition result 77 output by the adder 73 is input to the storage circuit 74. The storage circuit 74 stores the input value of the addition result 77.

Hereinafter, the selector circuit 72, the adder 73, and the storage circuit 74 will be described in more detail.

The storage circuit 74 is initialized by the initialization circuit 81 as described above. Specifically, the storage circuit 74 receives an initialization signal 82 generated by the initialization circuit 81 as an input. When the initialization signal 82 generated by the initialization circuit 81 is received as an input, the storage circuit 74 initializes the stored value. In this example, the initialization of the stored value means setting the stored value to value 0. The storage circuit 74 stores the value 0 in the initialized state.

In addition, the storage circuit 74 receives the addition result 77 output from the adder 73 as an input. When receiving the addition result 77 as an input, the storage circuit 74 stores a value of the received addition result 77.

Referring to a comparison result 88 indicating a value stored in the storage circuit 75, the selector circuit 72 selects a signal to be output from a signal-N' and a signal M'-N' output from the frequency division ratio setting conversion unit 71 as follows. When the comparison result 88 indicates that the value of M'-N' is larger than or equal to the value of M', the selector circuit 72 selects the signal-N' output from the frequency division ratio setting conversion unit 71. The selector circuit 72 outputs the selected signal-N' to the adder 73 as an addition value 83. As a result, the adder 73 performs an operation of subtracting the value of N' from the addition result 87 stored in the storage circuit 74. When the comparison result 88 indicates that the value of M'-N' is smaller than the value of M', the selector circuit 72 selects the signal M'-N' output from the frequency division ratio setting conversion unit 71. The selector circuit 72 outputs the selected signal M'-N' to the adder 73 as an addition value 83. As a result, the adder 73 performs an operation of adding the value of M'-N' to the addition result 87 stored in the storage circuit 74.

The addition value 83 output from the selector circuit 72 and the addition result 87 output from the storage circuit 74 are input to the adder 73. The addition result 87 is a value stored in the storage circuit 74. The adder 73 adds a value of the addition value 83 and a value of the addition result 87. The adder 73 outputs an addition result, which is a result obtained by adding the value of the addition value 83 and the value of the addition result 87, as an addition result 77. The addition result 77 output from the adder 73 is input to the value comparator 76. The addition result 77 output from the adder 73 is further input to the storage circuit 74. The storage circuit 74 stores the input value of the addition result 77.

As will be described in detail below, the value comparator 76 compares the value of the addition result 77 output from the adder 73 with the value of M'. A result of comparison between the value of the addition result 77 output from the adder 73 and the value of M' in the previous cycle by the value comparator 76 is input to the selector circuit 72 as a comparison result 88.

Immediately after the storage circuit 74 is initialized, the value stored in the storage circuit 74 is value 0. In this case, the value of the comparison result stored in the storage circuit 75 is also initialized. The value of the comparison result stored in the storage circuit 75 becomes value 0 indicating that the value of the addition result 77 is smaller than the value of M' by initialization. In this case, the adder 73 adds the value 0 stored in the storage circuit 74 and the value of M'-N'. The adder 73 outputs an addition result 77 indicating a value of M'-N'. The storage circuit 74 stores the value of M'-N'.

Since the value of M'-N' is smaller than the value of M', the selector circuit 72 selects the value of M'-N' in the next cycle. The adder 73 adds the value of M'-N' stored in the storage circuit 74 and the value of M'-N' output from the selector circuit 72. The adder 73 outputs an addition result 77 indicating a value obtained by adding the value stored in the storage circuit 74 and the value of M'-N'. When the value of the addition result 77 is smaller than the value of M', the adder 73 adds a value of M'-N' to the addition result 77 in the next cycle.

In this manner, after the storage circuit 74 is initialized, while the value of the addition result 77 is smaller than the value of M', the adder 73 repeatedly adds the addition result 87, which is a value of the addition result stored in the storage circuit 74, and the value of M'-N' in each cycle. The addition result 77, which is a result of the addition, is stored in the storage circuit 74. Therefore, after the storage circuit 74 is initialized, while the value of the addition result 77 is smaller than the value of M', the addition result 77 indicating a value obtained by repeatedly adding the value of M'-N' in each cycle is input to the storage circuit 74. In other words, while the value obtained by repeatedly adding the value of M'-N' in each cycle is smaller than the value of M', the storage circuit 74 stores a value obtained by repeatedly adding the value of M'-N' in each cycle (that is, the above-described value obtained by cumulatively adding the value of M'-N').

When the value of the addition result 77 is larger than or equal to the value of M', the adder 73 adds the addition result 87, which is a value of the addition result stored in the storage circuit 74, and the value of −N'. In other words, when the value of the addition result 77 is larger than or equal to the value of M', the adder 73 subtracts the value of N' from the addition result 87, which is a value of the addition result stored in the storage circuit 74.

As described above, the non-marker part mask signal generation unit 53 compares the addition result 77 with the value of M' using the value comparator 76. The non-marker part mask signal generation unit 53 stores a comparison result 78 output by the value comparator 76, that is, the comparison result 78 indicating a result of comparing the addition result 77 with the value of M', in the storage circuit 75. Hereinafter, the value comparator 76 and the storage circuit 75 will be described in more detail.

The addition result 77 and the signal M' are input to the value comparator 76. The value comparator 76 compares a value of the addition result 77 with a value of the signal M' (that is, a value of the frequency division ratio denominator M' in the non-marker part). The value comparator 76 outputs a value indicating a result of the comparison as a comparison result 78. Specifically, the value comparator 76 outputs a value indicating a result of the comparison as a value of the comparison result 78. When the value of the addition result 77 is larger than or equal to the value of the signal M', the value comparator 76 outputs a value (for example, value 1) indicating that the value of the addition result 77 is larger than or equal to the value of the signal M' as a value indicating a result of comparison, that is, a value of the comparison result 78. When the value of the addition result 77 is smaller than the value of the signal M', the value comparator 76 outputs a value (for example, value 0) indicating that the value of the addition result 77 is smaller than the value of the signal M' as a value indicating a result of comparison, that is, a value of a comparison result 78. The comparison result 78 is input to the storage circuit 75. The storage circuit 75 stores the input value of the comparison result 78. The comparison result 78 indicating a result of comparison performed by the value comparator 76 is also output as a mask signal 59. In other words, the value of the comparison result 78 is also output as a value of the mask signal 59.

The comparison result 78 output from the value comparator 76 is input to the storage circuit 75. The storage circuit 75 receives the comparison result 78 as an input. The storage circuit 75 stores a value of the received comparison result 78. The storage circuit 75 outputs the stored value as the comparison result 88.

An initialization signal 82 output by the initialization circuit 81 is further input to the storage circuit 75. The storage circuit 75 receives the initialization signal 82 as an input. When receiving the initialization signal 82, the storage circuit 75 initializes the stored value. In this example, value 0 as a value of a comparison result (the comparison result 78 and the comparison result 88) is a value indicating that the value of the addition result 77 is smaller than the value of M'. In this case, when receiving the initialization signal 82, the storage circuit 75 sets the stored value to the value 0.

As described above, the comparison result 78 indicating a result of comparison performed by the value comparator 76 is also output as a mask signal 59. In other words, the value of the comparison result 78 is also output as a value of the mask signal 59.

As a result, the non-marker part mask signal generation unit 53 outputs the mask signal 59 having a value corresponding to the comparison result 78 by the value comparator 76. Specifically, when the comparison result 78 indicates that the value of the addition result 77 is larger than or equal to the value of M', the non-marker part mask signal generation unit 53 outputs value 1, which is a value indicating that the mask circuit 61 performs a mask operation, as a value of the mask signal 59. When the comparison result 78 indicates that the value of the addition result 77 is smaller than the value of M', the non-marker part mask signal generation unit 53 outputs value 0, which is a value indicating that the mask circuit 61 does not perform a mask operation, as a value of the mask signal 59.

The non-marker part of the frequency-divided clock signal output by the non-marker part mask signal generation unit 53 that performs the above-described operation has the following features. In the following description as well, M and N are a frequency division ratio denominator M and a frequency division ratio numerator N of a frequency division ratio setting to be input as described above.

When M and N satisfy N=M−1, no clock pulse is masked in the non-marker part. Therefore, in a target circuit operated by a generated frequency-divided clock, a marker part including a cycle a clock pulse of which is masked can be easily detected.

When M and N satisfy M/2≤N and N<M−1, there are no two consecutive cycles clock pulses of which are masked in the non-marker part. Therefore, in a target circuit, a marker part including two consecutive cycles clock pulses of which are masked can be easily detected.

When M and N satisfy 2≤N and N<M/2, there are no two consecutive cycles clock pulses of which are not masked in the non-marker part. Therefore, in a target circuit, a marker part including two consecutive cycles clock pulses of which are not masked can be easily detected.

When N satisfies N=1, no clock pulse is not masked in the non-marker part. That is, all clock pulses in the non-marker part are masked. Therefore, in a target circuit, a marker part including cycles clock pulses of which are not masked can be easily detected.

Figure 5:
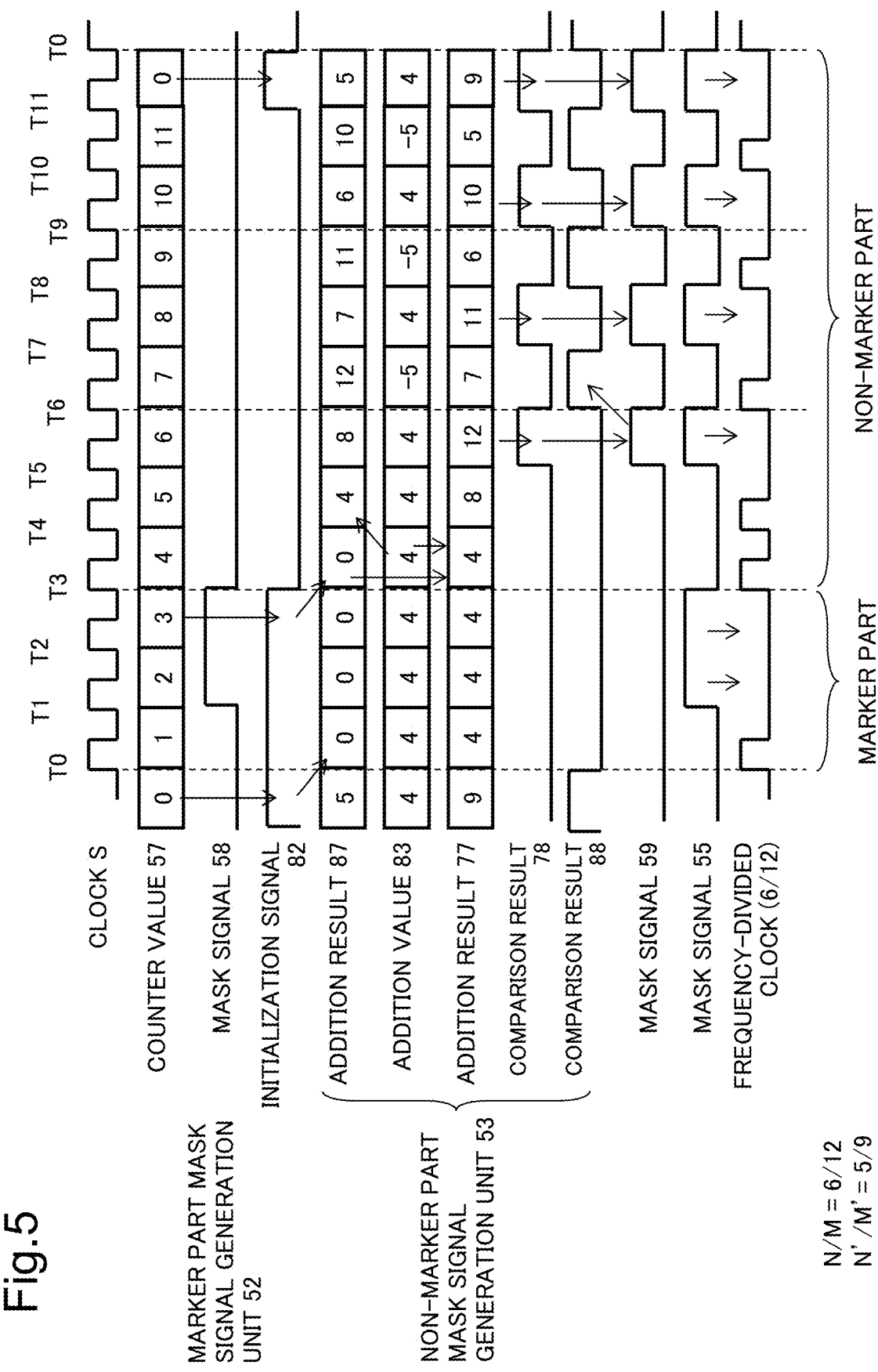
FIG. 5 is a diagram illustrating examples of signals related to a clock signal frequency dividing circuit 10 and shifts of values thereof according to an example embodiment of the present disclosure.

FIG. 5 is a diagram illustrating examples of signals related to the clock signal frequency dividing circuit 10 and shifts of values thereof according to an example embodiment of the present disclosure.

Next, an example of an operation of the clock signal frequency dividing circuit 10 according to the first example embodiment of the present disclosure will be described with reference to FIG. 5. FIG. 5 illustrates examples of signals related to the clock signal frequency dividing circuit 10 and shifts of values in a case where the clock signal frequency dividing circuit 10 divides a frequency of an input clock S at a frequency division ratio N/M=6/12.

A pattern of clock pulses of a frequency-divided clock generated by the clock signal frequency dividing circuit 10 makes one round in M cycles (M=12 cycles in the example illustrated in FIG. 5). In FIG. 5, the 12 cycles for one round are indicated by cycles T0 to T11.

Three cycles that are cycles T0 to T2 belong to a marker part. The marker part mask signal generation unit 52 generates a mask signal for the marker part for the three cycles of cycles T0 to T2. The marker part mask signal generation unit 52 outputs the generated mask signal for the marker part as a mask signal 58.

Specifically, in a case where the frequency division ratio N/M is 6/12 as in the example illustrated in FIG. 5, M and N satisfy M/2≤N and N<M−1. When M and N satisfy M/2<N and N<M−1, the marker part is a marker 12. The marker part mask signal generation unit 52 outputs the following signal during cycles from cycle T0 to cycle T2 as a mask signal to be used for generating a clock pattern of the marker 12. In the cycle TO, the marker part mask signal generation unit 52 outputs value 0, which is a value instructing that a clock pulse should not be masked, as a value of the mask signal 58. In cycles T1 and T2, the marker part mask signal generation unit 52 outputs value 1, which is a value indicating that a clock pulse should be masked, as a value of the mask signal 58.

Nine cycles that are cycles T3 to T11 belong to a non-marker part. The non-marker part mask signal generation unit 53 generates a mask signal for the non-marker part for the nine cycles of cycles T3 to T11. Then, the non-marker part mask signal generation unit 53 outputs the generated mask signal as a mask signal 59.

In a case where the frequency division ratio N/M is 6/12 as in the example illustrated in FIG. 5, M and N satisfy M/2≤N and N<M−1. Since M and N satisfy M/2≤N and N<M−1, the non-marker part mask signal generation unit 53 converts the frequency division ratio N/M indicated by the input frequency division ratio setting into a frequency division ratio N'/M' for the non-marker part when M and N satisfy M/2<N and N<M−1. Specifically, in the example illustrated in FIG. 5, since the frequency division ratio N/M is 6/12, the non-marker part mask signal generation unit 53 converts the frequency division ratio N/M=6/12 into a frequency division ratio N'/M'=(N−1)/(M−3)=5/9 for the non-marker part. The non-marker part mask signal generation unit 53 generates a mask signal for the non-marker part so that a frequency division ratio in the non-marker part for a clock pulse to be output becomes the obtained frequency division ratio N'/M' for the non-marker part. In the example illustrated in FIG. 5, the non-marker part mask signal generation unit 53 generates a mask signal for the non-marker part so that a frequency division ratio in the non-marker part for a clock pulse to be output becomes the obtained frequency division ratio N'/M'=5/9 for the non-marker part. Hereinafter, the non-marker part mask signal generation unit 53 will be described in more detail.

The initialization circuit 81 included in the non-marker part mask signal generation unit 53 initializes the storage circuit 74 and the storage circuit 75 in the cycles T0 to T2, which belong to a marker part, and the cycle T3, which is a first cycle of the non-marker part. Specifically, the initialization circuit 81 outputs a signal indicating a value (for example, value 1) representing initialization as an initialization signal 82 in each of the cycles T0 to T2, which belong to a marker parts, and the cycles T11 to T2, which are cycles immediately before T3 which is a first cycle of the non-marker part. As a result, in the cycles T0 to T3, the storage circuit 74 and the storage circuit 75 are initialized. As a result, in cycles T0 to T3, the addition result 87, which is an output of the storage circuit 74, and the comparison result 88, which is an output of the storage circuit 75, are initialized. Specifically, the value of the addition result 87, which is an output of the storage circuit 74, and the value of the comparison result 88, which is an output of the storage circuit 75, are initialized to a value in the initialized state (for example, value 0). The initial value of the value of the addition result 87 is value 0. The value (for example, value 0) of the comparison result 88 in the initialized state is the above-described value indicating that the value of M'-N' is smaller than the value of M'.

Hereinafter, the cycle T3 and the subsequent cycles will be described. In the cycles T3 to T10, the value of the initialization signal 82 input to the storage circuit 74 and the storage circuit 75 is value 0 indicating that the initialization is not performed (in other words, value 0, which is a value instructing that initialization should not be performed). As described above, in the cycle T11, the value of the initialization signal 82 input to the storage circuit 74 and the storage circuit 75 is value 1 indicating initialization (in other words, value 1, which is a value instructing that initialization should be performed).

In the cycle T3, the value stored in the storage circuit 75 is value 0. A value of the comparison result 88 stored in the storage circuit 75 is input to the selector circuit 72 as a value of the comparison result 88. The value of the comparison result 88 is a value in an initialized state (value 0 in this example). This value indicates that the value of M'-N' is smaller than the value of M'. Therefore, the selector circuit 72 selects the signal M'-N'. Then, the selector circuit 72 outputs the selected signal M'-N' as a signal indicating an addition value 83. Specifically, in the example illustrated in FIG. 5, the frequency division ratio N'/M' for the non-marker part is 5/9. The selector circuit 72 outputs M'-N'=4, which is a value of the selected signal M'-N', as a value of the addition value 83.

The adder 73 adds a value of the addition value 83 and a value of the addition result 87. The adder 73 outputs a value that is a result of adding the value of the addition value 83 and the value of the addition result 87 as a value of an addition result 77. Specifically, in the above-described example, the adder 73 obtains value 4 as an addition result by adding value 4 as the addition value 83 and value 0 as the addition result 87. The adder 73 outputs value 4, which is a result of adding value 4 as the addition value 83 and value 0 as the addition result 87, as a value of the addition result 77.

The value comparator 76 compares the value of the addition result 77 with the value of the signal M'. The value comparator 76 outputs a value indicating a result of the comparison as a value of a comparison result 78. When the value of the addition result 77 is larger than or equal to the value of M', the value comparator 76 outputs a value indicating that the value of the addition result 77 is larger than or equal to the value of M' (value 1 in this example) as a value indicating a result of comparison, that is, a value of a comparison result 78. When the value of the addition result 77 is smaller than the value of M', the value comparator 76 outputs a value (value 0 in this example) indicating that the value of the addition result 77 is smaller than the value of M' as a value indicating a result of comparison, that is, a value of a comparison result 78. The comparison result 78 indicating a result of comparison performed by the value comparator 76 is also output as a mask signal 59.

In the above-described example, the value comparator 76 compares value 4 as the addition result 77 with M'=9, which is a value of the signal M'. Since the value of the addition result 77 is <M', the value of the comparison result is a value (value 0 in this example) indicating that the value of the addition result 77 is smaller than the value of M'. The value comparator 76 outputs value 0, which is a result of comparison between value 4 as the addition result 77 and M'=9, which is a value of the signal M', as a value of the comparison result 78. Note that the value comparator 76 is configured in such a way that a value indicating that the value of M' is larger than the value of the addition result 77 is value 0. As described above, the value comparator 76 also outputs the comparison result 78 as a mask signal 59. As a result, value 0 is output as the value of the mask signal 59.

In addition, the addition result 77 is input to the storage circuit 74. The storage circuit 74 stores a value of the addition result 77. The comparison result 78 is input to the storage circuit 75. The storage circuit 75 stores a value of the comparison result 78. In this example, the storage circuit 74 stores value 4, which is a value of the addition result 77. The storage circuit 75 stores value 0, which is a value of the comparison result 78.

In the next cycle T4, the value stored in the storage circuit 75 is value 0. The value stored in the storage circuit 75 is input to the selector circuit 72 as a value of the comparison result 88.

The value 0 input to the selector circuit as a value of the comparison result 88 is a value indicating that the value of the addition result 77 is smaller than the value of M'. Therefore, the selector circuit 72 selects the signal M'-N'. Then, the selector circuit 72 outputs the selected signal M'-N' as a signal indicating an addition value 83. As described above, in the example illustrated in FIG. 5, the frequency division ratio N'/M' for the non-marker part is 5/9. The selector circuit 72 outputs M'-N'=4, which is a value of the selected signal M'-N', as a value of the addition value 83.

As described above, the value of the addition value 83, which is an output of the selector circuit 72, is input to the adder 73. The value stored in the storage circuit 74 is input to the adder 73 as a value of the addition result 87. The adder 73 adds a value of the addition value 83 and a value of the addition result 87. The adder 73 outputs a value that is a result of adding the value of the addition value 83 and the value of the addition result 87 as a value of an addition result 77. In the above-described example, the storage circuit 74 stores value 4. The adder 73 adds value 4 as the addition value 83 and value 4 as the addition result 87. The adder 73 obtains value 8 as a result of adding value 4 as the addition value 83 and value 4 as the addition result 87. The adder 73 outputs value 8, which is a result of adding value 4 as the addition value 83 and value 4 as the addition result 87, as a value of the addition result 77.

As described above, the value comparator 76 compares the value of the addition result 77 with the value of the signal M'. The value comparator 76 outputs a value indicating a result of the comparison as a value of a comparison result 78. The comparison result 78 indicating a result of comparison performed by the value comparator 76 is also output as a mask signal 59. In the above-described example, the value comparator 76 compares value 8 as the addition result 77 with M'=9, which is a value of the signal M'. Since the value of the addition result 77 is <M', the value comparator 76 outputs value 0, which is a result of comparison between value 4 as the addition result 77 and M'=9, which is a value of the signal M', as a value of the comparison result 78. In the value comparator 76, a value indicating that the value of M' is larger than the value of the addition result 77 is value 0. As described above, the value comparator 76 also outputs the comparison result 78 as a mask signal 59. As a result, value 0 is output as the value of the mask signal 59.

In addition, the storage circuit 74 stores a value of the addition result 77. The storage circuit 75 stores a value of the comparison result 78. In this example, the storage circuit 74 stores value 8 as the addition result 77. The storage circuit 75 stores value 0 as the comparison result 78.

In the cycle T5, the value stored in the storage circuit 75 is value 0. The value stored in the storage circuit 75 is input to the selector circuit 72 as a comparison result 88. In this example, value 0 is input to the selector circuit 72 as the comparison result 88. As described above, value 0 indicates that the value of the addition result 77 is smaller than the value of M'. When the value of the addition result 77 is smaller than the value of M', the selector circuit 72 selects the signal M'-N'. Then, the selector circuit 72 outputs the selected value as an addition value 83. Therefore, the selector circuit 72 selects M'-N'=4. Then, the selector circuit 72 outputs value 4 as a value of the addition value 83.

The addition value 83 output from the selector circuit 72 and the addition result 87 output from the storage circuit 74 are input to the adder 73. The addition result 87 is a value stored in the storage circuit 74. The adder 73 adds a value of the addition value 83 and a value of the addition result 87. The adder 73 outputs a result of adding the value of the addition value 83 and the value of the addition result 87 as an addition result 77. In this example, the adder 73 outputs value 12, which is a result of adding value 4 as the addition value 83 and value 8 as the addition result 87, as a value of an addition result 77.

As described above, the value comparator 76 compares the value of the addition result 77 with the value of M'. Then, the value comparator 76 outputs a value indicating a result of comparison between the value of the addition result 77 and the value of M' as a comparison result 78. In the cycle T5, the value of the addition result 77 is value 12. The value of M' is 9 (that is, the value of M' is represented by M'=9). The value comparator 76 compares value 12 as the addition result 77 with M'=9. In this case, the value of the addition result 77>M' is satisfied. Therefore, the value comparator 76 outputs a value indicating that the value of the addition result 77 is larger than or equal to M' as a value of a comparison result indicating a result of comparison between the value of the addition result 77 and the value of M'. The value indicating that the value of the addition result 77 is larger than or equal to M' is value 1 in this example. Therefore, in this case, the value comparator 76 outputs value 1, which is a comparison result indicating a result of comparison between the value of the addition result 77 and the value of M', as a value of the comparison result 78. The value of the comparison result 78 output by the value comparator 76 is also output as a mask signal 59. As a result, value 1 is output as the value of the mask signal 59.

In addition, as described above, the addition result 77 is input to the storage circuit 74. The storage circuit 74 stores a value of the input addition result. The comparison result 78 is input to the storage circuit 75. The storage circuit 75 stores the input value of the comparison result 78. In the cycle T5, the value of the addition result 77 is value 12. The value of the comparison result 78 is value 1. The storage circuit 74 stores value 12 as the addition result 77. The storage circuit 75 stores value 1 as the comparison result 78.

In the cycle T6, the storage circuit 74 stores a value (value 1 in this example) indicating that the value of the addition result 77 is larger than or equal to M'. Therefore, a value of a comparison result 88 output by the storage circuit 74 is a value (value 1 in this example) indicating that the value of the addition result 77 is larger than or equal to M'. Since the comparison result 88 is value 1, that is, since the value of the addition result 77 is larger than or equal to M', the selector circuit 72 selects the signal-N'. The selector circuit 72 outputs the selected signal −N' as an addition value 83. In this example, the selector circuit 72 outputs the addition value 83 having a value of −N'=−5.

The value of the addition result stored in the storage circuit 74 is value 12. An addition value 83 having a value of −5 and an addition result 87 having a value of 12 are input to the adder 73. The adder 73 receives the addition value 83 having a value of −5 and the addition result 87 having a value of 12 as inputs. The adder 73 adds value −5, which is a value of the addition value 83, and value 12, which is a value of the addition result 87. The adder 73 obtains value 7 as an addition result by adding value −5, which is a value of the addition value 83, and value 12, which is a value of the addition result 87. The adder 73 outputs an addition result 77 indicating value 7, which is the obtained addition result.

The addition result 77 having a value of 7 and the signal M' having a value of 9 are input to the value comparator 76. The value comparator 76 receives the addition result 77 having a value of 7 and the signal M' having a value of 9 as inputs. The value comparator 76 compares value 7, which is a value of the addition result 77, with M'=9, which is a value of the signal M'. Since the value of the addition result 77<M' is satisfied, the value comparator 76 outputs a comparison result 78 indicating a value (value 0 in this example) indicating that the value of the addition result is smaller than the value of M'. The comparison result 78 is also output as a mask signal 59, and as a result, the mask signal 59 having a value of 0 is output as the mask signal 59.

In addition, the addition result 77 having a value of 7 is input to the storage circuit 74. The storage circuit 74 receives the addition result 77 having a value of 7. The storage circuit 74 stores value 7 as the addition result 77. The comparison result 78 having a value of 0 is input to the storage circuit 75. The comparison result 78 having a value of 0 is received. The storage circuit 75 stores value 0 as the comparison result 78.

In the cycle T7, the storage circuit 74 stores a value (value 0 in this example) indicating that the value of the addition result 77 is smaller than M'. Therefore, a value of a comparison result 88 output by the storage circuit 74 is a value (value 0 in this example) indicating that the value of the addition result 77 is smaller than M'. Since the comparison result 88 is value 0, that is, since the value of the addition result 77 is smaller than M', the selector circuit 72 selects the signal M'-N'. The selector circuit 72 outputs the selected signal M'-N' as an addition value 83. In this example, the selector circuit 72 outputs the addition value 83 having a value of M'-N'=4.

The value of the addition result stored in the storage circuit 74 is value 7. An addition value 83 having a value of 4 and an addition result 87 having a value of 7 are input to the adder 73. The adder 73 receives the addition value 83 having a value of 4 and the addition result 87 having a value of 7 as inputs. The adder 73 adds value 4, which is a value of the addition value 83, and value 7, which is a value of the addition result 87. The adder 73 obtains value 11 as an addition result by adding value 4, which is a value of the addition value 83, and value 7, which is a value of the addition result 87. The adder 73 outputs an addition result 77 indicating value 11, which is the obtained addition result.

The addition result 77 having a value of 11 and the signal M' having a value of 9 are input to the value comparator 76. The value comparator 76 receives the addition result 77 having a value of 11 and the signal M' having a value of 9 as inputs. The value comparator 76 compares value 11, which is a value of the addition result 77, with M'=9, which is a value of the signal M'. Since the value of the addition result 77>M' is satisfied, the value comparator 76 outputs a comparison result 78 indicating a value (value 1 in this example) indicating that the value of the addition result is larger than or equal to the value of M'. The comparison result 78 is also output as a mask signal 59, and as a result, the mask signal 59 having a value of 1 is output as the mask signal 59. In addition, the addition result 77 having a value of 11 is input to the storage circuit 74. The storage circuit 74 receives the addition result 77 having a value of 11. The storage circuit 74 stores value 11 as the addition result 77. The comparison result 78 having a value of 1 is input to the storage circuit 75. The comparison result 78 having a value of 1 is received. The storage circuit 75 stores value 1 as the comparison result 78.

In the cycle T8, the storage circuit 74 stores a value (value 1 in this example) indicating that the value of the addition result 77 is larger than or equal to M'. Therefore, a value of a comparison result 88 output by the storage circuit 74 is a value (value 1 in this example) indicating that the value of the addition result 77 is larger than or equal to M'. Since the comparison result 88 is value 1, that is, since the value of the addition result 77 is larger than or equal to M', the selector circuit 72 selects the signal-N'. The selector circuit 72 outputs the selected signal −N' as an addition value 83. In this example, the selector circuit 72 outputs the addition value 83 having a value of −N'=−5.

The value of the addition result stored in the storage circuit 74 is value 11. An addition value 83 having a value of −5 and an addition result 87 having a value of 11 are input to the adder 73. The adder 73 receives the addition value 83 having a value of −5 and the addition result 87 having a value of 11 as inputs. The adder 73 adds value −5, which is a value of the addition value 83, and value 11, which is a value of the addition result 87. The adder 73 obtains value 6 as an addition result by adding value −5, which is a value of the addition value 83, and value 11, which is a value of the addition result 87. The adder 73 outputs an addition result 77 indicating value 6, which is the obtained addition result.

The addition result 77 having a value of 6 and the signal M' having a value of 9 are input to the value comparator 76. The value comparator 76 receives the addition result 77 having a value of 6 and the signal M' having a value of 9 as inputs. The value comparator 76 compares value 6, which is a value of the addition result 77, with M'=9, which is a value of the signal M'. Since the value of the addition result 77<M' is satisfied, the value comparator 76 outputs a comparison result 78 indicating a value (value 0 in this example) indicating that the value of the addition result is smaller than the value of M'. The comparison result 78 is also output as a mask signal 59, and as a result, the mask signal 59 having a value of 0 is output as the mask signal 59.

In addition, the addition result 77 having a value of 6 is input to the storage circuit 74. The storage circuit 74 receives the addition result 77 having a value of 6. The storage circuit 74 stores value 6 as the addition result 77. The comparison result 78 having a value of 0 is input to the storage circuit 75. The comparison result 78 having a value of 0 is received. The storage circuit 75 stores value 0 as the comparison result 78.

In the cycle T9, the storage circuit 74 stores a value (value 0 in this example) indicating that the value of the addition result 77 is smaller than M'. Therefore, a value of a comparison result 88 output by the storage circuit 74 is a value (value 0 in this example) indicating that the value of the addition result 77 is smaller than M'. Since the comparison result 88 is value 0, that is, since the value of the addition result 77 is smaller than M', the selector circuit 72 selects the signal M'-N'. The selector circuit 72 outputs the selected signal M'-N' as an addition value 83. In this example, the selector circuit 72 outputs the addition value 83 having a value of M'-N'=4.

The value of the addition result stored in the storage circuit 74 is value 6. An addition value 83 having a value of 4 and an addition result 87 having a value of 6 are input to the adder 73. The adder 73 receives the addition value 83 having a value of 4 and the addition result 87 having a value of 6 as inputs. The adder 73 adds value 4, which is a value of the addition value 83, and value 6, which is a value of the addition result 87. The adder 73 obtains value 10 as an addition result by adding value 4, which is a value of the addition value 83, and value 6, which is a value of the addition result 87. The adder 73 outputs an addition result 77 indicating value 10, which is the obtained addition result.

The addition result 77 having a value of 10 and the signal M' having a value of 9 are input to the value comparator 76. The value comparator 76 receives the addition result 77 having a value of 10 and the signal M' having a value of 9 as inputs. The value comparator 76 compares value 10, which is a value of the addition result 77, with M'=9, which is a value of the signal M'. Since the value of the addition result 77>M' is satisfied, the value comparator 76 outputs a comparison result 78 indicating a value (value 1 in this example) indicating that the value of the addition result is larger than or equal to the value of M'. The comparison result 78 is also output as a mask signal 59, and as a result, the mask signal 59 having a value of 1 is output as the mask signal 59. In addition, the addition result 77 having a value of 10 is input to the storage circuit 74. The storage circuit 74 receives the addition result 77 having a value of 10. The storage circuit 74 stores value 10 as the addition result 77. The comparison result 78 having a value of 1 is input to the storage circuit 75. The comparison result 78 having a value of 1 is received. The storage circuit 75 stores value 1 as the comparison result 78.

In the cycle T10, the storage circuit 74 stores a value (value 1 in this example) indicating that the value of the addition result 77 is larger than or equal to M'. Therefore, a value of a comparison result 88 output by the storage circuit 74 is a value (value 1 in this example) indicating that the value of the addition result 77 is larger than or equal to M'.

Since the comparison result 88 is value 1, that is, since the value of the addition result 77 is larger than or equal to M', the selector circuit 72 selects the signal-N'. The selector circuit 72 outputs the selected signal –N' as an addition value 83. In this example, the selector circuit 72 outputs the addition value 83 having a value of –N'=–5.

The value of the addition result stored in the storage circuit 74 is value 10. An addition value 83 having a value of –5 and an addition result 87 having a value of 10 are input to the adder 73. The adder 73 receives the addition value 83 having a value of –5 and the addition result 87 having a value of 10 as inputs. The adder 73 adds value –5, which is a value of the addition value 83, and value 10, which is a value of the addition result 87. The adder 73 obtains value 5 as an addition result by adding value –5, which is a value of the addition value 83, and value 10, which is a value of the addition result 87. The adder 73 outputs an addition result 77 indicating value 5, which is the obtained addition result.

The addition result 77 having a value of 5 and the signal M' having a value of 9 are input to the value comparator 76. The value comparator 76 receives the addition result 77 having a value of 5 and the signal M' having a value of 9 as inputs. The value comparator 76 compares value 5, which is a value of the addition result 77, with M'=9, which is a value of the signal M'. Since the value of the addition result 77<M' is satisfied, the value comparator 76 outputs a comparison result 78 indicating a value (value 0 in this example) indicating that the value of the addition result is smaller than the value of M'. The comparison result 78 is also output as a mask signal 59, and as a result, the mask signal 59 having a value of 0 is output as the mask signal 59. In addition, the addition result 77 having a value of 5 is input to the storage circuit 74. The storage circuit 74 receives the addition result 77 having a value of 5. The storage circuit 74 stores value 5 as the addition result 77. The comparison result 78 having a value of 0 is input to the storage circuit 75. The comparison result 78 having a value of 0 is received. The storage circuit 75 stores value 0 as the comparison result 78.

In the cycle T11, the storage circuit 74 stores a value (value 0 in this example) indicating that the value of the addition result 77 is smaller than M'. Therefore, a value of a comparison result 88 output by the storage circuit 74 is a value (value 0 in this example) indicating that the value of the addition result 77 is smaller than M'. Since the comparison result 88 is value 0, that is, since the value of the addition result 77 is smaller than M', the selector circuit 72 selects the signal M'-N'. The selector circuit 72 outputs the selected signal M'-N' as an addition value 83. In this example, the selector circuit 72 outputs the addition value 83 having a value of M'-N'=4.

The value of the addition result stored in the storage circuit 74 is value 5. An addition value 83 having a value of 4 and an addition result 87 having a value of 5 are input to the adder 73. The adder 73 receives the addition value 83 having a value of 4 and the addition result 87 having a value of 5 as inputs. The adder 73 adds value 4, which is a value of the addition value 83, and value 5, which is a value of the addition result 87. The adder 73 obtains value 9 as an addition result by adding value 4, which is a value of the addition value 83, and value 5, which is a value of the addition result 87. The adder 73 outputs an addition result 77 indicating value 9, which is the obtained addition result.

The addition result 77 having a value of 9 and the signal M' having a value of 9 are input to the value comparator 76. The value comparator 76 receives the addition result 77 having a value of 9 and the signal M' having a value of 9 as inputs. The value comparator 76 compares value 9, which is a value of the addition result 77, with M'=9, which is a value of the signal M'. Since the value of the addition result 77≥M' is satisfied, the value comparator 76 outputs a comparison result 78 indicating a value (value 1 in this example) indicating that the value of the addition result is larger than or equal to the value of M'. The comparison result 78 is also output as a mask signal 59, and as a result, the mask signal 59 having a value of 1 is output as the mask signal 59.

As described above, in the cycle T11, the value of the initialization signal 82 output from the initialization circuit 81 is value 1, which is a value instructing initialization. Therefore, upon receiving the initialization signal 82, each of the storage circuit 74 and the storage circuit 75, to which the initialization signal 82 is input, initializes the stored value. In other words, upon receiving the initialization signal 82, the storage circuit 74 and the storage circuit 75 set the stored value to value 0. Then, the storage circuit 74 and the storage circuit 75 store value 0.

By the above operation, the non-marker part mask signal generation unit 53 outputs value 1 indicating that a clock pulse should be masked as a value of the mask signal 59 in the cycles T5, T7, T9, and T11. among the cycles T3 to T11, which belong to the non-marker part. In addition, the non-marker part mask signal generation unit 53 outputs value 0 instructing that a clock pulse should not be masked as the value of the mask signal 59 in the other cycles T3, T4, T6, T8, and T10 among the cycles T3 to T11, which belong to the non-marker part.

The selection circuit 54 included in the clock signal frequency dividing circuit 10 selects a mask signal 58 output from the marker part mask signal generation unit 52 in the cycles T0 to T2, which belong to the marker part. The selection circuit 54 outputs the selected mask signal as a mask signal 55. The selection circuit 54 outputs the mask signal 58 output from the marker part mask signal generation unit 52 as the mask signal 55 in the cycles T0 to T2, which belong to the marker part. The selection circuit 54 selects a mask signal 59 output from the non-marker part mask signal generation unit 53 in the cycles T3 to T11, which belong to the non-marker part. The selection circuit 54 outputs the mask signal 59 output from the non-marker part mask signal generation unit 53 as the mask signal 55 in the cycles T3 to T11, which belong to the non-marker part. Therefore, in the cycles T1, T2, T5, T7, T9, and T11, value 1 instructing that a clock pulse should be masked is output as a value of the mask signal 55. Then, in the other cycles (that is, cycles different from the cycles T1, T2, T5, T7, T9, and T11), value 0 instructing that a clock pulse should not be masked is output as a value of the mask signal 55.

Referring to the mask signal 55, the mask circuit 61 determines a clock pulse to be masked among the clock pulses of the input clock S. In other words, the mask circuit 61 masks a clock pulse of a cycle when the value of the mask signal 55 is a value indicating the clock pulse of the cycle is masked among the clock pulses of the input clock S. In this example, the mask circuit 61 masks clock pulses in the cycles T1, T2, T5, T7, T9, and T11 among the clock pulses of the input clock S. The mask circuit 61 does not mask clock pulses in the other cycles (that is, cycles different from the cycles T1, T2, T5, T7, T9, and T11) among the clock pulses of the input clock S. As a result, a frequency-divided clock in which clock pulses are masked in the six cycles among the 12 cycles where the frequency dividing pattern makes one round, that is, a frequency-divided clock at a frequency division ratio N/M=6/12, is output.

Next, an example of a timing of communication between the circuit A and the circuit B according to the present example embodiment will be described with reference to FIG. 6.

Figure 6:
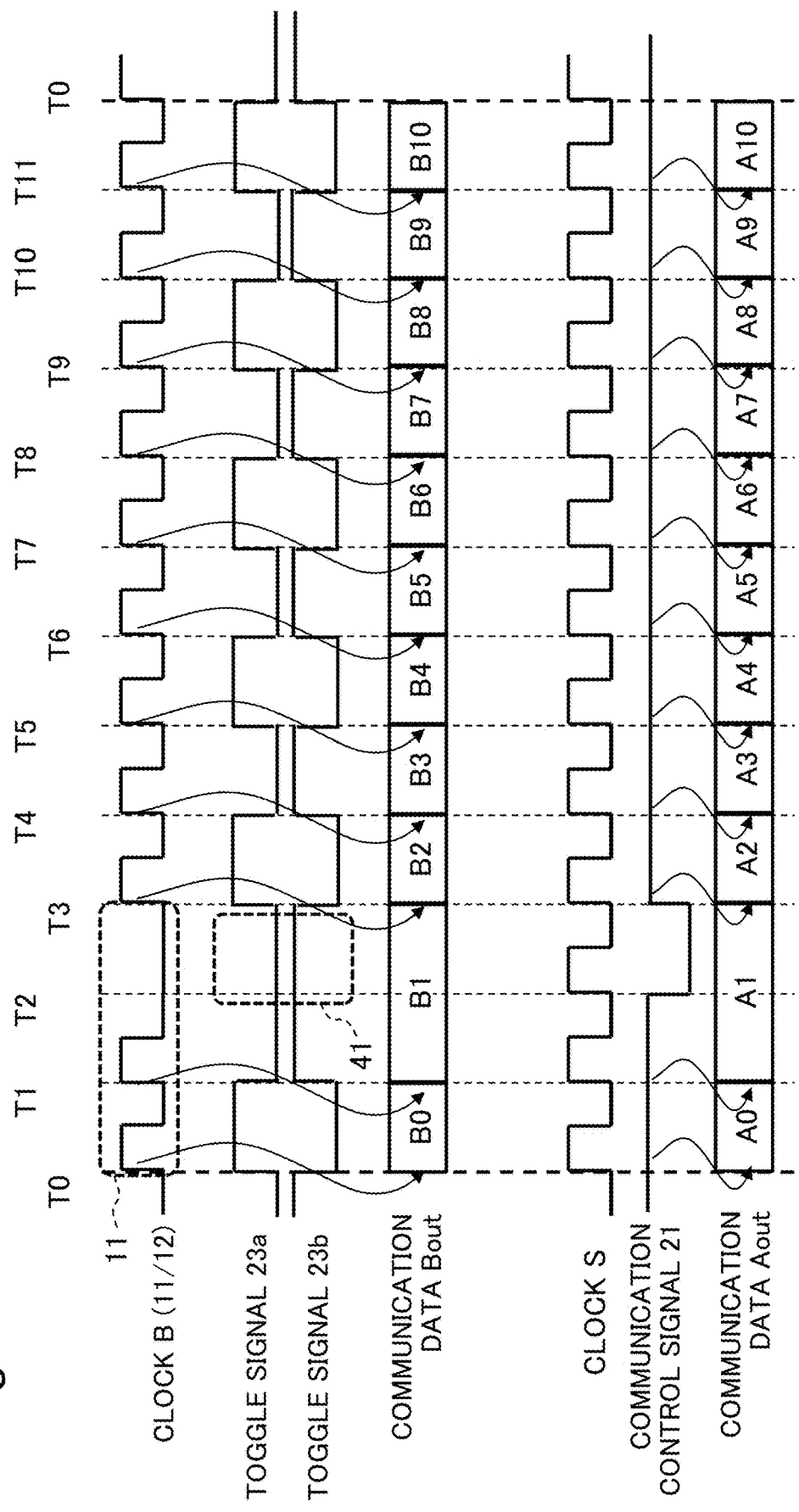
FIG. 6 is a diagram illustrating an example of a timing of communication between a circuit A and a circuit B according to an example embodiment of the present disclosure.

FIG. 6 is a diagram illustrating an example of a timing of communication between the circuit A and the circuit B according to an example embodiment of the present disclosure.

In FIG. 6, a signal such as a clock and a communication timing when communication is performed between the circuit A operating with the clock S and the circuit B operating with the clock B are exemplified. In the example illustrated in FIG. 6, the clock B is a clock signal generated by dividing the frequency of the clock S by the clock signal frequency dividing circuit 10 at a frequency division ratio N/M=11/12. In this example, a pattern of clock pulses of the clock B generated by the clock signal frequency dividing circuit 10 makes one round in M=12 cycles. In FIG. 6, the 12 cycles for one round are indicated by cycles T0 to T11.

Three cycles that are cycles T0 to T2 belong to the marker part. The frequency division ratio N/M is N/M=1/12. That is, M and N indicating the frequency division ratio satisfy N=M−1. As described above, the marker part in this case is the marker 11.

The toggle signal generation circuit 22 receives the clock B as an input. Then, the toggle signal generation circuit 22 generates a toggle signal 23 a value of which is inverted for each clock pulse of the clock B. The toggle signal generation circuit 22 outputs the generated toggle signal 23.

In other words, the toggle signal generation circuit 22 outputs a toggle signal having one of two values (for example, 0 and 1). The toggle signal generation circuit 22 keeps the value of the generated toggle signal the same while no clock pulse is received. Then, when receiving a clock pulse, the toggle signal generation circuit 22 changes (that is, switches) the value of the toggle signal from the value before receiving the clock pulse to the other value. In a case where the value of the toggle signal is, for example, 1, the toggle signal generation circuit 22 switches the value of the toggle signal from 1 to 0 upon receiving a clock pulse. In addition, in a case where the value of the toggle signal is, for example, 0, the toggle signal generation circuit 22 switches the value of the toggle signal from 0 to 1 upon receiving a clock pulse. If initial values of toggle signals are identical and clock pulses received by the toggle signal generation circuit 22 are identical, the toggle signals generated by the toggle signal generation circuit 22 are identical. However, if initial values of toggle signals are different, the toggle signals generated by the toggle signal generation circuit 22 are different even if the clock pulses received by the toggle signal generation circuit 22 are identical. That is, concerning the signal transition (that is, the value transition) of the toggle signal 23, there are two cases each corresponding to the initial value of the toggle signal 23. In other words, as toggle signals 23, there may be two toggle signals that are different according to the initial values, that is, a toggle signal when the initial value is 1 and a toggle signal when the initial value is 0.

In FIG. 6, the two toggle signals having different initial values are illustrated as a toggle signal 23*a* and a toggle signal 23*b*. The toggle signal generation circuit 22 may generate either the toggle signal 23*a* or the toggle signal 23*b* as a toggle signal output as the toggle signal 23. In the present description, in a case where the toggle signal 23*a* and the toggle signal 23*b* are not distinguished from each other, the toggle signal 23*a* and the toggle signal 23*b* are collectively referred to as a toggle signal 23. In the example illustrated in FIG. 6, the cycle in which both the toggle signal 23*a* and the toggle signal 23*b* do not toggle is only the cycle T2. In the example illustrated in FIG. 6, the marker part is a marker 11. A portion in the cycle T2 of the toggle signal 23 (that is, a portion in a cycle in which the toggle signal 23 does not toggle) is set as a toggle signal marker 41, which is a toggle signal marker of the marker 11 (hereinafter, also referred to as a toggle signal marker). The toggle signal marker (that is, the toggle signal marker) is a pattern of a signal existing only in a toggle signal marker portion of the toggle signal.

The toggle signal marker (in other words, the pattern of the signal in the toggle signal marker) in this case may be represented by, for example, information indicating a shift in whether the value transitions in one or more cycles. The information indicating the shift in whether the value transitions in one or more cycles is information indicating whether the value transitions in one cycle or information indicating a shift in whether the value transitions in a plurality of consecutive cycles. The information indicating the shift in whether the value transitions in one or more cycles is, for example, information indicating that a value transition is absent (hereinafter referred to as absence of transition) and information indicating that a value transition is present (hereinafter referred to as presence of transition). The information indicating the shift in whether the value transitions in two consecutive cycles is, for example, information indicating "absence of transition and absence of transition", information indicating "presence of transition and presence of transition", or the like. Then, when a shift has occurred in whether the value of the toggle signal transitions, which is indicated by a toggle signal marker, the communication control circuit 20 detects a portion where the shift has occurred in whether the value of the toggle signal transitions as a toggle signal marker.

Therefore, the communication control circuit 20 included in the circuit A can know a timing of the marker part by identifying the toggle signal marker 41 with reference to the toggle signal 23. Specifically, the communication control circuit 20 detects a toggle signal marker in the toggle signal 23. When the toggle signal marker 41 is detected, the communication control circuit 20 specifies a cycle in which the toggle signal marker 41 is detected in the toggle signal 23. When M and N indicating the frequency division ratio satisfy N=M−1 and the marker part is the marker 11, the toggle signal marker is the toggle signal marker 41. A relationship between the timing of the head of the marker part and the timing of the cycle in which the toggle signal marker is present may be given to the communication control circuit in advance for each type of toggle signal marker. The cycle in which the toggle signal marker is present is, for example, the timing of the first cycle of the toggle signal marker. The timing of the cycle in which the toggle signal marker is present is also referred to as the timing of the toggle signal marker. The types of toggle signal markers are, for example, a toggle signal marker 41, and a toggle signal marker 42 to a toggle signal marker 44 to be described below. Note that, in a case where the circuit A communicates with only one circuit B, a toggle signal marker of a toggle signal generated from the frequency-divided clock signal at the frequency division ratio of the frequency-divided clock signal supplied to the circuit B may be provided to the communication control circuit 20. Even in a case where the circuit A communicates with a plurality of circuits B to which the frequency-divided clock signals having the same frequency division ratio are supplied, toggle signal markers of toggle signals generated from the frequency-divided clock signals at the frequency division ratio of the frequency-divided clock signals supplied to the circuits B may be provided to the communication control circuit 20. The relationship between the timing of the head of the marker part and the timing of the cycle in which the toggle signal marker is present is a magnitude of a difference between the timing of the head of the marker part and the timing of the cycle in which the toggle signal marker is present. The magnitude of the difference may be indicated by, for example, the number of cycles. The head of the marker part is a head of a periodic pattern signal that is a signal having a length in which the phase relationship between the clock S and the clock B makes one round. In other words, for example, the communication control circuit 20 specifies a timing of a head of a periodic pattern signal from the timing of the cycle of the detected toggle signal marker, and the relationship between the timing of the head of the marker part and the timing of the toggle signal marker 41. As a result, the communication control circuit can identify the timing of the head of the period in which the phase relationship between the clock S and the clock B makes one round.

Furthermore, the communication control circuit 20 can recognize (in other words, specify) a timing at which clock pulses are present in both the clock S and the clock B by referring to the frequency division ratio setting 30, which is information for setting a frequency division ratio of the clock B. As described above, the clock B is generated by masking some of the clock pulses of the clock S. Therefore, in a cycle (in other words, at a timing) in which a clock pulse is present in the clock B having the frequency division ratio specified by the frequency division ratio setting 30, clock pulses are present in both the clock S and the clock B. The communication control circuit 20 generates a signal indicating the recognized timing at which the clock pulses are present in both the clock S and the clock B as a communication control signal 21 indicating a timing at which the circuit A communicates with the circuit B. The communication control circuit 20 outputs the generated signal indicating the recognized timing at which the clock pulses are present in both the clock S and clock B as a communication control signal 21 indicating a timing at which the circuit A communicates with the circuit B.

Specifically, in the example illustrated in FIG. 6, the communication control circuit 20 generates a signal having a value of 1 as a communication control signal 21 at the timings T0, T1, T3, T4, T5, T6, T7, T8, T9, T10, and T11. In this example, as described above, the timing at which the value of the communication control signal 21 is 1 is a timing at which clock pulses are present in both the clock S and the clock B. Then, the communication control circuit 20 outputs the generated signal having a value of 1 as a communication control signal 21 at the timings T0, T1, T3, T4, T5, T6, T7, T8, T9, T10, and T11.

Referring to the communication control signal 21, the circuit A communicates with the circuit B at a timing when clock pulses are present in both the clock S and the clock B, which is indicated by the communication control signal 21. That is, the circuit A outputs a signal Aout indicating data transmitted to the circuit B in communication with the circuit B at the timing when clock pulses are present in both the clock S and the clock B, which is indicated by the communication control signal 21. The circuit A receives, as an input, a signal Bout indicating data output from the circuit B in communication with the circuit B at the timing when clock pulses are present in both the clock S and the clock B, which is indicated by the communication control signal 21. Specifically, in the example illustrated in FIG. 6, the circuit A outputs a signal Aout indicating data transmitted to the circuit B in communication with the circuit B at the timings T0, T1, T3, T4, T5, T6, T7, T8, T9, T10, and T11 indicated by the communication control signal 21. Further, referring to the communication control signal 21, the circuit A receives, as an input, a signal Bout indicating data output from the circuit B in communication with the circuit B at the timings T0, T1, T3, T4, T5, T6, T7, T8, T9, T10, and T11 indicated by the communication control signal 21.

On the other hand, the circuit B communicates with the circuit A at a timing when a clock pulse is present in the clock B. That is, the circuit B outputs a signal Bout indicating data transmitted to the circuit A in communication with the circuit A at the timing when the clock pulse is present in the clock B. Then, the circuit B receives, as an input, a signal Aout indicating data output from the circuit A in communication with the circuit A at the timing when a clock pulse is present in the clock B. In the example illustrated in FIG. 6, the timings at which clock pulses are present in the clock B are the timings T0, T1, T3, T4, T5, T6, T7, T8, T9, T10, and T11. The circuit B outputs a signal Bout indicating data transmitted to the circuit A in communication with the circuit A at the timings T0, T1, T3, T4, T5, T6, T7, T8, T9, T10, and T11. The circuit B receives a signal Aout, which is communication data output from the circuit A, as an input at the timings T0, T1, T3, T4, T5, T6, T7, T8, T9, T10, and T11.

Through the above operation, the circuit A and the circuit B can perform communication operations at all timings at which the circuit B operates with clock pulses being present in the clock B.

Next, another example of a timing of communication between the circuit A and the circuit B according to the present example embodiment will be described with reference to FIG. 7.

Figure 7:
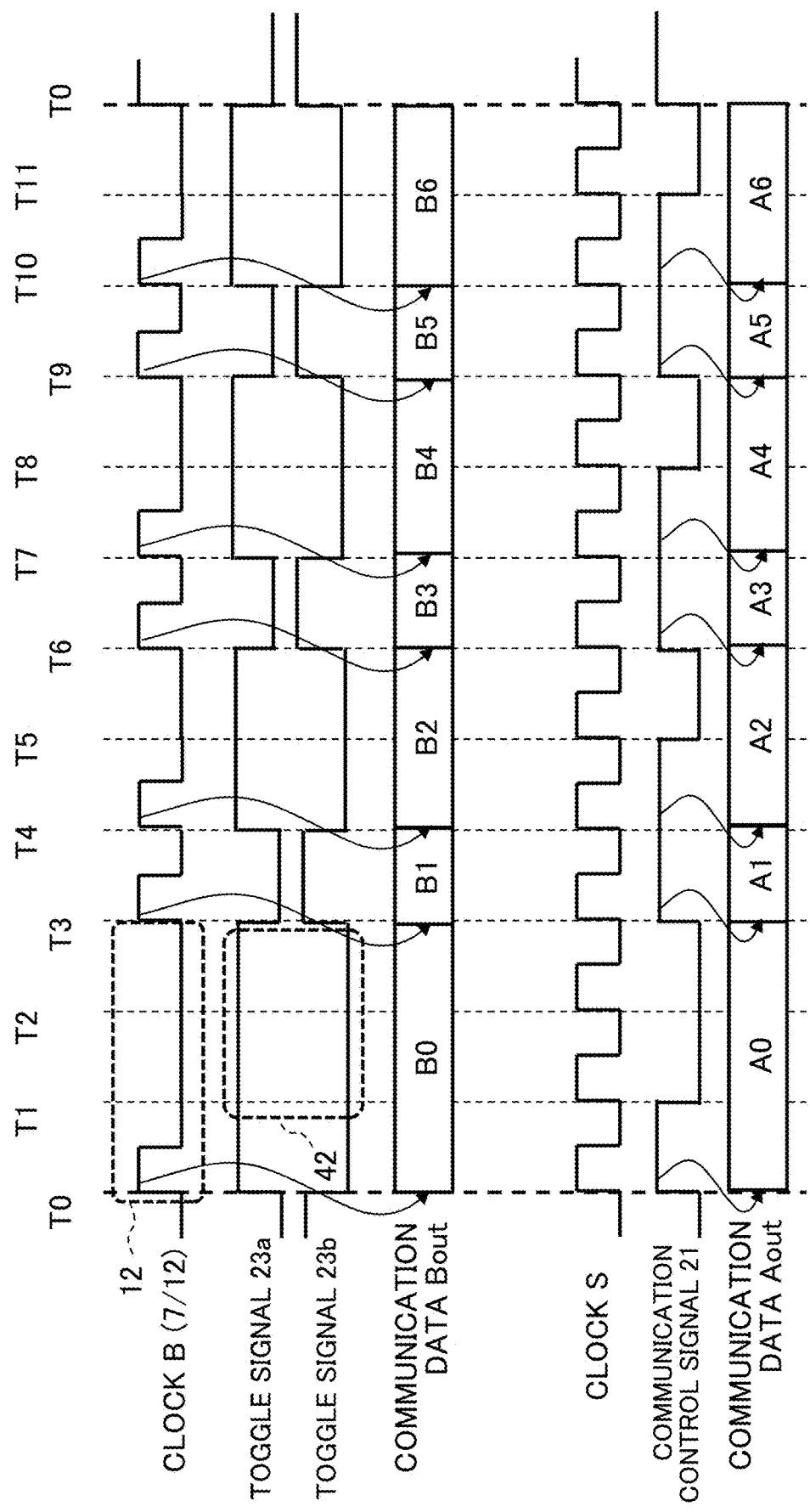
FIG. 7 is a diagram illustrating an example of a timing of communication between a circuit A and a circuit B according to an example embodiment of the present disclosure.

FIG. 7 is a diagram illustrating an example of a timing of communication between the circuit A and the circuit B according to an example embodiment of the present disclosure.

In FIG. 7, a signal such as a clock and a communication timing when communication is performed between the circuit A operating with the clock S and the circuit B operating with the clock B are exemplified. In the example illustrated in FIG. 7, the clock B is a clock signal generated by dividing the frequency of the clock S by the clock signal frequency dividing circuit 10 at a frequency division ratio N/M=7/12. In this example, a pattern of clock pulses of the clock B generated by the clock signal frequency dividing circuit 10 makes one round in M=12 cycles. In FIG. 7, the 12 cycles for one round are indicated by cycles T0 to T11.

In the example of FIG. 7, three cycles that are cycles T0 to T2 belong to a marker part. The frequency division ratio is a frequency division ratio N/M=7/12. Therefore, M and N indicating the frequency division ratio satisfy M/2≤N and N<M−1. Therefore, the marker part in this case is the marker 12.

The toggle signal generation circuit 22 receives the clock B as an input. Then, the toggle signal generation circuit 22 generates and outputs a toggle signal 23 a value of which is inverted for each clock pulse of the clock B. As described above, concerning the signal transition (that is, the value transition) of the toggle signal 23, there are two cases each corresponding to the initial value of the toggle signal 23. In other words, as toggle signals 23, there may be two toggle signals that are different according to the initial values, that is, a toggle signal when the initial value is 1 and a toggle signal when the initial value is 0.

In FIG. 7, the two toggle signals having different initial values are illustrated as a toggle signal 23a and a toggle signal 23b. In the example illustrated in FIG. 7, the two consecutive cycles in which both the toggle signal 23a and the toggle signal 23b do not toggle are only the cycles T1 and T2. In the example illustrated in FIG. 7, the marker part is a marker 12. A portion in the cycles T1 and T2 of the toggle signal 23 (that is, a portion in two consecutive cycles of the toggle signal where the toggle signal does not toggle during the two consecutive cycles) is set as a toggle signal marker 42 of the marker 12.

Therefore, the communication control circuit 20 included in the circuit A specifies a timing of the marker part by identifying the toggle signal marker 42 with reference to the toggle signal 23. Specifically, the communication control circuit 20 detects a toggle signal marker in the toggle signal 23. When the toggle signal marker 42 is detected, the communication control circuit 20 specifies a cycle in which the toggle signal marker 42 is detected in the toggle signal 23. The communication control circuit 20 specifies a timing of the head of the marker part (the marker 12 in this case) from the relationship between the timing of the head of the marker 12 and the timing of the cycle in which the toggle signal marker 42 is present. As described above, the relationship between the timing of the head of the marker part and the timing of the toggle signal marker of the toggle signal generated from the marker part is provided to the communication control circuit 20 in advance. The head of the marker part is a head of a period where the phase relationship between the clock S and the clock B makes one round. As a result, the communication control circuit 20 can identify the timing of the head of the period in which the phase relationship between the clock S and the clock B makes one round.

Furthermore, the communication control circuit 20 can recognize a timing at which clock pulses are present in both the clock S and the clock B by referring to the frequency division ratio setting 30, which is information for setting a frequency division ratio of the clock B. As described above, the clock B is generated by masking some of the clock pulses of the clock S. Therefore, in a cycle (in other words, at a timing) in which a clock pulse is present in the clock B having the frequency division ratio specified by the frequency division ratio setting 30, clock pulses are present in both the clock S and the clock B. The communication control circuit 20 generates a signal indicating the recognized timing at which the clock pulses are present in both the clock S and the clock B as a communication control signal 21 indicating a timing at which the circuit A communicates with the circuit B. The communication control circuit 20 outputs the generated signal indicating the recognized timing at which the clock pulses are present in both the clock S and clock B as a communication control signal 21 indicating a timing at which the circuit A communicates with the circuit B.

Specifically, in the example illustrated in FIG. 7, the communication control circuit 20 generates a signal having a value of 1 as a communication control signal 21 at the timings T0, T3, T4, T6, T7, T9, and T10. In this example, as described above, the timing at which the value of the communication control signal 21 is 1 is a timing at which clock pulses are present in both the clock S and the clock B. Then, the communication control circuit 20 outputs the generated signal having a value of 1 as a communication control signal 21 at the timings T0, T3, T4, T6, T7, T9, and T10.

As described above, referring to the communication control signal 21, the circuit A communicates with the circuit B at a timing when clock pulses are present in both the clock S and the clock B, which is indicated by the communication control signal 21. That is, the circuit A outputs a signal Aout indicating data transmitted to the circuit B in communication with the circuit B at the timing when clock pulses are present in both the clock S and the clock B, which is indicated by the communication control signal 21. The circuit A receives, as an input, a signal Bout indicating data output from the circuit B in communication with the circuit B at the timing when clock pulses are present in both the clock S and the clock B, which is indicated by the communication control signal 21. Specifically, in the example illustrated in FIG. 7, the circuit A outputs a signal Aout indicating data transmitted to the circuit B in communication with the circuit B at the timings T0, T3, T4, T6, T7, T9, and T10 indicated by the communication control signal 21. Further, referring to the communication control signal 21, the circuit A receives, as an input, a signal Bout indicating data output from the circuit B in communication with the circuit B at the timings T0, T3, T4, T6, T7, T9, and T10 indicated by the communication control signal 21.

As described above, the circuit B communicates with the circuit A at a timing when a clock pulse is present in the clock B. That is, the circuit B outputs a signal Bout indicating data transmitted to the circuit A in communication with the circuit A at the timing when the clock pulse is present in the clock B. Then, the circuit B receives, as an input, a signal Aout indicating data output from the circuit A in communication with the circuit A at the timing when a clock pulse is present in the clock B. In the example illustrated in FIG. 7, the timings at which clock pulses are present in the clock B are the timings T0, T3, T4, T6, T7, T9, and T10. The circuit B outputs a signal Bout indicating data transmitted to the circuit A in communication with the circuit A at the timings T0, T3, T4, T6, T7, T9, and T10. The circuit B receives a signal Aout, which is communication data output from the circuit A, as an input at the timings TO, T3, T4, T6, T7, T9, and T10.

Through the above operation, the circuit A and the circuit B can perform communication operations at all timings at which the circuit B operates with clock pulses being present in the clock B.

In the example illustrated in FIG. 7, the frequency division ratio is a frequency division ratio N/M=7/12. However, also in a case where the frequency division ratio is another frequency division ratio in which M and N satisfy M/2≤N and N<M−1, the communication control circuit 20 detects a toggle signal marker 42 as a toggle signal marker from the toggle signal. Then, the communication control circuit 20 specifies a head of a marker part, that is, a head of a period where the phase relationship between the clock S and the clock B makes one round, in the same manner as in the case where the frequency division ratio is a frequency division ratio N/M=7/12. Then, the communication control circuit 20 specifies a timing at which clock pulses are present in both the clock S and the clock B according to the frequency division ratio. Note that the timing at which clock pulses are present in both the clock S and the clock B varies depending on the frequency division ratio.

Next, another example of a timing of communication between the circuit A and the circuit B according to the present example embodiment will be described with reference to FIG. 8.

Figure 8:
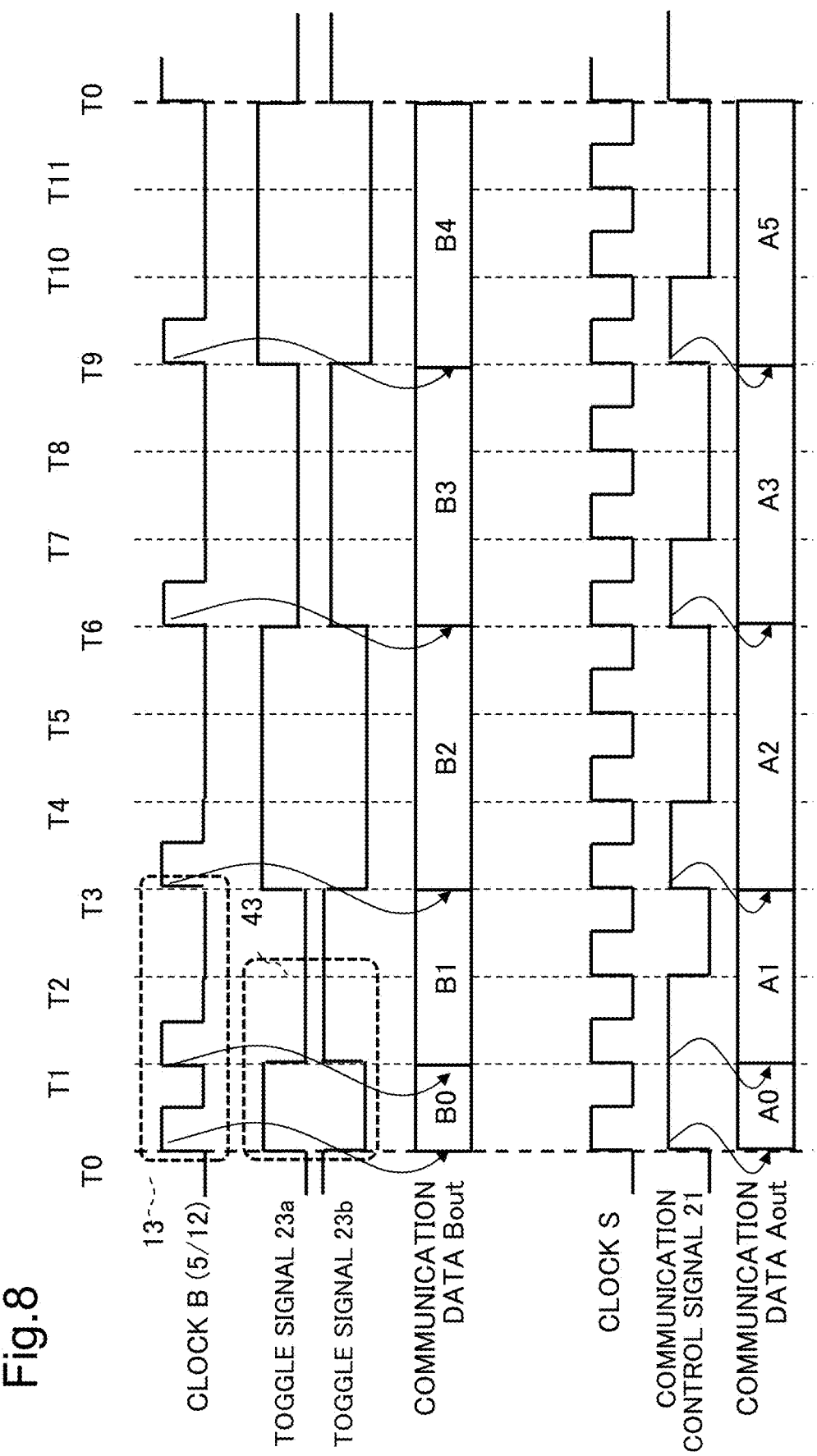
FIG. 8 is a diagram illustrating an example of a timing of communication between a circuit A and a circuit B according to an example embodiment of the present disclosure.

FIG. 8 is a diagram illustrating an example of a timing of communication between the circuit A and the circuit B according to an example embodiment of the present disclosure.

In FIG. 8, a signal such as a clock and a communication timing when communication is performed between the circuit A operating with the clock S and the circuit B operating with the clock B are exemplified. In the example illustrated in FIG. 8, the clock B is a clock signal generated by dividing the frequency of the clock S by the clock signal frequency dividing circuit 10 at a frequency division ratio N/M=5/12. In this example, a pattern of clock pulses of the clock B generated by the clock signal frequency dividing circuit 10 makes one round in M=12 cycles. In FIG. 8, the 12 cycles for one round are indicated by cycles TO to T11.

In the example of FIG. 8, three cycles that are cycles T0 to T2 belong to a marker part. The frequency division ratio is a frequency division ratio N/M=5/12. Therefore, M and N indicating the frequency division ratio satisfy 2≤N and N<M2. Therefore, the marker part in this case is the marker 13.

The toggle signal generation circuit 22 receives the clock B as an input. Then, the toggle signal generation circuit 22 generates and outputs a toggle signal 23 a value of which is inverted for each clock pulse of the clock B. As described above, concerning the signal transition (that is, the value transition) of the toggle signal 23, there are two cases each corresponding to the initial value of the toggle signal 23. In other words, as toggle signals 23, there may be two toggle signals that are different according to the initial values, that is, a toggle signal when the initial value is 1 and a toggle signal when the initial value is 0.

In FIG. 8, the two toggle signals having different initial values are illustrated as a toggle signal 23a and a toggle signal 23b. In the example illustrated in FIG. 8, the two consecutive cycles in which both the toggle signal 23a and the toggle signal 23b toggle are only the cycles T0 and T1. In the example illustrated in FIG. 8, the marker part is a marker 13. A portion in the cycles T0 and T1 of the toggle signal 23 (that is, a portion in two consecutive cycles of the toggle signal where the toggle signal toggles during the two consecutive cycles) is set as a toggle signal marker 43 of the marker 13.

Therefore, the communication control circuit 20 included in the circuit A can know a timing of the marker part by identifying the toggle signal marker 43 with reference to the toggle signal 23. Specifically, the communication control circuit 20 detects a toggle signal marker in the toggle signal 23. When the toggle signal marker 43 is detected, the communication control circuit 20 specifies a cycle in which the toggle signal marker 43 is detected in the toggle signal 23.

The communication control circuit 20 specifies a timing of the head of the marker part (the marker 13 in this case) from the relationship between the timing of the head of the marker 13 and the timing of the cycle in which the toggle signal marker 43 is present. As described above, the relationship between the timing of the head of the marker part and the timing of the toggle signal marker of the toggle signal generated from the marker part is provided to the communication control circuit 20 in advance. The head of the marker part is a head of a period where the phase relationship between the clock S and the clock B makes one round. As a result, the communication control circuit 20 can identify (in other words, specifies) the timing of the head of the period in which the phase relationship between the clock S and the clock B makes one round.

Furthermore, the communication control circuit 20 can recognize a timing at which clock pulses are present in both the clock S and the clock B by referring to the frequency division ratio setting 30, which is information for setting a frequency division ratio of the clock B. As described above, the clock B is generated by masking some of the clock pulses of the clock S. Therefore, in a cycle (in other words, at a timing) in which a clock pulse is present in the clock B having the frequency division ratio specified by the frequency division ratio setting 30, clock pulses are present in both the clock S and the clock B. The communication control circuit 20 generates a signal indicating the recognized timing at which the clock pulses are present in both the clock S and the clock B as a communication control signal 21 indicating a timing at which the circuit A communicates with the circuit B. The communication control circuit 20 outputs the generated signal indicating the recognized timing at which the clock pulses are present in both the clock S and clock B as a communication control signal 21 indicating a timing at which the circuit A communicates with the circuit B. Specifically, in the example illustrated in FIG. 8, the communication control circuit 20 generates a signal having a value of 1 as a communication control signal 21 at the timings of T0, T1, T3, T6, and T9. In this example, as described above, the timing at which the value of the communication control signal 21 is 1 is a timing at which clock pulses are present in both the clock S and the clock B.

Then, the communication control circuit 20 outputs the generated signal having a value of 1 as a communication control signal 21 at the timings T0, T1, T3, T6, and T9.

As described above, referring to the communication control signal 21, the circuit A communicates with the circuit B at a timing when clock pulses are present in both the clock S and the clock B, which is indicated by the communication control signal 21. That is, the circuit A outputs a signal Aout indicating data transmitted to the circuit B in communication with the circuit B at the timing when clock pulses are present in both the clock S and the clock B, which is indicated by the communication control signal 21. The circuit A receives, as an input, a signal Bout indicating data output from the circuit B in communication with the circuit B at the timing when clock pulses are present in both the clock S and the clock B, which is indicated by the communication control signal 21. Specifically, in the example illustrated in FIG. 8, the circuit A outputs a signal Aout indicating data transmitted to the circuit B in communication with the circuit B at the timings T0, T1, T3, T6, and T9 indicated by the communication control signal 21. Further, referring to the communication control signal 21, the circuit A receives, as an input, a signal Bout indicating data output from the circuit B in communication with the circuit B at the timings T0, T1, T3, T6, and T9 indicated by the communication control signal 21.

As described above, the circuit B communicates with the circuit A at a timing when a clock pulse is present in the clock B. That is, the circuit B outputs a signal Bout indicating data transmitted to the circuit A in communication with the circuit A at the timing when the clock pulse is present in the clock B. Then, the circuit B receives, as an input, a signal Aout indicating data output from the circuit A in communication with the circuit A at the timing when a clock pulse is present in the clock B. In the example illustrated in FIG. 8, the timings at which clock pulses are present in the clock B are the timings T0, T1, T3, T6, and T9. The circuit B outputs a signal Bout indicating data transmitted to the circuit A in communication with the circuit A at the timings T0, T1, T3, T6, and T9. The circuit B receives a signal Aout, which is communication data output from the circuit A, as an input at the timings T0, T1, T3, T6, and T9.

Through the above operation, the circuit A and the circuit B can perform communication operations at all timings at which the circuit B operates with clock pulses being present in the clock B.

In the example illustrated in FIG. 8, the frequency division ratio is a frequency division ratio N/M=5/12. However, also in a case where the frequency division ratio is another frequency division ratio in which M and N satisfy 2≤N and N<M/2, the communication control circuit 20 detects a toggle signal marker 43 as a toggle signal marker from the toggle signal. Then, the communication control circuit 20 specifies a head of a marker part, that is, a head of a period where the phase relationship between the clock S and the clock B makes one round, in the same manner as in the case where the frequency division ratio is a frequency division ratio N/M=5/12. Then, the communication control circuit 20 specifies a timing at which clock pulses are present in both the clock S and the clock B according to the frequency division ratio. Note that the timing at which clock pulses are present in both the clock S and the clock B varies depending on the frequency division ratio.

Next, another example of a timing of communication between the circuit A and the circuit B according to the present example embodiment will be described with reference to FIG. 9.

Figure 9:
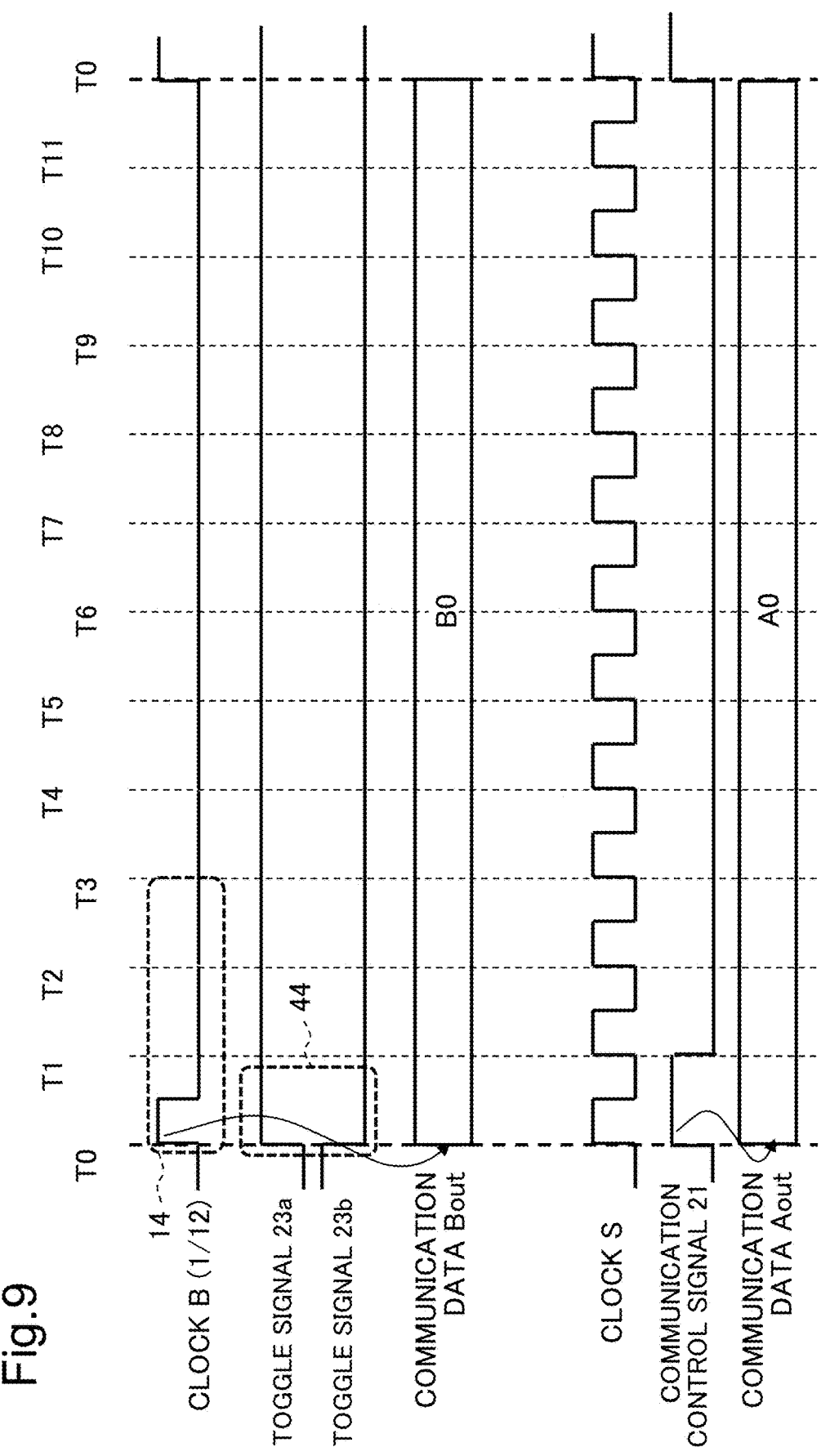
FIG. 9 is a diagram illustrating an example of a timing of communication between a circuit A and a circuit B according to an example embodiment of the present disclosure.

FIG. 9 is a diagram illustrating an example of a timing of communication between the circuit A and the circuit B according to an example embodiment of the present disclosure.

In FIG. 9, a signal such as a clock and a communication timing when communication is performed between the circuit A operating with the clock S and the circuit B operating with the clock B are exemplified. In the example illustrated in FIG. 9, the clock B is a clock signal generated by dividing the frequency of the clock S by the clock signal frequency dividing circuit 10 at a frequency division ratio N/M=1/12. In this example, a pattern of clock pulses of the clock B generated by the clock signal frequency dividing circuit 10 makes one round in M=12 cycles. In FIG. 9, the 12 cycles for one round are indicated by cycles T0 to T11.

In the example of FIG. 9, three cycles that are cycles T0 to T2 belong to a marker part. The frequency division ratio is a frequency division ratio N/M=1/12. Therefore, N of the frequency division ratio satisfies N=1. Therefore, the marker part in this case is the marker 14.

The toggle signal generation circuit 22 receives the clock B as an input. Then, the toggle signal generation circuit 22 generates and outputs a toggle signal 23 a value of which is inverted for each clock pulse of the clock B. As described above, concerning the signal transition (that is, the value transition) of the toggle signal 23, there are two cases each corresponding to the initial value of the toggle signal 23. In other words, as toggle signals 23, there may be two toggle signals that are different according to the initial values, that is, a toggle signal when the initial value is 1 and a toggle signal when the initial value is 0.

In FIG. 9, the two toggle signals having different initial values are illustrated as a toggle signal 23a and a toggle signal 23b. In the example illustrated in FIG. 9, the cycle in which both the toggle signal 23a and the toggle signal 23b toggle is only the cycle T0. In the example illustrated in FIG. 8, the marker part is a marker 14. A portion in the cycle T0 of the toggle signal 23 (that is, a portion in a cycle in which the toggle signal toggles) is set as a toggle signal marker 44 of the marker 14. When N of the frequency division ratio satisfies N=1 and the marker part is the marker 14, the toggle signal marker is the toggle signal marker 44.

Therefore, the communication control circuit 20 included in the circuit A can know a timing of the marker part by identifying the toggle signal marker 44 with reference to the toggle signal 23. Specifically, the communication control circuit 20 detects a toggle signal marker in the toggle signal 23. When the toggle signal marker 44 is detected, the communication control circuit 20 specifies a cycle in which the toggle signal marker 44 is detected in the toggle signal 23. The communication control circuit 20 specifies a timing of the head of the marker part (the marker 14 in this case) from the relationship between the timing of the head of the marker 14 and the timing of the cycle in which the toggle signal marker 44 is present. As described above, the relationship between the timing of the head of the marker part and the timing of the toggle signal marker of the toggle signal generated from the marker part is provided to the communication control circuit 20 in advance. The head of the marker part is a head of a period where the phase relationship between the clock S and the clock B makes one round. As a result, the communication control circuit 20 can identify (in other words, specifies) the timing of the head of the period in which the phase relationship between the clock S and the clock B makes one round.

Furthermore, the communication control circuit 20 can recognize a timing at which clock pulses are present in both the clock S and the clock B by referring to the frequency division ratio setting 30, which is information for setting a frequency division ratio of the clock B. As described above, the clock B is generated by masking some of the clock pulses of the clock S. Therefore, in a cycle (in other words, at a timing) in which a clock pulse is present in the clock B having the frequency division ratio specified by the frequency division ratio setting 30, clock pulses are present in both the clock S and the clock B. The communication control circuit 20 generates a signal indicating the recognized timing at which the clock pulses are present in both the clock S and the clock B as a communication control signal 21 indicating a timing at which the circuit A communicates with the circuit B. The communication control circuit 20 outputs the generated signal indicating the recognized timing at which the clock pulses are present in both the clock S and clock B as a communication control signal 21 indicating a timing at which the circuit A communicates with the circuit B.

Specifically, in the example illustrated in FIG. 9, the communication control circuit 20 generates a signal having a value of 1 as a communication control signal 21 at the timing of T0. In this example, as described above, the timing at which the value of the communication control signal 21 is 1 is a timing at which clock pulses are present in both the clock S and the clock B. Then, the communication control circuit 20 outputs the generated signal having a value of 1 as a communication control signal 21 at the timing of T0.

As described above, referring to the communication control signal 21, the circuit A communicates with the circuit B at a timing when clock pulses are present in both the clock S and the clock B, which is indicated by the communication control signal 21. That is, the circuit A outputs a signal Aout indicating data transmitted to the circuit B in communication with the circuit B at the timing when clock pulses are present in both the clock S and the clock B, which is indicated by the communication control signal 21. The circuit A receives, as an input, a signal Bout indicating data output from the circuit B in communication with the circuit B at the timing when clock pulses are present in both the clock S and the clock B, which is indicated by the communication control signal 21. Specifically, in the example illustrated in FIG. 9, the circuit A outputs a signal Aout indicating data transmitted to the circuit B in communication with the circuit B at the timing of T0 indicated by the communication control signal 21. Further, referring to the communication control signal 21, the circuit A receives, as an input, a signal Bout indicating data output from the circuit B in communication with the circuit B at the timing of T0 indicated by the communication control signal 21.

As described above, the circuit B communicates with the circuit A at a timing when a clock pulse is present in the clock B. That is, the circuit B outputs a signal Bout indicating data transmitted to the circuit A in communication with the circuit A at the timing when the clock pulse is present in the clock B. Then, the circuit B receives, as an input, a signal Aout indicating data output from the circuit A in communication with the circuit A at the timing when a clock pulse is present in the clock B. In the example illustrated in FIG. 9, the timing at which a clock pulse is present in the clock B is the timing T0. The circuit B outputs a signal Bout indicating data transmitted to the circuit A in communication with the circuit A at the timing T0. The circuit B receives a signal Aout, which is communication data output from the circuit A, as an input at the timing T0.

Through the above operation, the circuit A and the circuit B can perform communication operations at all timings at which the circuit B operates with clock pulses being present in the clock B.

Effect

As described above, the clock signal frequency dividing circuit 10 according to the present example embodiment generates a frequency-divided clock signal by masking a clock pulse of an input clock signal in consideration of a timing at which communication is performed. Specifically, the clock signal frequency dividing circuit 10 generates a frequency-divided clock signal that is a repetition of a periodic pattern signal clock pulses of which are masked according to a frequency division ratio. The clock signal frequency dividing circuit 10 generates the periodic pattern signal in such a way that a head portion of the periodic pattern signal becomes a marker part that is a signal having clock pulses in a pattern appearing only in the head portion of the periodic pattern signal in the frequency-divided clock signal. The marker part mask signal generation unit 52 generates a marker part mask signal for masking the clock pulses of the input clock signal in such a way that the head portion of the periodic pattern signal becomes the marker part. The non-marker part mask signal generation unit 53 generates a non-marker part mask signal for masking clock pulses in a non-marker part in such a way that a ratio of the number of masked clock pulses of the periodic pattern signal to a length (that is, the number of cycles) of the periodic pattern signal becomes a frequency division ratio. Note that the non-marker part is a part other than the marker part of the frequency-divided clock signal. Specifically, the non-marker part mask signal generation unit 53 uses, as a frequency division ratio of the non-marker part, a frequency division ratio that is a ratio of a value obtained by subtracting the number of clock pulses in the marker part from a denominator of the frequency division ratio of the frequency-divided clock signal to the length (that is, the number of cycles) of the non-marker part. The frequency division ratio of the non-marker part (hereinafter referred to as a non-marker part frequency division ratio) indicates a ratio of clock pulses that are not masked in the non-marker part to the length (that is, the number of cycles) of the non-marker part. The non-marker part mask signal generation unit 53 generates a non-marker part mask signal using an existing method for generating a mask signal for generating a frequency-divided clock signal in which the frequency division ratio is a non-marker part frequency division ratio and a periodic pattern signal having the same length as the length of the non-marker part is repeated. The non-marker part mask signal generation unit 53 generates a non-marker part mask signal in such a way that a pattern of clock pulses in the non-marker part is the same as the pattern of clock pulses of the periodic pattern signal having the same length as the non-marker part, which is generated using the above-described existing method. Then, the mask circuit 61 generates a frequency-divided clock signal by masking the clock pulses of the input clock signal according to the mask signal. The mask signal includes a marker part mask signal generated by the marker part mask signal generation unit 52 as a signal for a portion in which the clock pulses are masked in the marker part. The mask signal further includes a non-marker part mask signal generated by the non-marker part mask signal generation unit 53 as a signal for a portion in which the clock pulses are masked in the non-marker part.

As a result, the head of the periodic pattern signal repeated in the frequency-divided clock signal can be specified by the marker part. By specifying the head of the periodic pattern signal, a timing at which a clock pulse is present in the frequency-divided clock signal can be specified. Therefore, a special timing design or a special clock switching circuit is unnecessary for communication with clock signals having different frequencies. Then, communication can be efficiently performed between different clocks. Therefore, the clock signal frequency dividing circuit 10 according to the present example embodiment can achieve the rational number frequency division of the clock signal with low power, small area, and low design cost.

In addition, in each circuit block operating with the frequency-divided clock from the clock signal frequency dividing circuit, a head of a period where the phase relationship of the frequency-divided clock makes one round can be easily specified. Therefore, a timing of communication can be recognized in each circuit block. Therefore, it is not necessary to separately propagate information instructing a communication timing from the clock signal frequency dividing circuit. As a result, timing design can be facilitated, circuit development period can be shortened, and circuit scale and power consumption can be reduced.

Second Example Embodiment

Configuration

Figure 14:
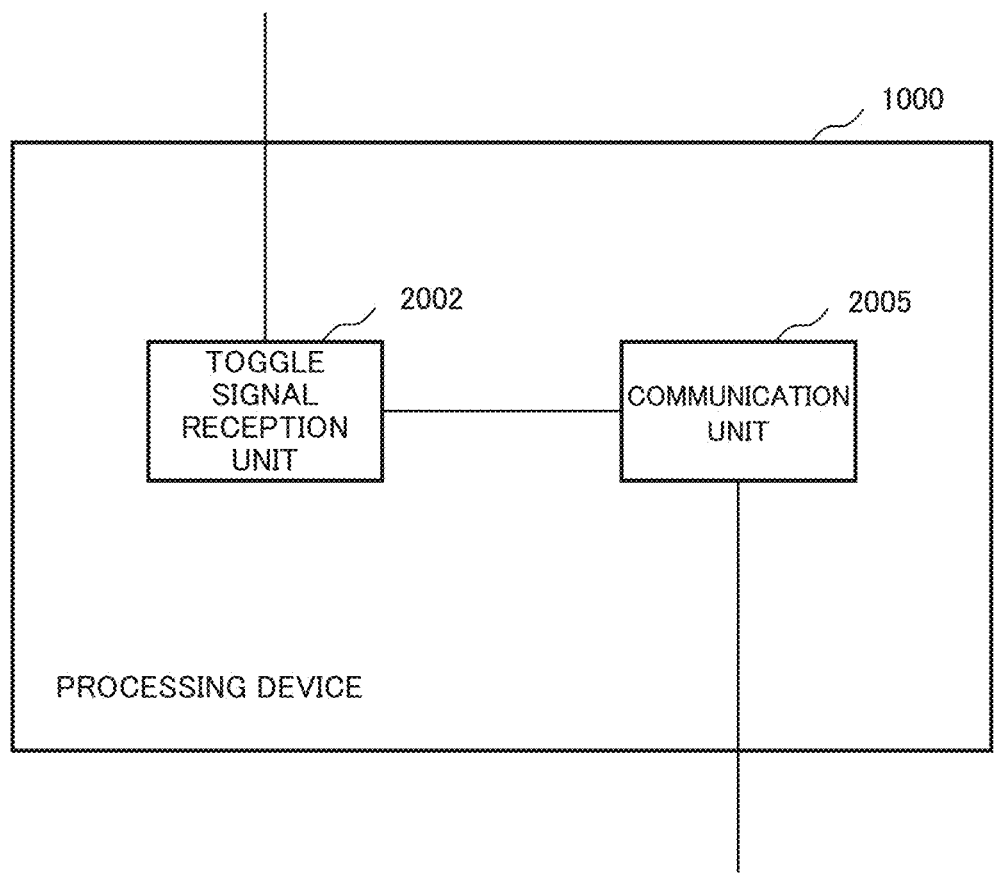
FIG. 14 is a block diagram illustrating an example of a configuration of a processing device according to an example embodiment of the present disclosure.

FIG. 14 is a block diagram illustrating an example of a configuration of a processing device according to an example embodiment of the present disclosure.

Hereinafter, a processing device according to a second example embodiment of the present disclosure will be described with reference to FIG. 14. A processing device 1000 according to the second example embodiment corresponds to a part of the circuit A in the first example embodiment.

In the example illustrated in FIG. 14, the processing device 1000 includes a toggle signal reception unit 2002 and a communication unit 2005.

The toggle signal reception unit 2002 receives a toggle signal a value of which transitions between binary values at a timing of a pulse of a frequency-divided clock signal. The frequency-divided clock signal is a signal in which a periodic pattern signal is repeated, the periodic pattern signal having pulses that are masked, among pulses consecutive in a periodic pulse number of an input clock signal, in such a way that a mask pulse number is smaller than the periodic pulse number.

In the present example embodiment, a frequency division ratio of the frequency-divided clock signal is determined in advance. Then, pulses (that is, present pulses) that are not masked in the periodic pattern signal of the frequency-divided clock signal are known.

The communication unit 2005 communicates with another processing device operated by the frequency-divided clock signal at the timing of the pulse of the frequency-divided clock signal specified using a toggle signal among the pulses of the input clock signal.

For example, the communication unit 2005 may specify the timing of the head of the periodic pattern signal using a portion where the relationship of the toggle signal with the timing of the head of the periodic pattern signal is known. For example, the communication unit 2005 may specify the timing of the pulse that is not masked in the periodic pattern signal using the timing of the head of the periodic pattern signal.

The toggle signal reception unit 2002 corresponds to a portion of the circuit A to which the toggle signal 23 of the communication control circuit 20 is input in the first example embodiment. The communication unit 2005 corresponds to the communication control circuit 20 of the circuit A in the first example embodiment. The other processing device corresponds to the circuit B in the first example embodiment.

Operation

Figure 15:
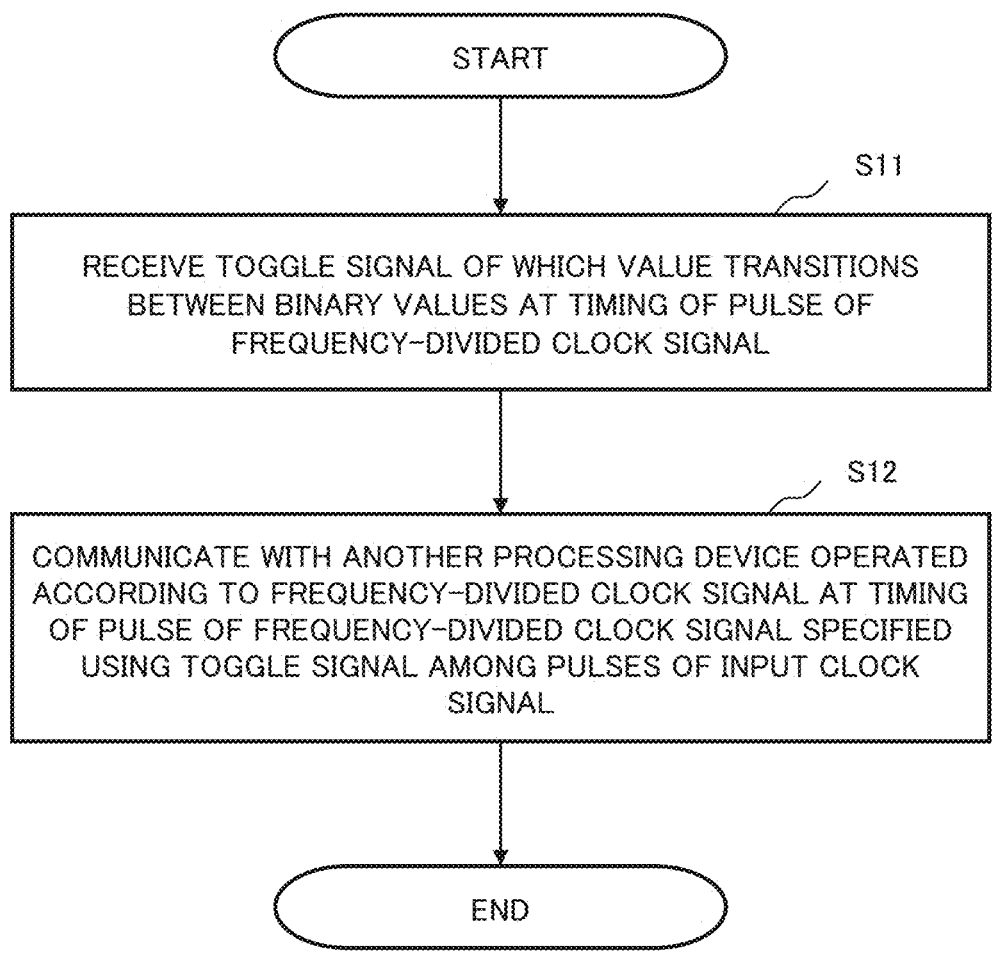
FIG. 15 is a flowchart illustrating an example of an operation of a processing device according to an example embodiment of the present disclosure.

FIG. 15 is a flowchart illustrating an example of an operation of the processing device according to an example embodiment of the present disclosure.

Hereinafter, an example of an operation of the processing device 1000 according to the second example embodiment of the present disclosure will be described with reference to FIG. 15. In the example illustrated in FIG. 15, first, the toggle signal reception unit 2002 receives a toggle signal a value of which transitions between binary values at a timing of a pulse of a frequency-divided clock signal (step S11). As described above, the frequency-divided clock signal is a signal in which a periodic pattern signal is repeated, the periodic pattern signal having pulses that are masked, among pulses consecutive in a periodic pulse number of an input clock signal, in such a way that a mask pulse number is smaller than the periodic pulse number. Next, the communication unit 2005 communicates with another processing device operated by the frequency-divided clock signal at the timing of the pulse of the frequency-divided clock signal specified using a toggle signal among the pulses of the input clock signal (step S12).

Effect

The present example embodiment is advantageous in that design cost can be reduced and timing design can be facilitated. This is because the communication unit 2005 communicates with another processing device operated by the frequency-divided clock signal at the timing of the pulse of the frequency-divided clock signal specified using a toggle signal among the pulses of the input clock signal.

Third Example Embodiment

Figure 16:
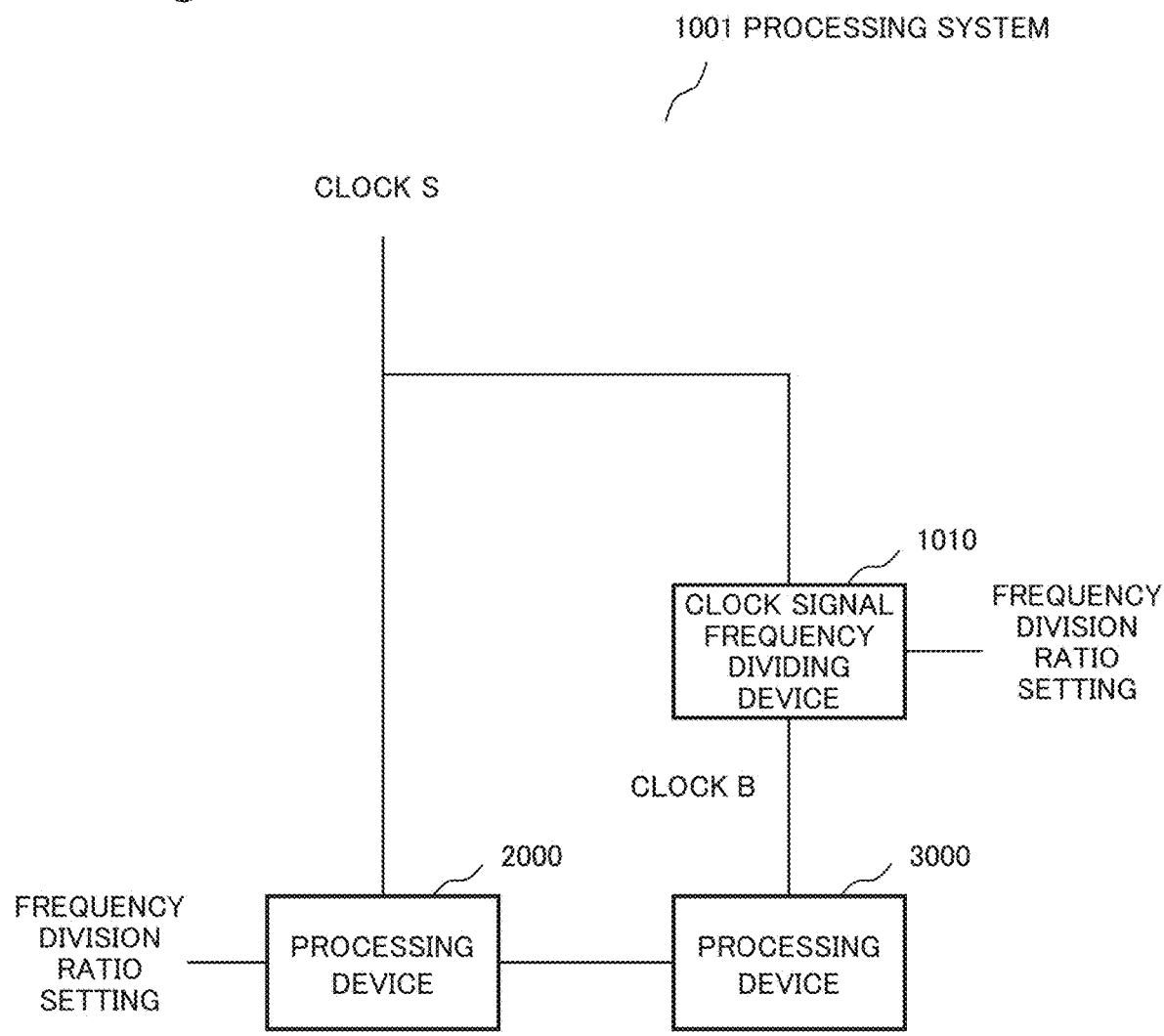
FIG. 16 is a diagram illustrating an example of a configuration of a processing system according to an example embodiment of the present disclosure.

FIG. 16 is a diagram illustrating an example of a configuration of a processing system according to an example embodiment of the present disclosure.

Hereinafter, a processing system according to a third example embodiment of the present disclosure will be described with reference to FIG. 16. The present example embodiment schematically represents the first example embodiment. In the example illustrated in FIG. 16, the processing system 1001 includes a clock signal frequency dividing device 1010, a processing device 2000, and a processing device 3000. The clock signal frequency dividing device 1010 corresponds to the clock signal frequency dividing circuit 10 in the first example embodiment. The processing device 2000 corresponds to the circuit A in the first example embodiment. The processing device 3000 corresponds to the circuit B in the first example embodiment.

The clock S is an input clock signal. The clock S is input to the clock signal frequency dividing device 1010 and the processing device 2000. The frequency division ratio setting indicates a frequency division ratio of the clock B to the clock S. The frequency division ratio is indicated by a frequency division ratio denominator M and a frequency division ratio numerator N. The frequency division ratio setting indicates a frequency division ratio denominator M and a frequency division ratio numerator N.

Similarly to the clock signal frequency dividing circuit 10 in the first example embodiment, the clock signal frequency dividing device 1010 generates a clock B by performing rational number frequency division on the clock S according to the frequency division ratio setting. The clock B is a frequency-divided clock signal having a frequency division ratio indicated by the frequency division ratio setting. The clock B is supplied to the processing device 3000.

The processing device 3000 is operated by the clock B. In addition, similarly to the circuit B in the first example embodiment, the processing device 3000 generates a toggle signal from the clock B. The processing device 3000 outputs the generated toggle signal.

The processing device 2000 is operated by the clock S. The processing device 2000 receives the toggle signal. Similarly to the circuit A in the first example embodiment, the processing device 2000 specifies a timing at which a clock pulse of the clock B is present, using the received toggle signal.

The processing device 2000 communicates with the processing device 3000 at the specified timing when the clock pulse of the clock Bis present. The processing device 3000 communicates with the processing device 2000 at the timing when the clock pulse of the clock B is present.

Clock Signal Frequency Dividing Device 1010

Figure 17:
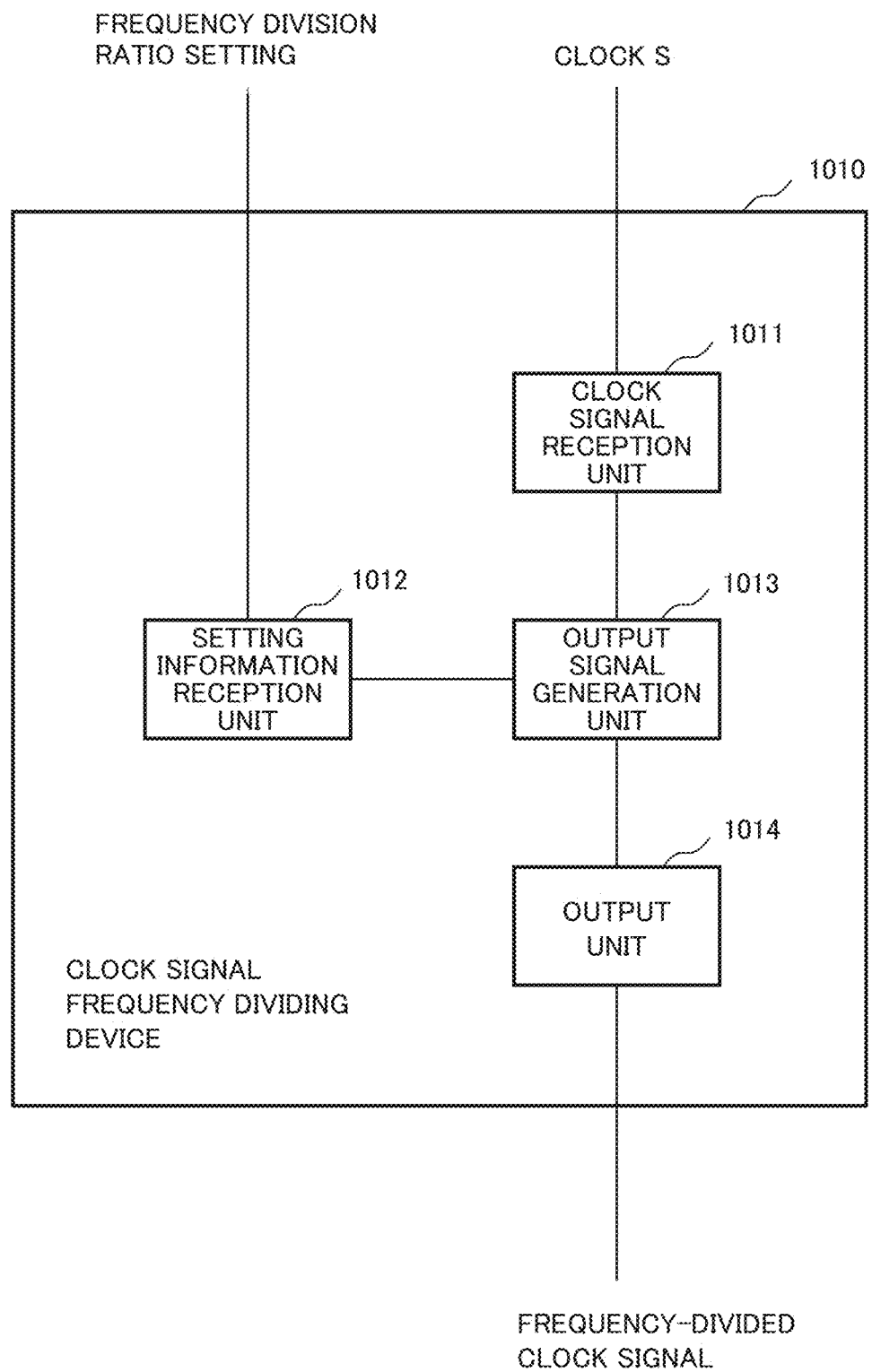
FIG. 17 is a block diagram illustrating an example of a configuration of a clock signal frequency dividing device according to an example embodiment of the present disclosure.

FIG. 17 is a block diagram illustrating an example of a configuration of a clock signal frequency dividing device according to an example embodiment of the present disclosure.

Hereinafter, the clock signal frequency dividing device 1010 according to the third example embodiment of the present disclosure will be described in detail with reference to FIG. 17. In the example illustrated in FIG. 17, the clock signal frequency dividing device 1010 includes a clock signal reception unit 1011, a setting information reception unit 1012, an output signal generation unit 1013, and an output unit 1014. As described above, the clock signal frequency dividing device 1010 corresponds to the clock signal frequency dividing circuit 10 in the first example embodiment. The clock signal frequency dividing device 1010 operates similarly to the clock signal frequency dividing circuit 10 in the first example embodiment.

<Clock Signal Reception Unit 1011>

The clock signal reception unit 1011 receives an input clock signal (that is, a clock S). The clock signal reception unit 1011 corresponds to the signal line to which the clock S is input of the clock signal frequency dividing circuit 10 in the first example embodiment.

<Setting Information Reception Unit 1012>

The setting information reception unit 1012 receives a frequency division ratio setting. The setting information reception unit 1012 corresponds to the signal line to which the frequency division ratio setting (that is, the frequency division ratio denominator M and the frequency division ratio numerator N) is input of the clock signal frequency dividing circuit 10 in the first example embodiment. As a value of the frequency division ratio denominator M, a length of a period, that is, the number of cycles, in which the phase relationship between the clock A and the clock B makes one round is set. As a value of the frequency division ratio numerator N, a value is set in such a way that N/M is a value that becomes the frequency division ratio in a case where the value of the frequency division ratio denominator M is the length of the period in which the phase relationship with the clock B makes one round.

<Output Unit 1014>

The output unit 1014 outputs a frequency-divided clock signal (that is, a clock B). The output unit 1014 corresponds to the signal line from which the frequency-divided clock signal (that is, the clock B) is output of the clock signal frequency dividing circuit 10 in the first example embodiment.

<Output Signal Generation Unit 1013>

The output signal generation unit 1013 operates similarly to the clock signal frequency dividing circuit 10 in the second example embodiment. As described above, the output signal generation unit 1013 generates a frequency-divided clock signal in which a periodic pattern signal is repeated from the pulses of the received input clock signal. The periodic pattern signal is a signal having pulses that are masked, among pulses consecutive in a periodic pulse number, in such a way that a mask pulse number is smaller than the periodic pulse number. Then, the periodic pattern signal includes a marker part including at least one unmasked pulse at a head portion of the periodic pattern signal. The mask pulse number is a value obtained by subtracting the frequency division ratio numerator N from the frequency division ratio denominator M.

The marker part is the same as the marker part in the second example embodiment. The periodic pattern signal is a signal in a portion having a length of a period in which the phase relationship between the clock S and the clock B makes one cycle from the head of the period in which the phase relationship between the clock S and the clock B makes one cycle in the frequency-divided clock signal.

The non-marker part is a part other than the marker part of the periodic pattern signal. The non-marker part is the same as the non-marker part in the first example embodiment.

The output signal generation unit 1013 corresponds to a portion other than the signal line to which the clock S is input, the signal line to which the frequency division ratio setting is input, and the signal line from which the frequency-divided clock signal is output of the clock signal frequency dividing circuit 10 in the first example embodiment.

<Details of Output Signal Generation Unit 1013>

Figure 18:
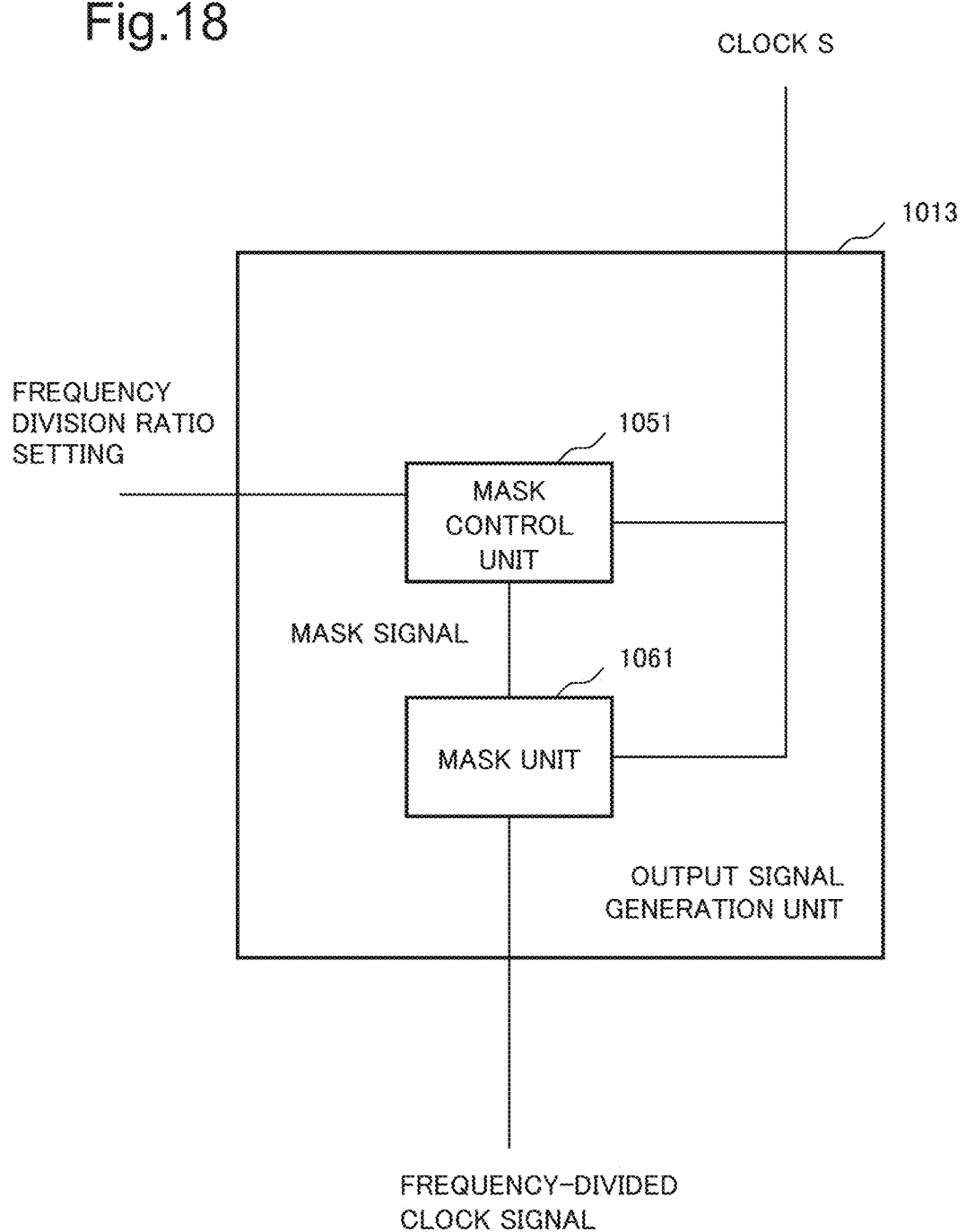
FIG. 18 is a diagram illustrating an example of a configuration of an output signal generation unit according to an example embodiment of the present disclosure.

FIG. 18 is a diagram illustrating an example of a configuration of an output signal generation unit according to an example embodiment of the present disclosure.

Hereinafter, the output signal generation unit 1013 according to the present example embodiment will be described in detail with reference to FIG. 18. In the example illustrated in FIG. 18, the output signal generation unit 1013 includes a mask control unit 1051 and a mask unit 1061. The mask control unit 1051 corresponds to the mask control circuit 51 and the counter circuit 56 in the first example embodiment. The mask control unit 1051 operates similarly to the mask control circuit 51 in the first example embodiment. The mask unit 1061 corresponds to the mask circuit 61 in the first example embodiment. The mask unit 1061 operates similarly to the mask circuit 61 in the first example embodiment.

<Mask Control Unit 1051>

An input clock signal (that is, a clock S), a frequency division ratio setting, and communication timing information are input to the mask control unit 1051. The mask control unit 1051 is operated by the clock S.

The mask control unit 1051 determines whether to mask each of the pulses of the input clock signal from a periodic pulse number and a non-mask pulse number, which is the number of unmasked pulses, and generates a mask signal indicating a result of the determination. The periodic pulse number is the above-described frequency division ratio denominator M. The non-mask pulse number is the above-described frequency division ratio numerator N. The mask control unit 1051 outputs a mask signal.

<Mask Unit 1061>

An input clock signal (that is, a clock S) and a mask signal are input to the mask unit 1061.

The mask unit 1061 masks a pulse determined to be masked or directly outputs a pulse determined not to be masked according to the mask signal.

<Details of Mask Control Unit 1051>

Figure 19:
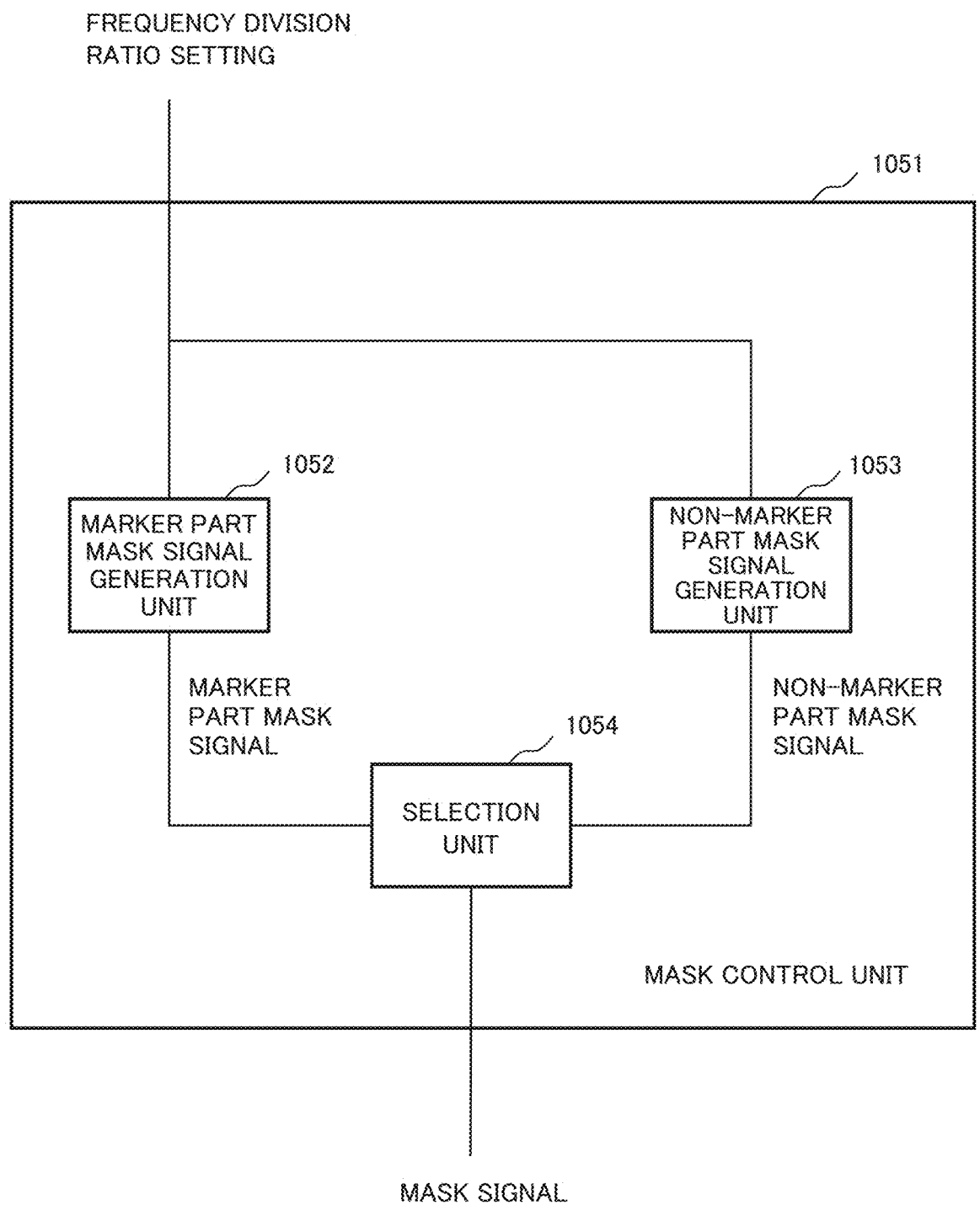
FIG. 19 is a diagram illustrating an example of a configuration of a mask control unit according to a schematic example of an example embodiment of the present disclosure.

FIG. 19 is a diagram illustrating an example of a configuration of a mask control unit according to a schematic example of an example embodiment of the present disclosure.

Hereinafter, the mask control unit 1051 according to the present example embodiment will be described in detail with reference to FIG. 19. In the example illustrated in FIG. 19, the mask control unit 1051 includes a marker part mask signal generation unit 1052, a non-marker part mask signal generation unit 1053, and a selection unit 1054. FIG. 19 illustrates portions of the mask control unit 1051 corresponding to the marker part mask signal generation unit 52, the non-marker part mask signal generation unit 53, and the selection circuit 54 of the mask control circuit 51 in the first example embodiment. The marker part mask signal generation unit 1052, the non-marker part mask signal generation unit 1053, and the selection unit 1054 operate according to the input clock S. However, in order to prevent the drawing from being complicated, the signal line of the clock S is not illustrated in FIG. 19.

The frequency division ratio setting is input to the marker part mask signal generation unit 1052 and the non-marker part mask signal generation unit 1053.

The marker part mask signal generation unit 1052 generates a marker part mask signal that is a mask signal for the marker part determined from the periodic pulse number and the non-mask pulse number. The method by which the marker part mask signal generation unit 1052 generates the marker part mask signal is the same as the method by which the marker part mask signal generation unit 52 generates the marker part mask signal in the first example embodiment.

The non-marker part mask signal generation unit 1053 generates a non-marker part mask signal that is a mask signal for the non-marker part in such a way that a pattern of unmasked pulses in the non-marker part, which is a part other than the marker part of the periodic pattern signal, is the same as a second frequency division pattern. The second frequency division pattern is a pattern of unmasked pulses of the periodic clock signal when rational number frequency division is performed at a frequency division ratio determined from a second periodic pulse number and a second non-mask pulse number. In this case, the rational number frequency division is rational number frequency division according to any of the existing rational number frequency division algorithms. The second periodic pulse number is the number of pulses obtained by subtracting the number of pulses in the marker part from the periodic pulse number. The second non-mask pulse number is the number of pulses obtained by subtracting the number of unmasked pulses included in the marker part from the non-mask pulse number. The method by which the non-marker part mask signal generation unit 1053 generates the non-marker part mask signal is the same as the method by which the non-marker part mask signal generation unit 53 generates the non-marker part mask signal in the first example embodiment.

The selection unit 1054 outputs the marker part mask signal as a mask signal while the marker part of the periodic pattern signal is output, and outputs the non-marker part mask signal as a mask signal while the non-marker part of the periodic pattern signal is output. In other words, the selection unit 1054 selects the marker part mask signal as a mask signal while the marker part of the periodic pattern signal is output, and selects the non-marker part mask signal as a mask signal while the non-marker part of the periodic pattern signal is output. The selection unit 1054 outputs, as a mask signal, the signal selected as the mask signal. The method by which the selection unit 1054 selects a signal output as a mask signal from the marker part mask signal and the non-marker part mask signal is the same as the method by which the selection circuit 54 selects a signal to be output as a mask signal from the marker part mask signal and the non-marker part mask signal.

When an output pulse number obtained by subtracting the mask pulse number from the periodic pulse number is a value obtained by subtracting 1 from the periodic pulse number, this is expressed as $N=M-1$. When the output pulse number is larger than or equal to 2 and the output pulse number is smaller than a value obtained by dividing the periodic pulse number by 2, this is expressed as $2 \leq N$ and $N < M/2$. In these cases, the marker part includes two consecutive unmasked pulses at output clock timings, which are timings at which pulses are output as frequency-divided clock signals when the pulses are not masked. The non-marker part does not include the unmasked pulses at the two consecutive output clock timings.

When the output pulse number is larger than or equal to a value obtained by dividing the periodic pulse number by 2 and the output pulse number is smaller than a value obtained by subtracting 1 from the periodic pulse number, this is expressed as $M/2 \leq N$ and $N < M-1$. In addition, when the output pulse number is 1, this is expressed as $N=1$. In these cases, pulses are masked at two or more consecutive output clock timings in the marker part, and pulses are not masked at the two consecutive output clock timings in the non-marker part.

<Processing Device 3000>

Figure 20:
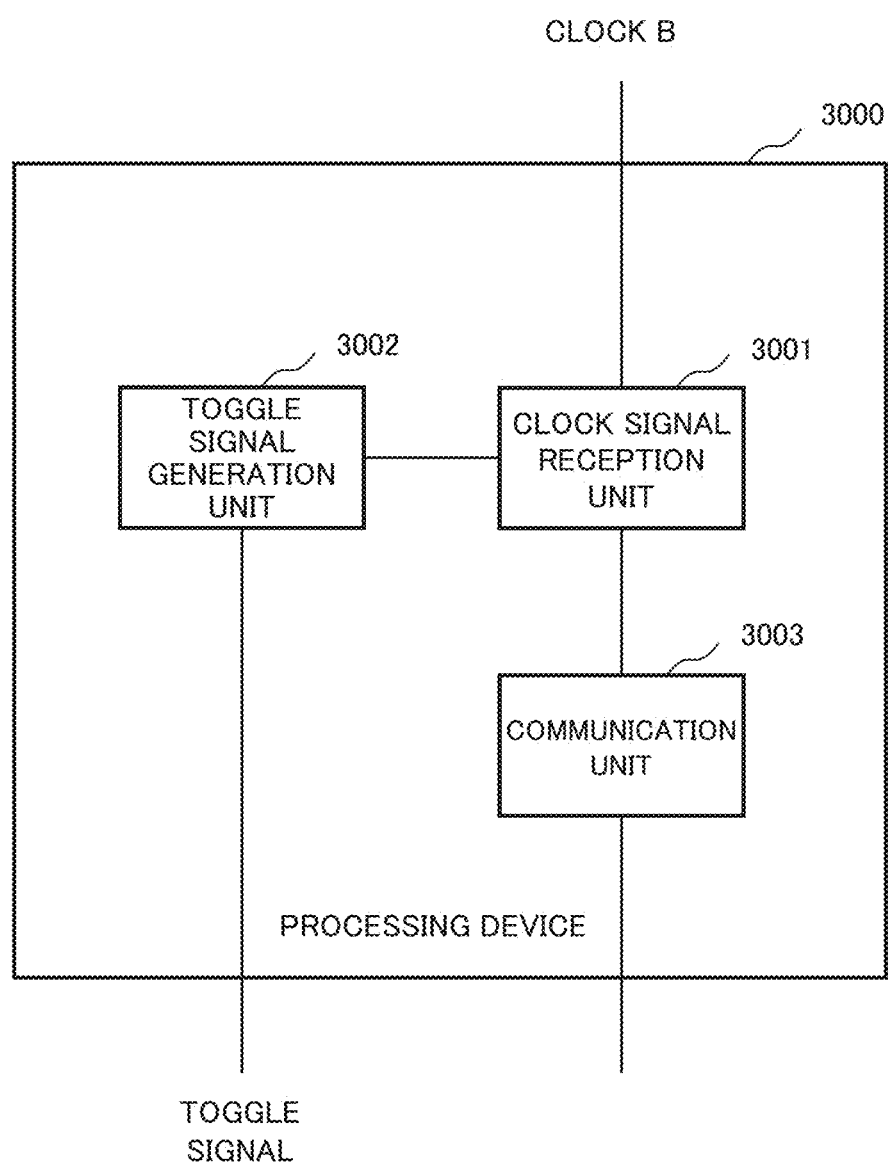
FIG. 20 is a block diagram illustrating an example of a configuration of a processing device according to an example embodiment of the present disclosure.

FIG. 20 is a block diagram illustrating an example of a configuration of a processing device according to an example embodiment of the present disclosure.

Hereinafter, a processing device 3000 according to a third example embodiment of the present disclosure will be described in detail with reference to FIG. 20. In the example illustrated in FIG. 20, the processing device 3000 includes a clock signal reception unit 3001, a toggle signal generation unit 3002, and a communication unit 3003. As described above, the processing device 3000 corresponds to the circuit B in the first example embodiment. The processing device 3000 operates similarly to the circuit B in the first example embodiment.

<Clock Signal Reception Unit 3001>

The clock signal reception unit 3001 receives the above-described clock B (that is, the frequency-divided clock signal) output from the clock signal frequency dividing device 1010. The clock signal reception unit 3001 corresponds to the signal line to which the clock B is supplied of the circuit B in the first example embodiment.

<Toggle Signal Generation Unit 3002>

The toggle signal generation unit 3002 generates a toggle signal from the clock B. The toggle signal generation unit 3002 corresponds to the toggle signal generation circuit 22 in the first example embodiment. The toggle signal generation unit 3002 operates similarly to the toggle signal generation circuit 22 in the first example embodiment.

<Communication Unit 3003>

The communication unit 3003 communicates with the circuit A at a timing of a clock pulse of the clock B. The communication unit 3003 corresponds to a circuit (for example, a combination of circuits) that outputs a signal Bout and receives a signal Aout as an input of the circuit B in the first example embodiment. The communication unit 3003 operates similarly to the circuit that outputs a signal Bout and receives a signal Aout as an input of the circuit B in the first example embodiment. Note that the information output as the signal Bout may be generated by the processing device 3000 (that is, the circuit B). The information output as the signal Bout may be generated by another circuit, device, or the like connected to the processing device 3000 (that is, the circuit B). The information input as the signal Aout may be processed by the processing device 3000 (that is, the circuit B). The information input as the signal Aout may be processed by another circuit, device, or the like connected to the processing device 3000 (that is, the circuit B).

<Processing Device 2000>

Figure 21:
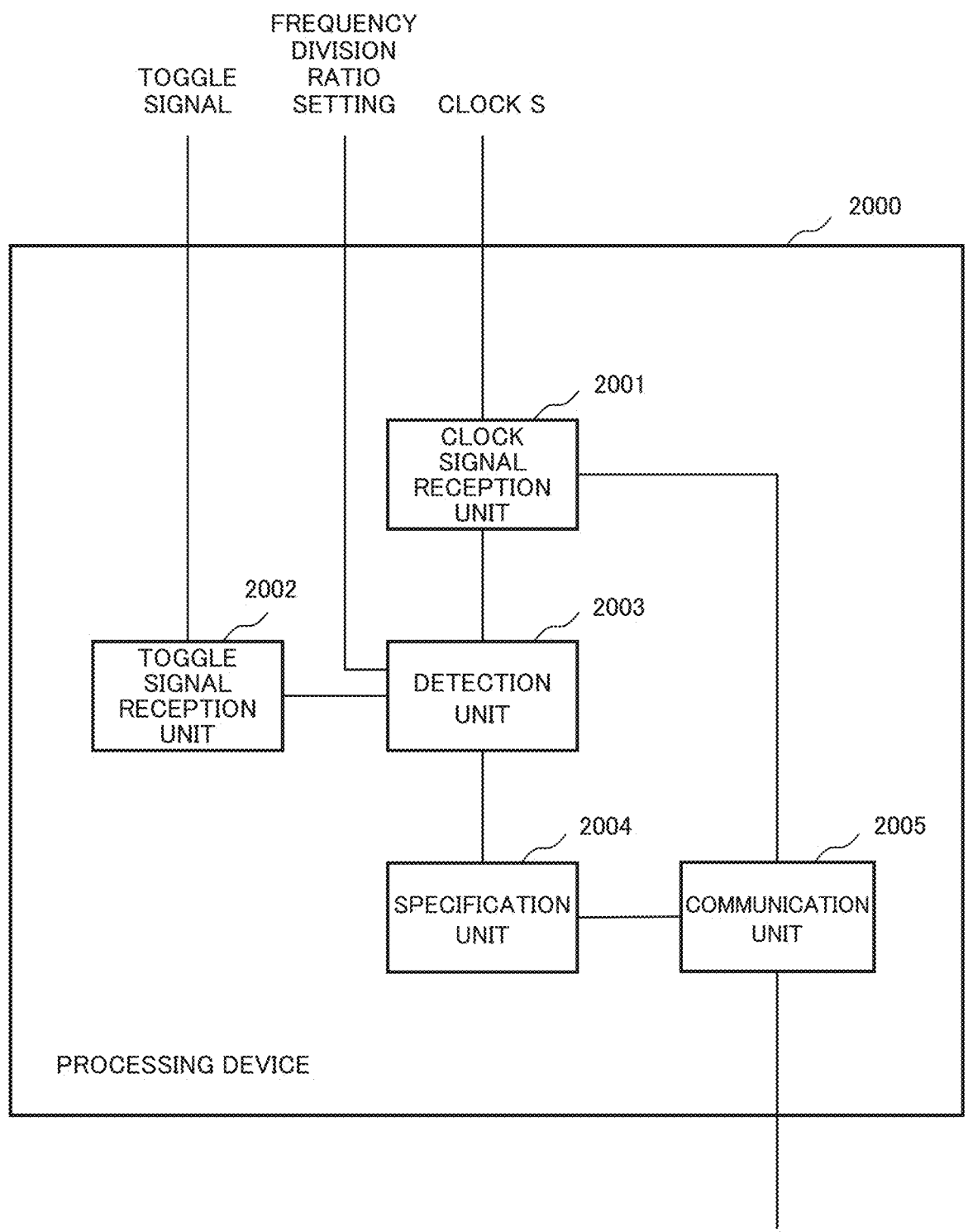
FIG. 21 is a block diagram illustrating an example of a configuration of a processing device according to an example embodiment of the present disclosure.

FIG. 21 is a block diagram illustrating an example of a configuration of a processing device according to an example embodiment of the present disclosure.

Hereinafter, the processing device 2000 according to the third example embodiment of the present disclosure will be described in detail with reference to FIG. 21. In the example illustrated in FIG. 21, the processing device 2000 includes a clock signal reception unit 2001, a toggle signal reception unit 2002, a detection unit 2003, a specification unit 2004, and a communication unit 2005. As described above, the processing device 2000 corresponds to the circuit A in the first example embodiment.

<Clock Signal Reception Unit 2001>

The clock signal reception unit 2001 receives a clock S (that is, the input clock signal described above).

<Toggle Signal Reception Unit 2002>

The toggle signal reception unit 2002 receives a toggle signal output from the processing device 3000. As described above, the toggle signal is a signal a value of which transitions between binary values at a timing of a pulse of the frequency-divided clock signal. The frequency-divided clock signal is a signal in which a periodic pattern signal is repeated, the periodic pattern signal having predetermined pulses that are masked, among pulses consecutive in a periodic pulse number of an input clock signal, in such a way that a mask pulse number is smaller than the periodic pulse number.

<Detection Unit 2003>

The detection unit 2003 receives a frequency division ratio setting. The frequency division ratio setting is similar to the frequency division ratio setting in the first example embodiment.

The detection unit 2003 detects a toggle signal marker from a toggle signal at a frequency division ratio indicated by the frequency division ratio setting. The detection unit 2003 corresponds to the function of the communication control circuit 20 of the circuit A to detect a toggle signal marker from a toggle signal in the first example embodiment. The detection unit 2003 performs the same operation as the operation of the communication control circuit 20 of the circuit A in a case where a toggle signal marker is detected from a toggle signal in the first example embodiment.

<Specification Unit 2004>

The specification unit 2004 specifies a timing of a pulse of the frequency-divided clock signal from the detected timing of the toggle signal marker. Specifically, the specification unit 2004 specifies a timing of a head of the periodic pattern signal from the detected timing of the toggle signal marker and the relationship between the timing of the toggle signal marker and the timing of the head of the periodic pattern signal at the frequency division ratio indicated by the frequency division ratio setting. Then, the specification unit 2004 specifies a timing of an unmasked pulse of the frequency-divided clock signal from the specified timing of the head of the periodic pattern signal and the information on pulses that are not masked in the periodic pattern signal of the frequency-divided clock signal at the frequency division ratio indicated by the frequency division ratio setting. Note that the specification unit 2004 holds in advance information on pulses that are not masked in the periodic pattern signal of the frequency-divided clock signal for each frequency division ratio. The specification unit 2004 corresponds to the function of the communication control circuit 20 of the circuit A to specify a timing of an unmasked pulse of the frequency-divided clock signal in the first example embodiment. The specification unit 2004 performs an operation similar to the operation of the communication control circuit 20 of the circuit A in a case where a timing of an unmasked pulse of the frequency-divided clock signal is specified in the first example embodiment.

<Communication Unit 2005>

The communication unit 2005 communicates with the processing device 3000 operated by the frequency-divided clock signal at the timing of the pulse of the frequency-divided clock signal specified using a toggle signal among the pulses of the input clock signal. The pulse of the frequency-divided clock signal specified using the toggle signal is an unmasked pulse of the frequency-divided clock signal specified by the specification unit 2004. As described above, a frequency-divided clock signal is generated by masking some pulses determined according to a frequency division ratio among the pulses of the input clock signal. Therefore, the timing of the pulse of the frequency-divided clock signal coincides with any of the pulses of the input clock signal.

The communication unit 3003 corresponds to a circuit (for example, a combination of circuits) that outputs a signal Aout and receives a signal Bout as an input of the circuit B in the first example embodiment. The communication unit 3003 operates similarly to the circuit that outputs a signal Aout and receives a signal Bout as an input of the circuit B in the first example embodiment. Note that the information output as the signal Aout may be generated by the processing device 2000 (that is, the circuit A). The information output as the signal Aout may be generated by another circuit, device, or the like connected to the processing device 2000 (that is, the circuit A). The information input as the signal Bout may be processed by the processing device 2000 (that is, the circuit A). The information input as the signal Bout may be processed by another circuit, device, or the like connected to the processing device 2000 (that is, the circuit A).

<Modification>

The toggle signal generation unit 3002 may be included in a device different from the processing device 2000 to which the frequency-divided clock signal (that is, the clock B) is supplied. In that case, a toggle signal may be output from the device including the toggle signal generation unit 3002. Then, the processing device 3000 does not need to include the toggle signal generation unit 3002.

<Operation>

Next, an operation of the processing system 1001 according to the present example embodiment will be described in detail with reference to the drawings. Hereinafter, an operation of the clock signal frequency dividing device 1010, an operation of the processing device 3000, and an operation of the processing device 2000 will be described in order.

Figure 22:
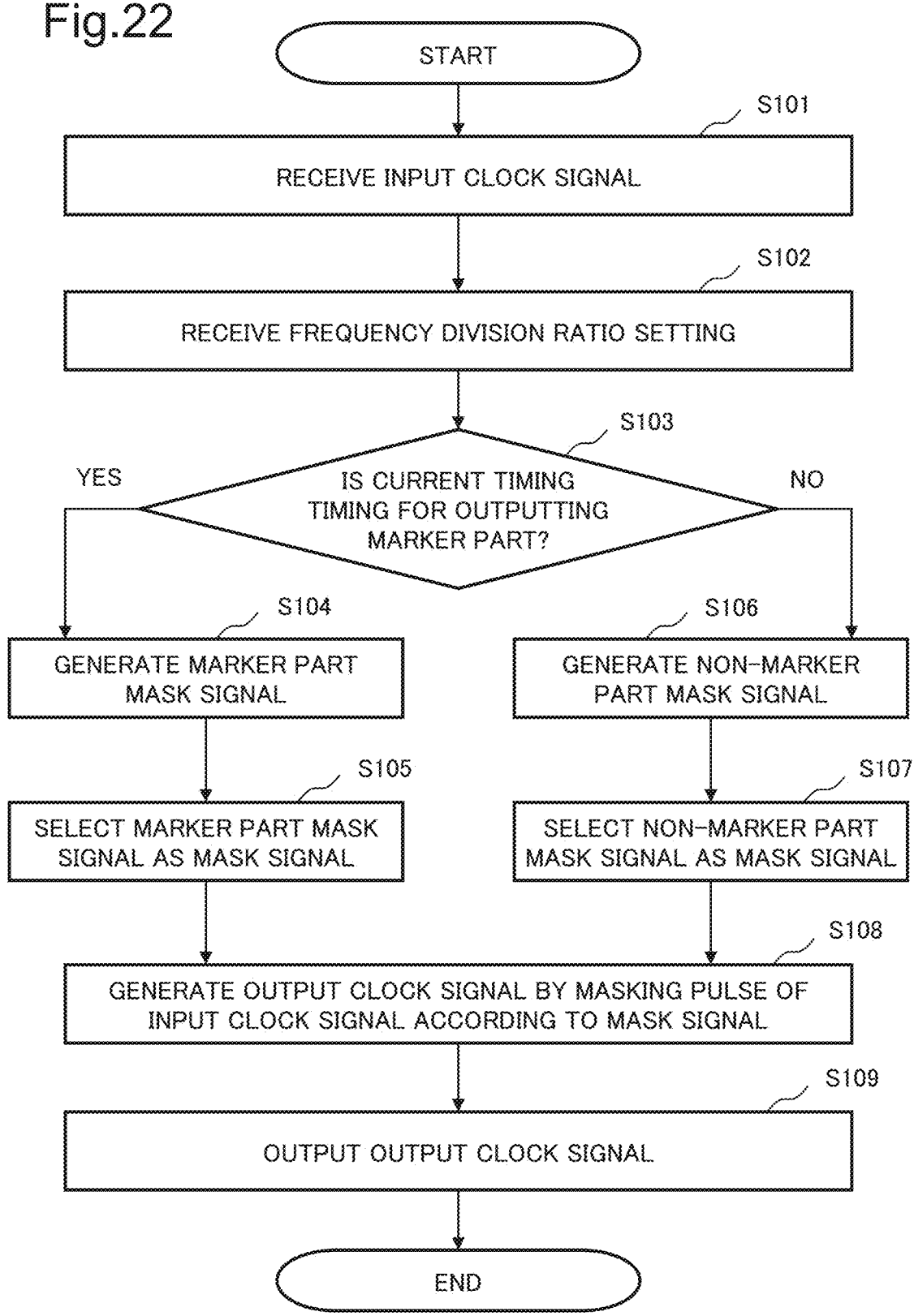
FIG. 22 is a flowchart illustrating an example of an operation of a clock signal frequency dividing device according to an example embodiment of the present disclosure.

FIG. 22 is a flowchart illustrating an example of an operation of the clock signal frequency dividing device according to an example embodiment of the present disclosure.

Hereinafter, first, the operation of the clock signal frequency dividing device 1010 according to the present example embodiment will be described in detail with reference to FIG. 22.

At the start of the operation illustrated in FIG. 22, an input clock signal (that is, a clock S) is supplied to the clock signal frequency dividing device 1010. The clock signal reception unit 1011 receives an input clock signal (step S101). The clock signal frequency dividing device 1010 is driven by the input clock signal.

In the example illustrated in FIG. 22, next, the setting information reception unit 1012 receives a frequency division ratio setting (step S102). The mask control unit 1051 starts to generate a mask signal for generating a frequency-divided clock signal at a frequency division ratio indicated by the received frequency division ratio setting in the next and subsequent steps. The mask control unit 1051 may start to generate a mask signal in such a manner that the frequency-divided clock signal is generated from the head of the periodic pattern signal at a timing after the frequency division ratio setting is received.

When the current timing is a timing for outputting a marker part (YES in step S103), the marker part mask signal generation unit 1052 of the mask control unit 1051 generates a marker part mask signal (step S104). Then, the selection unit 1054 of the mask control unit 1051 selects the marker part mask signal as a mask signal (step S105).

When the current timing is not a timing for outputting a marker part (NO in step S103), the non-marker part mask signal generation unit 1053 of the mask control unit 1051 generates a non-marker part mask signal (step S106). Then, the selection unit 1054 of the mask control unit 1051 selects the non-marker part mask signal as a mask signal (step S107).

Then, the mask unit 1061 generates a frequency-divided clock signal by masking the pulse of the input signal according to the mask signal (step S108). Then, the output unit 1014 outputs the frequency-divided clock signal (step S109).

For example, the clock signal frequency dividing device 1010 may repeat the operation of steps S103 to S109 while the input clock signal is supplied.

Figure 23:
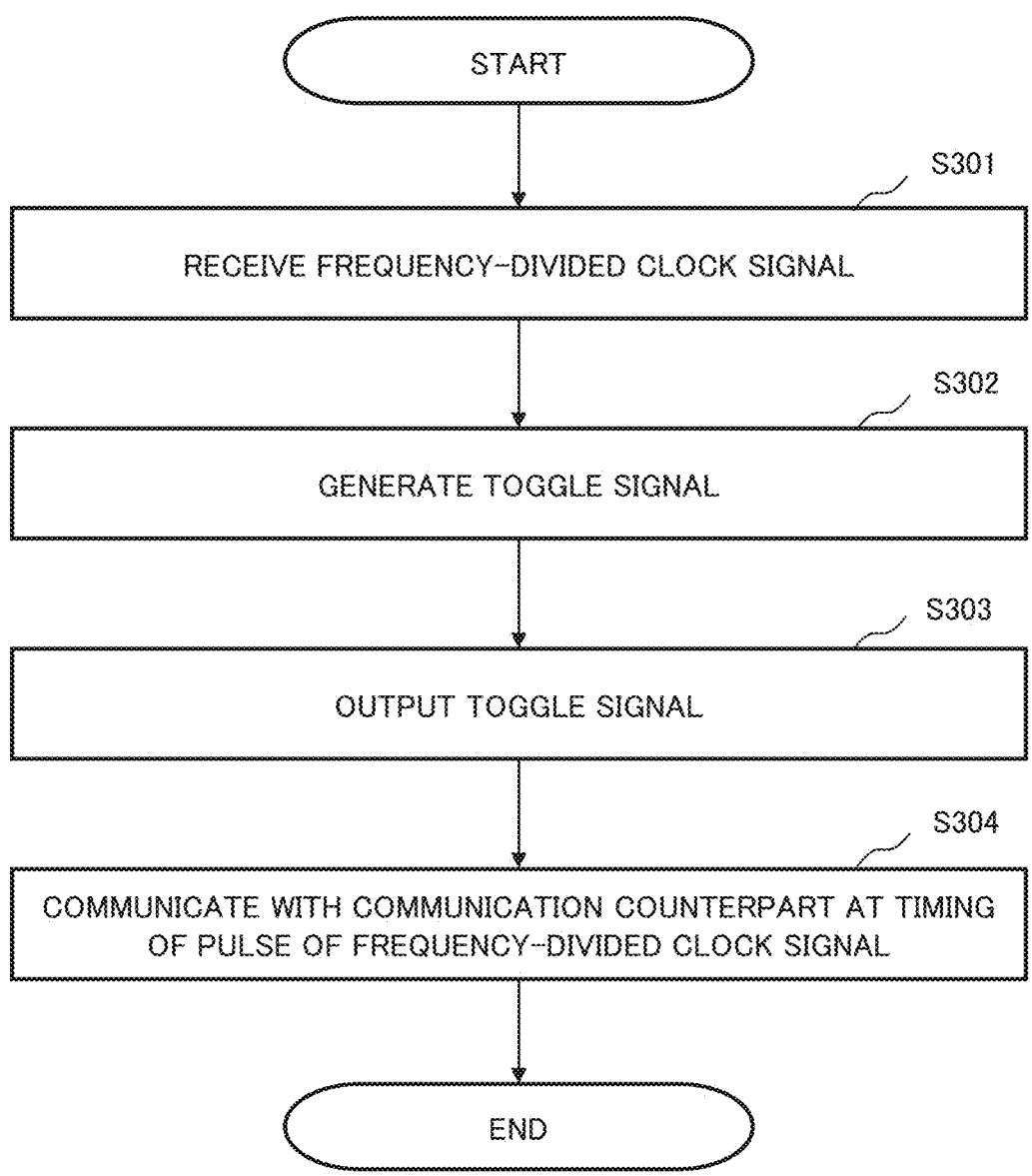
FIG. 23 is a flowchart illustrating an example of an operation of a processing device according to an example embodiment of the present disclosure.

FIG. 23 is a flowchart illustrating an example of an operation of the processing device according to an example embodiment of the present disclosure.

Hereinafter, the operation of the processing device 3000 according to the present example embodiment will be described with reference to FIG. 23.

In the example illustrated in FIG. 23, the clock signal reception unit 3001 receives a frequency-divided clock signal (step S301). The toggle signal generation unit 3002 generates a toggle signal from the frequency-divided clock signal (step S302). The toggle signal generation unit 3002 outputs the generated toggle signal (step S303).

The communication unit 3003 communicates with a communication counterpart at a timing of a pulse of the frequency-divided clock signal (step S304). The communication counterpart is, for example, the processing device 2000.

The processing device 3000 may perform the operation of step S301 from the start of the supply of the frequency-divided clock signal to the end of the supply of the frequency-divided clock signal. The processing device 3000 performs the operation of steps S302 to S304 at the timing of the pulse of the frequency-divided clock signal.

Figure 24:
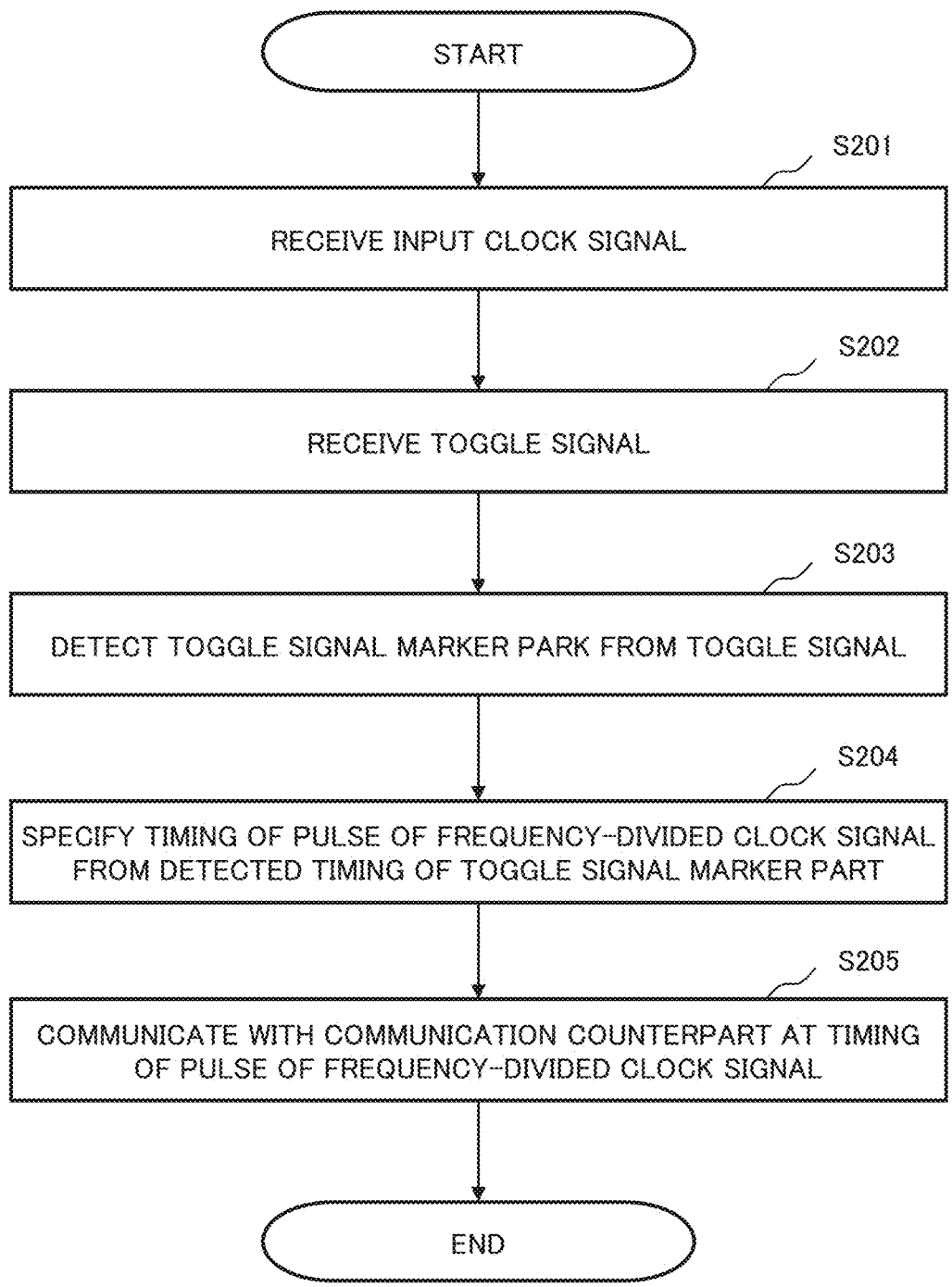
FIG. 24 is a flowchart illustrating an example of an operation of a processing device according to an example embodiment of the present disclosure.

FIG. 24 is a flowchart illustrating an example of an operation of the processing device according to an example embodiment of the present disclosure.

Hereinafter, the operation of the processing device 2000 according to the present example embodiment will be described with reference to FIG. 24.

In the example illustrated in FIG. 24, the clock signal reception unit 2001 receives an input clock signal (step S201). Furthermore, the toggle signal reception unit 2002 receives a toggle signal (step S202).

The detection unit 2003 detects a toggle signal marker from the toggle signal (step S203). The specification unit 2004 specifies a timing of a pulse of the frequency-divided clock signal from the detected timing of the toggle signal marker (step S204). The communication unit 2005 communicates with a communication counterpart at the timing of the pulse of the frequency-divided clock signal (step S205). The communication counterpart of the processing device 2000 is, for example, the processing device 3000.

The processing device 2000 may perform the operation of step S201 while the input clock is supplied. The processing device 2000 may perform the operation of steps S202 to S205 while the toggle signal is input.

<Effect>

The present example embodiment described above has the same effect as the second example embodiment. The reason is the same as the reason why the effect of the second example embodiment occurs. The present example embodiment has the same effect as the first example embodiment. The reason is the same as the reason why the effect of the first example embodiment occurs.

The clock signal frequency dividing circuit described in WO 2009/116398 A1 outputs a clock pulse of an input clock signal as a frequency-divided clock signal without masking the clock pulse of the input clock signal at a communication timing of a target circuit. Therefore, the target circuit using the frequency-divided clock signal output from the clock signal frequency dividing circuit described in WO 2009/116398 A1 can perform data communication with a counterpart circuit operating with a clock signal different from the input clock signal without deteriorating communication performance. However, in order to perform data communication without deteriorating communication performance, the target circuit needs to recognize a communication timing. Therefore, it is necessary to propagate communication timing information from the clock signal frequency dividing circuit to the target circuit. However, it is necessary to match the timing between the distribution of the clock signal and the distribution of the communication timing information. Timing design for that is not easy. Therefore, design cost increases.

The present disclosure is advantageous in that design cost can be reduced and timing design can be facilitated.

Other Example Embodiments

Some or all of the above-described example embodiments may be described as in the following supplementary notes, but are not limited to the following supplementary notes.

(Supplementary Note 1)

A processing device including:
- a toggle signal reception means for receiving a toggle signal a value of which transitions between binary values at a timing of a pulse of a frequency-divided clock signal in which a periodic pattern signal is repeated, the periodic pattern signal having predetermined pulses that are masked, among pulses consecutive in a periodic pulse number of an input clock signal, in such a way that a mask pulse number is smaller than the periodic pulse number; and
- a communication means for communicating with another processing device operated by the frequency-divided clock signal at the timing of the pulse of the frequency-divided clock signal specified using the toggle signal among the pulses of the input clock signal.

(Supplementary Note 2)

The processing device according to supplementary note 1, in which the toggle signal includes a toggle signal marker that is a pattern of the signal, and the pattern of the signal of the toggle signal marker is present only in a portion in the toggle signal marker of the toggle signal.

(Supplementary Note 3)

The processing device according to supplementary note 2, in which
- the toggle signal marker is a signal pattern generated in the toggle signal by a partial portion of a marker part that is a head portion of the periodic pattern signal, and
- the processing device further includes:
  - a detection means for detecting the toggle signal marker from the toggle signal; and
  - a specification means for specifying the timing of the pulse of the frequency-divided clock signal from a timing of the detected toggle signal marker.

(Supplementary Note 4)

The processing device according to supplementary note 3, in which
- the frequency-divided clock signal includes the marker part including at least one unmasked pulse in the head portion of the periodic pattern signal, and
- a pattern of pulses in the marker part appears only in a portion in the marker part of the frequency-divided clock signal.

(Supplementary Note 5)

The processing device according to supplementary note 2 or 3, in which
- when an output pulse number obtained by subtracting the mask pulse number from the periodic pulse number is a value obtained by subtracting 1 from the periodic pulse number, the toggle signal marker is a signal for a cycle where the value of the toggle signal does not transition,
- when the output pulse number is larger than or equal to 2 and the output pulse number is smaller than a value obtained by dividing the periodic pulse number by 2, the toggle signal marker is a signal for two consecutive cycles where the value of the toggle signal does not transition,
- when the output pulse number is larger than or equal to the value obtained by dividing the periodic pulse number by 2 and the output pulse number is smaller than the value obtained by subtracting 1 from the periodic pulse number, the toggle signal marker is a signal for two consecutive cycles where the value of the toggle signal transitions, and
- when the output pulse number is 1, the toggle signal marker is a signal for a cycle where the value of the toggle signal transitions.

(Supplementary Note 6)

The processing device according to supplementary note 3 or 4, in which
- when an output pulse number obtained by subtracting the mask pulse number from the periodic pulse number is a value obtained by subtracting 1 from the periodic pulse number, and when the output pulse number is larger than or equal to 2 and the output pulse number is smaller than a value obtained by dividing the periodic pulse number by 2, the marker part includes unmasked pulses at two consecutive output clock timings that are timings at which the pulses are output as the frequency-divided clock signal when the pulses are not masked, and a non-marker part that is a part other than the marker part of the periodic pattern signal does not include the unmasked pulses at the two consecutive output clock timings, and
- when the output pulse number is larger than or equal to the value obtained by dividing the periodic pulse number by 2, and the output pulse number is smaller than the value obtained by subtracting 1 from the periodic pulse number, and when the output pulse number is 1, pulses are masked at two or more consecutive output clock timings in the marker part, and pulses are not masked at two consecutive output clock timings in the non-marker part.

(Supplementary Note 7)

A processing system including:
- the processing device according to supplementary note 1 or 2;
- a frequency-divided clock generation device that generates the frequency-divided clock signal from the input clock signal; and
- a toggle signal generation device that receives the frequency-divided clock signal and generates the toggle signal using the frequency-divided clock signal.

(Supplementary Note 8)

The processing system according to supplementary note 7, in which
the frequency-divided clock generation device:
determines whether to mask each of the pulses of the input clock signal from the periodic pulse number and a non-mask pulse number that is the number of unmasked pulses, and generates a mask signal indicating a result of the determination; and
masks the pulse determined to be masked or directly outputs the pulse determined not to be masked according to the mask signal.

(Supplementary Note 9)

The processing system according to supplementary note 8, in which
the frequency-divided clock generation device:
generates a marker part mask signal as the mask signal for a marker part determined from the periodic pulse number and the non-mask pulse number in the marker part, the marker part being a head portion of the periodic pattern signal;

generates a non-marker part mask signal as the mask signal for a non-marker part that is a part other than the marker part of the periodic pattern signal in such a way that a pattern of unmasked pulses in the non-marker part is the same as a pattern of unmasked pulses in the periodic clock signal in a case where rational number frequency division is performed according to a predetermined rational number frequency division algorithm at a frequency division ratio determined from a second periodic pulse number obtained by subtracting the number of pulses in the marker part from the periodic pulse number and a second non-mask pulse number obtained by subtracting the number of unmasked pulses included in the marker part from the unmasked pulse number; and outputs the marker part mask signal as the mask signal while the marker part of the periodic pattern signal is output, and outputs the non-marker part mask signal as the mask signal while the non-marker part of the periodic pattern signal is output.

(Supplementary Note 10)

A processing method including:

receiving a toggle signal a value of which transitions between binary values at a timing of a pulse of a frequency-divided clock signal in which a periodic pattern signal is repeated, the periodic pattern signal having predetermined pulses that are masked, among pulses consecutive in a periodic pulse number of an input clock signal, in such a way that a mask pulse number is smaller than the periodic pulse number; and communicating with another processing device operated by the frequency-divided clock signal at the timing of the pulse of the frequency-divided clock signal specified using the toggle signal among the pulses of the input clock signal.

(Supplementary Note 11)

The processing method according to supplementary note 10, in which the toggle signal includes a toggle signal marker that is a pattern of the signal, and the pattern of the signal of the toggle signal marker is present only in a portion in the toggle signal marker of the toggle signal.

(Supplementary Note 12)

The processing method according to supplementary note 11, in which the toggle signal marker is a signal pattern generated in the toggle signal by a partial portion of a marker part that is a head portion of the periodic pattern signal, the toggle signal marker is detected from the toggle signal, and the timing of the pulse of the frequency-divided clock signal is specified from a timing of the detected toggle signal marker.

(Supplementary Note 13)

The processing method according to supplementary note 12, in which the frequency-divided clock signal includes the marker part including at least one unmasked pulse in the head portion of the periodic pattern signal, and a pattern of pulses in the marker part appears only in a portion in the marker part of the frequency-divided clock signal.

(Supplementary Note 14)

The processing method according to supplementary note 11 or 12, in which when an output pulse number obtained by subtracting the mask pulse number from the periodic pulse number is a value obtained by subtracting 1 from the periodic pulse number, the toggle signal marker is a signal for a cycle where the value of the toggle signal does not transition, when the output pulse number is larger than or equal to 2 and the output pulse number is smaller than a value obtained by dividing the periodic pulse number by 2, the toggle signal marker is a signal for two consecutive cycles where the value of the toggle signal does not transition, when the output pulse number is larger than or equal to the value obtained by dividing the periodic pulse number by 2 and the output pulse number is smaller than the value obtained by subtracting 1 from the periodic pulse number, the toggle signal marker is a signal for two consecutive cycles where the value of the toggle signal transitions, and when the output pulse number is 1, the toggle signal marker is a signal for a cycle where the value of the toggle signal transitions.

(Supplementary Note 15)

The processing method according to supplementary note 12 or 13, in which when an output pulse number obtained by subtracting the mask pulse number from the periodic pulse number is a value obtained by subtracting 1 from the periodic pulse number, and when the output pulse number is larger than or equal to 2 and the output pulse number is smaller than a value obtained by dividing the periodic pulse number by 2, the marker part includes unmasked pulses at two consecutive output clock timings that are timings at which the pulses are output as the frequency-divided clock signal when the pulses are not masked, and a non-marker part that is a part other than the marker part of the periodic pattern signal does not include the unmasked pulses at the two consecutive output clock timings, and when the output pulse number is larger than or equal to the value obtained by dividing the periodic pulse number by 2, and the output pulse number is smaller than the value obtained by subtracting 1 from the periodic pulse number, and when the output pulse number is 1, pulses are masked at two or more consecutive output clock timings in the marker part, and pulses are not masked at two consecutive output clock timings in the non-marker part.

(Supplementary Note 16)

The processing method according to supplementary note 10 or 11, in which the frequency-divided clock signal is generated from the input clock signal, and the frequency-divided clock signal is received, and the toggle signal is generated using the frequency-divided clock signal.

(Supplementary Note 17)

The processing method according to supplementary note 16, in which whether to mask each of the pulses of the input clock signal is determined from the periodic pulse number and a non-mask pulse number that is the number of unmasked pulses, and a mask signal indicating a result of the determination is generated, and the pulse determined to be masked is masked or the pulse determined not to be masked is directly output according to the mask signal.

(Supplementary Note 18)

The processing method according to supplementary note 17, in which
- a marker part mask signal is generated as the mask signal for a marker part determined from the periodic pulse number and the non-mask pulse number in the marker part, the marker part being a head portion of the periodic pattern signal,
- a non-marker part mask signal is generated as the mask signal for a non-marker part that is a part other than the marker part of the periodic pattern signal in such a way that a pattern of unmasked pulses in the non-marker part is the same as a pattern of unmasked pulses in the periodic clock signal in a case where rational number frequency division is performed according to a predetermined rational number frequency division algorithm at a frequency division ratio determined from a second periodic pulse number obtained by subtracting the number of pulses in the marker part from the periodic pulse number and a second non-mask pulse number obtained by subtracting the number of unmasked pulses included in the marker part from the unmasked pulse number, and
- the marker part mask signal is output as the mask signal while the marker part of the periodic pattern signal is output, and the non-marker part mask signal is output as the mask signal while the non-marker part of the periodic pattern signal is output.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims.

What is claimed is:

1. A processing device comprising:
   - a toggle signal reception circuit configured to receive a toggle signal a value of which transitions between binary values at a timing of a pulse of a frequency-divided clock signal in which a periodic pattern signal is repeated, pulses of the periodic pattern signal being generated by masking predetermined pulses of a mask pulse number among consecutive pulses of a periodic pulse number in an input clock signal, the mask pulse number being smaller than the periodic pulse number; and
   - a communication circuit configured to communicate with another processing device operated by the frequency-divided clock signal at the timing of the pulse of the frequency-divided clock signal among the pulses of the input clock signal, the timing of the pulse of the frequency-divided clock signal being specified using the toggle signal.

2. The processing device according to claim 1, wherein the toggle signal includes a toggle signal marker that is a pattern of the signal, and
   the pattern of the signal of the toggle signal marker is present only in a portion in the toggle signal marker of the toggle signal.

3. The processing device according to claim 2, wherein the toggle signal marker is a signal pattern generated in the toggle signal by a partial portion of a marker part that is a head portion of the periodic pattern signal, and the processing device further comprises:
   - a detection circuit configured to detect the toggle signal marker from the toggle signal; and
   - a specification circuit configured to specify the timing of the pulse of the frequency-divided clock signal from a timing of the detected toggle signal marker.

4. The processing device according to claim 3, wherein the frequency-divided clock signal includes the marker part including at least one unmasked pulse in the head portion of the periodic pattern signal, and
   a pattern of pulses in the marker part appears only in a portion in the marker part of the frequency-divided clock signal.

5. The processing device according to claim 3, wherein in a case where an output pulse number obtained by subtracting the mask pulse number from the periodic pulse number is a value obtained by subtracting one from the periodic pulse number, and in a case where the output pulse number is larger than or equal to two and the output pulse number is smaller than a value obtained by dividing the periodic pulse number by two, the marker part includes unmasked pulses at two consecutive output clock timings that are timings at which the pulses are output as the frequency-divided clock signal in a case where the pulses are not masked, and a non-marker part that is a part other than the marker part of the periodic pattern signal does not include the unmasked pulses at the two consecutive output clock timings, and
   in a case where the output pulse number is larger than or equal to the value obtained by dividing the periodic pulse number by two, and the output pulse number is smaller than the value obtained by subtracting one from the periodic pulse number, and in a case where the output pulse number is one, pulses are masked at two or more consecutive output clock timings in the marker part, and pulses are not masked at two consecutive output clock timings in the non-marker part.

6. The processing device according to claim 2, wherein in a case where an output pulse number obtained by subtracting the mask pulse number from the periodic pulse number is a value obtained by subtracting one from the periodic pulse number, the toggle signal marker is a signal for a cycle where the value of the toggle signal does not transition,
   in a case where the output pulse number is larger than or equal to two and the output pulse number is smaller than a value obtained by dividing the periodic pulse number by two, the toggle signal marker is a signal for two consecutive cycles where the value of the toggle signal does not transition,
   in a case where the output pulse number is larger than or equal to the value obtained by dividing the periodic pulse number by two and the output pulse number is smaller than the value obtained by subtracting one from the periodic pulse number, the toggle signal marker is a signal for two consecutive cycles where the value of the toggle signal transitions, and
   in a case where the output pulse number is one, the toggle signal marker is a signal for a cycle where the value of the toggle signal transitions.

7. A processing system including the processing device according to claim 1, the processing system comprising:
- a frequency-divided clock generation device that generates the frequency-divided clock signal from the input clock signal; and
- a toggle signal generation device that receives the frequency-divided clock signal and generates the toggle signal using the frequency-divided clock signal.

8. The processing system according to claim 7, wherein the frequency-divided clock generation device is configured to:
- perform determination whether to mask each of the pulses of the input clock signal from the periodic pulse number and a non-mask pulse number that is the number of unmasked pulses;
- generate a mask signal indicating a result of the determination; and
- according to the mask signal, mask the pulse determined to be masked and directly output the pulse determined not to be masked.

9. The processing system according to claim 8, wherein the frequency-divided clock generation device is further configured to:
- generate a marker part mask signal that is the mask signal for a marker part determined according to the periodic pulse number and the non-mask pulse number in the marker part, the marker part being a head portion of the periodic pattern signal;
- generate a non-marker part mask signal, the non-marker part mask signal being the mask signal for a non-marker part that is a part other than the marker part of the periodic pattern signal, in such a way that a pattern of unmasked pulses in the non-marker part is same as a pattern of unmasked pulses in the periodic clock signal in a case where rational number frequency division is performed according to a predetermined rational number frequency division algorithm at a frequency division ratio determined by a second periodic pulse number and a second non-mask pulse number, the second periodic pulse number being obtained by subtracting the number of pulses in the marker part from the periodic pulse number, the second non-mask pulse number being obtained by subtracting the number of unmasked pulses included in the marker part from the unmasked pulse number; and
- output the marker part mask signal as the mask signal while the marker part of the periodic pattern signal is output, and output the non-marker part mask signal as the mask signal while the non-marker part of the periodic pattern signal is output.

10. A processing method comprising:
- receiving a toggle signal a value of which transitions between binary values at a timing of a pulse of a frequency-divided clock signal in which a periodic pattern signal is repeated, pulses of the periodic pattern signal being generated by masking predetermined pulses of a mask pulse number among consecutive pulses of a periodic pulse number in an input clock signal, the mask pulse number being smaller than the periodic pulse number; and
- communicating with another processing device operated by the frequency-divided clock signal at the timing of the pulse of the frequency-divided clock signal among the pulses of the input clock signal, the timing of the pulse of the frequency-divided clock signal being specified using the toggle signal.

11. The processing method according to claim 10, wherein
- the toggle signal includes a toggle signal marker that is a pattern of the signal, and
- the pattern of the signal of the toggle signal marker is present only in a portion in the toggle signal marker of the toggle signal.

12. The processing method according to claim 11, wherein
- the toggle signal marker is a signal pattern generated in the toggle signal by a partial portion of a marker part that is a head portion of the periodic pattern signal, and
- the processing method further comprises:
- detecting the toggle signal marker from the toggle signal; and
- specifying the timing of the pulse of the frequency-divided clock signal from a timing of the detected toggle signal marker.

13. The processing method according to claim 12, wherein
- the frequency-divided clock signal includes the marker part including at least one unmasked pulse in the head portion of the periodic pattern signal, and
- a pattern of pulses in the marker part appears only in a portion in the marker part of the frequency-divided clock signal.

14. The processing method according to claim 12, wherein
- in a case where an output pulse number obtained by subtracting the mask pulse number from the periodic pulse number is a value obtained by subtracting one from the periodic pulse number, and in a case where the output pulse number is larger than or equal to two and the output pulse number is smaller than a value obtained by dividing the periodic pulse number by two, the marker part includes unmasked pulses at two consecutive output clock timings that are timings at which the pulses are output as the frequency-divided clock signal in a case where the pulses are not masked, and a non-marker part that is a part other than the marker part of the periodic pattern signal does not include the unmasked pulses at the two consecutive output clock timings, and
- in a case where the output pulse number is larger than or equal to the value obtained by dividing the periodic pulse number by two, and the output pulse number is smaller than the value obtained by subtracting one from the periodic pulse number, and in a case where the output pulse number is one, pulses are masked at two or more consecutive output clock timings in the marker part, and pulses are not masked at two consecutive output clock timings in the non-marker part.

15. The processing method according to claim 11, wherein
- in a case where an output pulse number obtained by subtracting the mask pulse number from the periodic pulse number is a value obtained by subtracting one from the periodic pulse number, the toggle signal marker is a signal for a cycle where the value of the toggle signal does not transition,
- in a case where the output pulse number is larger than or equal to two and the output pulse number is smaller than a value obtained by dividing the periodic pulse number by two, the toggle signal marker is a signal for two consecutive cycles where the value of the toggle signal does not transition, in a case where the output pulse number is larger than or equal to the value obtained by dividing the periodic pulse number by two and the output pulse number is smaller than the value obtained by subtracting one from the periodic pulse number, the toggle signal marker is a signal for two consecutive cycles where the value of the toggle signal transitions, and in a case where the output pulse number is one, the toggle signal marker is a signal for a cycle where the value of the toggle signal transitions.

16. A processing system control method including the processing method according to claim 10, the processing system control method comprising:

generating the frequency-divided clock signal from the input clock signal; and by a toggle signal generation device, receiving the frequency-divided clock signal and generating the toggle signal using the frequency-divided clock signal.

17. The processing method according to claim 16, comprising:

performing determination whether to mask each of the pulses of the input clock signal from the periodic pulse number and a non-mask pulse number that is the number of unmasked pulses;

generating a mask signal indicating a result of the determination; and according to the mask signal, masking the pulse determined to be masked and directly outputting the pulse determined not to be masked.

18. The processing method according to claim 17, comprising:

generating a marker part mask signal that is the mask signal for a marker part determined according to the periodic pulse number and the non-mask pulse number in the marker part, the marker part being a head portion of the periodic pattern signal;

generating a non-marker part mask signal, the non-marker part mask signal being the mask signal for a non-marker part that is a part other than the marker part of the periodic pattern signal, in such a way that a pattern of unmasked pulses in the non-marker part is same as a pattern of unmasked pulses in the periodic clock signal in a case where rational number frequency division is performed according to a predetermined rational number frequency division algorithm at a frequency division ratio determined by a second periodic pulse number and a second non-mask pulse number, the second periodic pulse number being obtained by subtracting the number of pulses in the marker part from the periodic pulse number, the second non-mask pulse number being obtained by subtracting the number of unmasked pulses included in the marker part from the unmasked pulse number; and outputting the marker part mask signal as the mask signal while the marker part of the periodic pattern signal is output, and outputting the non-marker part mask signal as the mask signal while the non-marker part of the periodic pattern signal is output.

* * * * *